US008504830B2

(12) United States Patent
Ishii et al.

(10) Patent No.: US 8,504,830 B2
(45) Date of Patent: Aug. 6, 2013

(54) TRANSFER DATA MANAGEMENT SYSTEM FOR INTERNET BACKUP

(75) Inventors: Yohsuke Ishii, Kanagawa (JP); Takaki Nakamura, Kanagawa (JP); Atsuya Kumagai, Kanagawa (JP); Kazuyoshi Toyama, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 872 days.

(21) Appl. No.: 12/545,138

(22) Filed: Aug. 21, 2009

(65) Prior Publication Data

US 2010/0070764 A1    Mar. 18, 2010

(30) Foreign Application Priority Data

Sep. 16, 2008  (JP) ................................. 2008-236885

(51) Int. Cl.
*H04L 29/00*      (2006.01)
(52) U.S. Cl.
USPC ........... 713/168; 713/150; 713/151; 713/152; 713/153; 713/154; 713/155; 713/156; 713/157; 713/158; 713/159; 705/67; 380/229
(58) Field of Classification Search
USPC .......................................... 713/168; 707/664
See application file for complete search history.

(56) References Cited

U.S. PATENT DOCUMENTS

| 7,222,233 | B1 * | 5/2007 | Rubin | 713/168 |
| 7,272,602 | B2 * | 9/2007 | Moulton | 1/1 |
| 2003/0005306 | A1 * | 1/2003 | Hunt et al. | 713/181 |
| 2003/0105716 | A1 * | 6/2003 | Sutton et al. | 705/50 |
| 2003/0220984 | A1 * | 11/2003 | Jones et al. | 709/219 |
| 2006/0143246 | A1 * | 6/2006 | Phillips et al. | 707/204 |
| 2006/0206747 | A1 * | 9/2006 | Nakano et al. | 714/4 |
| 2008/0052328 | A1 * | 2/2008 | Widhelm et al. | 707/204 |
| 2008/0162608 | A1 * | 7/2008 | Torii et al. | 707/204 |

OTHER PUBLICATIONS

FIP180-1, "Secure Hash Standard", Apr. 1995.*
FIPS186-2, Digital Signatrue Stanard (DSS), Jan. 2000.*
FIPS180-3, Secure Hash Standard (SHS), Oct. 2008.*

* cited by examiner

Primary Examiner — Andy Rao
Assistant Examiner — Shan Elahi
(74) Attorney, Agent, or Firm — Mattingly & Malur, PC

(57) ABSTRACT

Erroneous deletion of data due to a collision of digest information during data de-duplication using digest information is prevented. When backup data is stored on a backup server 1100, digest information of the backup data is generated and stored in a digest information management table 4200. In addition, when a backup data storage request is made to the backup server 1100, a digest information verification control sub-program 1127 generates digest information of data to be backed up, and performs verification against the digest information of the backed up data already stored on the backup server 1100. If, by this verification, it is found that backed up data having the same digest information is already stored, de-duplication is realized by reusing the existing backed up data without newly storing the data to be backed up.

12 Claims, 50 Drawing Sheets

FIG. 4

| Entry No. | Data identifier | Metadata | | | | Registration/Update date and time |
|---|---|---|---|---|---|---|
| | | Name | Size | Owner | ... | |
| 1 | 10001 | AAA | 1000 | Taro | | 2008/07/01 12:00:00 |
| 2 | 10002 | BBB | 2000 | Taro | | 2008/07/02 13:30:00 |
| 3 | 10003 | CCC | 1000 | Jiro | | 2008/07/02 14:00:00 |
| 4 | 10004 | DDD | 3000 | Jiro | | 2008/07/02 17:00:00 |
| ... | | | | | | |

4110, 4120, 4130 (4131 Name, 4132 Size, 4133 Owner), 4140
4100

FIG. 5

| Stored file identifier | Digest information | Digest information calculation method | Registration/Update date and time |
|---|---|---|---|
| 20001 | opgegu93jkoq | SHA-1 | 2008/07/01 12:00:00 |
| 20002 | gkwegkjwe7rs | SHA-1 | 2008/07/02 13:30:00 |
| 20003 | wpakfkpf3rgy | SHA-1 | 2008/07/02 14:00:00 |
| ... | | | |

| Data identifier (4120) | Stored file identifier (4210) |
|---|---|
| 10001 | 20001 |
| 10002 | 20002 |
| 10003 | 20001 |
| 10004 | 20003 |
| ... | |

| Stored file identifier (4210) | File storage path name (4420) | Reference count (4430) |
|---|---|---|
| 20001 | /home/store/20001 | 2 |
| 20002 | /home/store/20002 | 1 |
| 20003 | /home/store/20003 | 1 |
| ... | | |

| Entry No. | Data identifier | Metadata | | | | Original server information | Access information for original server | Registration/Update date and time |
|---|---|---|---|---|---|---|---|---|
| | | Name | Size | Owner | ... | | | |
| 1 | 10001 | AAA | 1000 | Taro | | svrA | data1@taro | 2008/07/01 12:00:00 |
| 2 | 10002 | BBB | 2000 | Taro | | svrA | data2@taro | 2008/07/02 13:30:00 |
| 3 | 10003 | CCC | 1000 | Jiro | | svrB | data3@jiro | 2008/07/02 14:00:00 |
| 4 | 10004 | DDD | 3000 | Jiro | | svrB | data4@jiro | 2008/07/02 17:00:00 |
| ... | | | | | | | | |

6110 UserID — taro

6120 Password — ******

6130 IP address — 10.100.200.150

6140 Backup Mode
6141 ○ Trust Mode:
   Transfer all data without verification by the digest.

6142 ● Efficient Transfer Mode:
   Transfer non-duplicated data only with verification by the digest 6143 ● Verified on the client side using full data
6144 ○ Verified on the client side using digest data Options for creating the digest 6145 [▽]   6146 [Add a Line]

[OK]  [Cancel]
6150  6160

FIG. 34

| User identifier | Password | IP address | Backup mode | Digest calculation method | Registration/Update date and time |
|---|---|---|---|---|---|
| taro | ****** | 10.100.200.150 | Efficient Transfer | -- | 2008/07/01 12:00:00 |
| jiro | ****** | 10.100.200.151 | Efficient Transfer | MD5 SHA-1 | 2008/07/02 13:30:00 |
| saburo | ****** | 10.100.200.152 | Trust Transfer | -- | 2008/07/02 14:00:00 |
| ... | | | | | |

| Entry No. | Data identifier | Metadata | | | | Usability for de-duplication flag | Registration/Update date and time |
|---|---|---|---|---|---|---|---|
| | | Name | Size | Owner | ... | | |
| 1 | 10001 | AAA | 1000 | Taro | | Allowed Globally | 2008/07/01 12:00:00 |
| 2 | 10002 | BBB | 2000 | Taro | | Allowed Globally | 2008/07/02 13:30:00 |
| 3 | 10003 | CCC | 1000 | Jiro | | Allowed Locally | 2008/07/02 14:00:00 |
| 4 | 10004 | DDD | 3000 | Jiro | | Disallowed | 2008/07/02 17:00:00 |
| ... | | | | | | | |

| User identifier | Password | IP address | Backup mode | Digest calculation method | Digest information creation default setting information | Registration/Update date and time |
|---|---|---|---|---|---|---|
| taro | ****** | 10.100.200.150 | Effective Transfer | -- | Allowed Globally | 2008/07/01 12:00:00 |
| jiro | ****** | 10.100.200.151 | Effective Transfer | MD5 SHA-1 | Allowed Myself | 2008/07/02 13:30:00 |
| saburo | ****** | 10.100.200.152 | Trust Transfer | -- | Disallowed | 2008/07/02 14:00:00 |
| ... | | | | | | |

| Client IP address | Communication direction | Communication status | | ... | Registration/Update date and time |
|---|---|---|---|---|---|
| | | Throughput [MB/s] | Turnaround time [msec] | | |
| 10.100.200.150 | Server direction | 1 | 15 | | 2008/07/01 12:00:00 |
| 10.100.200.150 | Client direction | 10 | 10 | | 2008/07/0 14:00:00 |
| 10.100.200.151 | Server direction | 0.5 | 20 | | 2008/07/02 13:30:00 |
| 10.100.200.151 | Client direction | 8 | 15 | | 2008/07/02 14:00:00 |
| ... | | | | | |

4610, 4620, 4630, 4631, 4632, 4640, 4600

TRANSFER DATA MANAGEMENT SYSTEM FOR INTERNET BACKUP

BACKGROUND OF THE INVENTION

1. Field of the Invention

The present invention relates to a transfer data management technique for internet backup. More particularly, the present invention relates to system control that enables a reduction in transfer data volume by transferring only the minimum required data without any duplication in transferring new backup data as backup on a backup server that collects backup of data of a plurality of users and stores it after de-duplication.

2. Background Art

In recent years, along with improvements in performance and reductions in the prices of computer systems, the use of computer systems has become widespread in and for a variety of industries and purposes. Along therewith, it is becoming common to computerize and electronically store in computer systems data that was conventionally handled through paper media and the like. Further, use in a configuration in which a plurality of computer systems is connected by a network is advancing rapidly. It has thus become possible to realize remote backup, distributed management, and distributed processing of data, and it is becoming possible to realize improved availability, reliability, and performance which had been difficult to realize when merely stored in a single computer system.

In addition, in recent years, as communication networks have become wider in bandwidth and network connection fees have shifted towards flat rates and lower prices, services using the Internet have also become widely used. At first, such services as browsing web pages and sending/receiving e-mail were mainstream. However, recently, services in which large volumes of data are exchanged such as data backup services via the Internet (hereinafter referred to as "internet backup") have also become popular. When backing up data, users conventionally had to individually furnish a backup device, manage the backup device themselves, and thus back their data up. However, when using internet backup of such a form, users are able to back their own data up by simply accessing a backup service that is accessible via the Internet. Further, there is an advantage in that each user is only required to furnish connection to the Internet, and thus furnishing and managing a backup device is unnecessary. It is thus expected that use of such internet backup will become even more widespread in the future.

Conventionally, in collecting backup data from a plurality of users at a backup server, there are cases where identical data are transmitted to and stored on this backup server in duplicate. For example, with respect to popular music files purchased at internet shops and the like, the same music file is often owned by a large number of users. It is therefore likely that the same data might exist within the backup data in duplicate.

Patent Document 1 mentioned below discloses a technique for data de-duplication of the same content with a view to improving the use efficiency of storage on a backup server. In this scheme, digest (summary) information of stored data is calculated in advance at the server storing the data. Then, in transmitting and storing new data to and on the server, digest information of the data to be transmitted is sent to the server before the data to be transmitted is transmitted, thus making it possible to determine at the server whether or not it is necessary to transfer the data, in other words, whether or not the same data is already stored on the server. If duplication of the data to be transmitted is detected on the server side, it becomes no longer necessary to send this data to the server side. As a result, there are such merits as improved storage use efficiency resulting from de-duplication at the server, as well as improved network use efficiency due to the fact that transmission of duplicate data via a network is made unnecessary.

[Patent Document 1] U.S. Pat. No. 7,272,602

SUMMARY OF THE INVENTION

However, with the technique disclosed in the above-mentioned Patent Document 1, problems may arise where, for example, erroneous detection may occur when there is a collision of the digest information that is used in the detection of duplication with respect to the stored data. As a result, when the server detects for duplication using digest information, data whose digest information are the same but which are different in actuality would also be determined as being duplicate. Consequently, since the server does not store data which is determined as being duplicated, there is a problem in that data loss may occur as a result.

Such problems may be attributed to the fact that in some cases, in generating digest information, the same digest information may be outputted even when the inputted data are different. In such cases, the collision probability may be reduced by increasing the bit length of the data that is used as digest information. However, the collision probability cannot be made zero.

Therefore, in performing de-duplication using digest information, a technique that provides means for having a user examine, even if it is determined that some given data duplicates already stored data, whether or not there really is any duplication is necessary.

An object of the present invention is to prevent data loss in cases where digest information collides in the detection of data duplication using digest information at a server.

In order to solve the problems above, the present invention may be embodied as follows: a control apparatus that comprises de-duplication control in which de-duplication is performed on data to be stored on a backup server (data storage apparatus) using digest information of the data to be stored, wherein the control apparatus comprises data de-duplication control in which, in accepting a data storage request, digest information of the data to be stored is made to be transmitted first, it is checked whether or not the data to be stored duplicates data that is already stored on the control apparatus based on this digest information, stored data itself that is determined as being duplicated is transmitted as verification data to a backup client (user) that made the request, it is determined at the backup client whether or not the verification data and the data to be stored match, and based on that determination, it is decided whether or not the data to be stored is to be transmitted to the control apparatus.

It is noted that in the data de-duplication control, a method for generating digest information of the stored data and the data to be stored may include, for example, the use of hash values of a fixed length that are generated using a one-way function. In addition, if the data in question is a media file such as music data or video data, digest information that is generated by a verification method that is capable of determining contents as being identical even if the formats and quality of the data are different may be used. For example, with respect to music data of differing formats, it is contemplated that hash values of a fixed length generated using the above-mentioned one-way function may be used after the format of one of the music data is converted to the format of the other music data. Naturally, it is contemplated that digest information may be generated not only by the method described herein, but instead by various other methods as well. The present invention may also use digest information thus generated.

According to an aspect of the present invention, there is provided a transfer data management system for internet backup in which a backup server and a plurality of backup clients are connected via a network and in which the backup server provides to the plurality of backup clients a function of backing up on the backup server data stored on the backup clients, as well as a function of restoring on the backup clients the backed up data, the backup client comprising: a digest information sending portion that sends to the backup server digest information of data to be stored prior to a data storage request from the backup client to the backup server; a verification data receiving portion that receives, as verification data, stored data that is transmitted on the condition that the backup server perform at a verification portion verification with respect to stored data based on the digest information and relevant stored data be detected; and an examining portion for examining whether or not the verification data and the data to be stored match. Thus, in accepting the data storage request, digest information of the data to be stored is first sent in advance. Based on this digest information, it is checked whether or not it duplicates data already stored in the control apparatus. If it is determined as being duplicated, the relevant stored data itself is transmitted as verification data to the backup client (user) who made the request. At the backup client, it is determined whether or not the verification data and the data to be stored match. With that determination, it can be decided whether or not to transmit the data to be stored to the control apparatus, and it also becomes possible to actually determine on the client side whether or not the relevant data is duplicated. Therefore, the data de-duplication function works effectively.

At the verification portion of the backup server, it is preferable that storage and verification be performed independent of the backup clients and with respect to, as a whole, data of a plurality of the backup clients as the stored data.

It is preferable that: the backup server comprise a first encryption portion that encrypts the verification data, and send to the requesting backup client encrypted data for verification and information regarding the encryption scheme; the backup client comprise a second encryption portion that encrypts the data to be stored by the received encryption scheme; and it be examined at the examining portion whether or not the received encrypted data for verification and the data to be stored match.

It is preferable that digest information summarizing full data be used as the verification data instead of the full data. In addition, it is preferable that a plurality of digest information generated with different schemes be used, and that it be examined at the examining portion of the requesting backup client whether or not the digest information for verification and the digest information generated from the data to be stored match. The digest information sending portion may also divide the verification data and transmit it in units of data fragments for verification. In doing so, it works well when the requesting backup client performs the verification of the data to be stored in stages.

In addition, it is preferable that the requesting backup client comprise a selecting portion for selecting whether to perform verification using full data or to perform verification using digest information. This would make it possible to perform de-duplication even if the system is only compatible one of these methods.

The requesting backup client may also comprise a de-duplication applicability selecting portion for selecting, with respect to stored data on the backup server, whether or not to allow use as a duplication detection candidate in the data de-duplication function. Since settings can be configured per stored data as to whether or not the data de-duplication function is necessary, there is a certain degree of freedom of configuration.

In addition, the backup server may also comprise a verification data transmission scheme selecting portion that monitors the use status of a communication channel between itself and the requesting backup client, and, based on this monitoring information, selects as the transmission method of the verification data for the requesting backup client a scheme that is suited to the use status of the communication channel to be used. By transmitting with a scheme suited to the use status of the communication channel, data transmission can be carried out smoothly.

A plurality of the above-mentioned backup servers may be provided, and when a data storage request is made with respect to a first backup server, information regarding a second backup server from which the data to be stored was acquired as well as information that is necessary for the acquisition of the data to be stored may be sent to the first backup server, and the first backup server may acquire stored data from the second backup server based on the above-mentioned information.

In addition, the present invention may also include a backup client in a transfer data management system for internet backup in which a backup server and a plurality of backup clients are connected via a network, and in which the backup server provides to the plurality of backup clients a function of backing up on the backup server data stored on the backup clients, as well as a function of restoring on the backup clients the backed up data, the backup client comprising: a digest information sending portion that sends to the backup server digest information of data to be stored prior to a data storage request from the backup client to the backup server; a verification data receiving portion that receives, as verification data, stored data that is sent on the condition that the backup server perform verification with respect to stored data based on the digest information and relevant stored data be detected; and an examining portion for examining whether or not the verification data and the data to be stored match.

In addition, the present invention may also include a backup server in a transfer data management system for internet backup in which the backup server and a plurality of backup clients are connected via a network, and in which the backup server provides to the plurality of backup clients a function of backing up on the backup server data stored on the backup clients, as well as a function of restoring on the backup clients the backup data, the backup server comprising a verification portion that, prior to a data storage request from the backup client, receives digest information of data to be stored and performs verification with respect to stored data based on the digest information, wherein stored data that is sent on the condition that relevant stored data be detected is sent to the backup client as verification data, and examination is prompted as to whether or not the verification data and the data to be stored match.

According to another aspect of the present invention, there is provided a transfer data management method that uses a transfer data management system for internet backup in which a backup server and a plurality of backup clients are connected via a network, and in which the backup server provides to the plurality of backup clients a function of backing up on the backup server data stored on the backup clients, as well as a function of restoring on the backup clients the backed up data, the transfer data management method comprising: a digest information sending step in which, at the backup client, prior to a data storage request from the backup client to the backup server, digest information of data to be stored is sent to the backup server; a verification data receiving step in which stored data, which is sent on the condition that, at the backup server, verification be performed with respect to stored data at a verification portion based on the digest information and relevant stored data be detected, is received as verification data; and an examining step in which it is examined at the backup client whether or not the verification data and the data to be stored match.

The present invention may also include a program for causing a computer to execute the method described above, as well as a computer-readable recording medium storing such a program.

According to the present invention, in data duplication detection at a server using digest information, it is possible to prevent data loss in cases where there is a collision of digest information. This is because as already stored data, which has been determined as being duplicated by means of the digest information, is first sent to a user who made a data storage request, and the user performs verification with respect to data to be stored that he was going to send to the server, it is made possible to actually determine also on the user side whether or not the data to be stored is duplicated. As a result, there is an advantage in that even if a collision of the digest information were to occur, data loss due thereto can be prevented.

BRIEF DESCRIPTION OF THE DRAWINGS

FIG. 4 is a diagram showing an example of a backup data management table.

FIG. 5 is a diagram showing an example of a digest information management table.

FIG. 6 is a diagram showing an example of a stored data correspondence management table.

FIG. 7 is a diagram showing an example of a stored file management table.

FIG. 19 is a diagram showing an example of a backup data management table according to the second embodiment of the present invention.

FIG. 33 is a diagram showing an example of a backup client information input screen according to the fifth embodiment of the present invention.

FIG. 34 is a diagram showing an example of a backup client management table according to the fifth embodiment of the present invention.

FIG. 41 is an illustrative diagram showing an example of a backup data management table according to the sixth embodiment of the present invention.

FIG. 42 is an illustrative diagram showing an example of a backup client management table according to the sixth embodiment of the present invention.

FIG. 52 is an illustrative diagram showing an example of a network communication status management table according to the eighth embodiment of the present invention.

DESCRIPTION OF SYMBOLS

Figure 1:
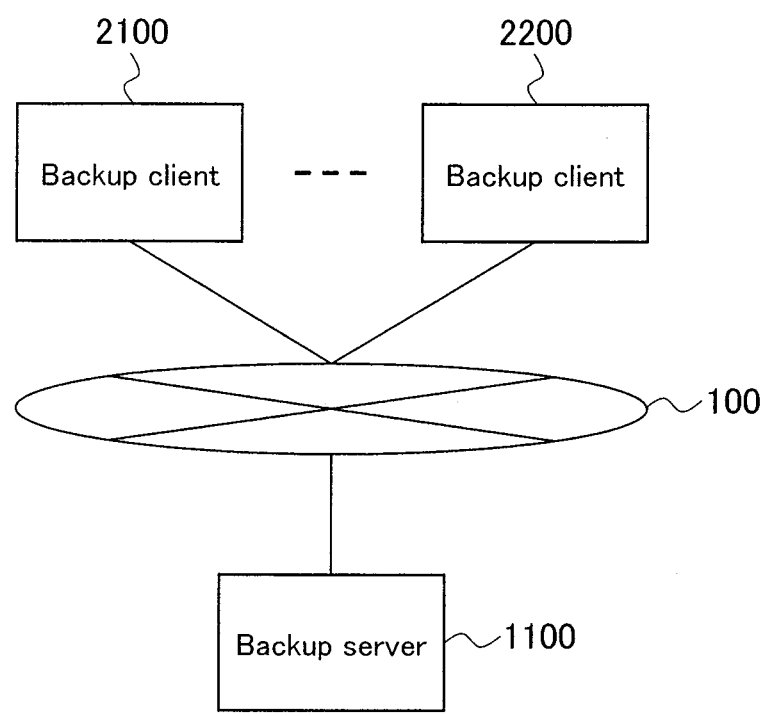
FIG. 1 is functional block diagram showing a configuration example of an internet backup system according to an embodiment of the present invention.

100 . . . Network
1100 . . . Backup server
2100, 2200 . . . Backup client
3100 . . . Original server
1110, 2110, 3110 . . . Processor
1120, 2120, 3120 . . . Memory
1121, 2121, 3121 . . . External storage apparatus I/F control program
1122, 2122, 3122 . . . Network I/F control program
1123, 2123, 3123 . . . Local file system control program
1124 . . . Backup server control program
1125 . . . Data de-duplication control program
1126, 2126 . . . Digest information generation control sub-program
1127, 2127 . . . Digest information verification control sub-program
1128 . . . Backup client information control program
1129 . . . Backup data information control program
1171 . . . Network monitoring control program
2124 . . . Backup client control program
2125 . . . Data duplication confirmation control program
2126 . . . Digest information generation control sub-program
2128 . . . Backup client information input program
2129 . . . Backup data information input program
2171 . . . Network information notification control program
3124 . . . Data access control program
1130, 2130, 3130 . . . External storage apparatus I/F
1140, 2140, 3140 . . . Network I/F
1150, 2150, 3150 . . . Bus
1160, 2160, 3160 . . . External storage apparatus
4100 . . . Backup data management table
4110 . . . Entry number
4120 . . . Data identifier
4130 . . . Metadata
4131 . . . Name
4132 . . . Size
4133 . . . Owner
4140 . . . Registration/update date and time
4150 . . . Original server information
4160 . . . Access information for original server
4170 . . . Usability flag for de-duplication
4200 . . . Digest information management table
4210 . . . Stored file identifier
4220 . . . Digest information
4230 . . . Digest information calculation method
4240 . . . Registration/update date and time
4300 . . . Stored data correspondence management table
4400 . . . Stored file management table
4420 . . . File storage path name
4430 . . . Reference count
4500 . . . Backup client management table
4510 . . . User identifier
4520 . . . Password
4530 . . . IP address
4540 . . . Backup mode
4550 . . . Digest scheme
4560 . . . Registration/update date and time
4570 . . . Digest information creation default setting information
4600 . . . Network communication status management table
4610 . . . Client IP address
4620 . . . Communication direction
4630 . . . Communication status
4631 . . . Throughput
4632 . . . Turnaround time
4640 . . . Registration/update date and time
5000 . . . Communication packet
5100 . . . Packet type
5200 . . . Packet content flag
5300 . . . Control information
5400 . . . Data main body
5510, 5550 . . . Backup request packet
5520, 5560, 5570, 5580 . . . Backup accept response packet
5530 . . . Backup request (after verification) packet
5540 . . . Restore request/delete request packet
5411, 5416, 5431, 5436, 5451, 5455, 5461, 5464 . . . Content flag
5412, 5417, 5432, 5437, 5452, 5456 . . . Serial number
5413, 5418 . . . Metadata
5414, 5419 . . . Digest information/full data
5415, 5420, 5435, 5440, 5454, 5458, 5463, 5466 . . . Separator
5433, 5438 . . . Verification result
5434, 5439 . . . Verification data

5453, 5457 . . . Full data
5462, 5465 . . . Data identifier
5471, 5472 . . . Original server information/access information
5473, 5476 . . . Server public key
5474, 5477 . . . Encryption scheme identification information
5475, 5478 . . . Encrypted data for verification
5479, 5481 . . . Digest information calculation method
5480, 5482 . . . Digest information for verification
5483, 5485 . . . Offset/size information
5484, 5486 . . . Data fragment for verification

DETAILED DESCRIPTION OF THE PREFERRED EMBODIMENTS

As used in the present specification, the term "digest information" refers to information relating to data, whose information volume is less than that of the actual information, which is created by compressing or summarizing some given data with a view to making it possible to readily identify this data. Alternatively, it may also refer to a URL at which a method of accessing the digest information is described, and the like.

A back up server and a backup client comprise a function of data de-duplication, and shared functions of generating digest information and verifying digest information. However, the backup server differs in that it also comprises functions of managing backup data and digest information, and of managing the correspondence relationship of stored data.

Various embodiments of the present invention are described below with reference to the drawings.

First Embodiment

First, the first embodiment of the present invention will be described. FIG. 1 is a functional block diagram showing a configuration example of a system for realizing a data management technique according to the present embodiment. In the system shown in FIG. 1, a backup server 1100, and backup clients 2100 and 2200 are connected via a network 100. The backup server 1100 provides to a plurality of backup clients a function of backing up on the backup server 1100 data stored on the backup clients 2100 and 2200, as well as a function of restoring the backed up data on the backup clients 2100 and 2200.

Therefore, any given number of backup clients may be connected.

In FIG. 1, there is shown only one backup server, namely that denoted by reference numeral 1100. However, the configuration may instead be such that the backup server function is provided by a plurality of apparatuses. In addition, the network 100 may be a network of any form. It may be, for example, intranet connection, and it also may be internet connection.

Figure 2:
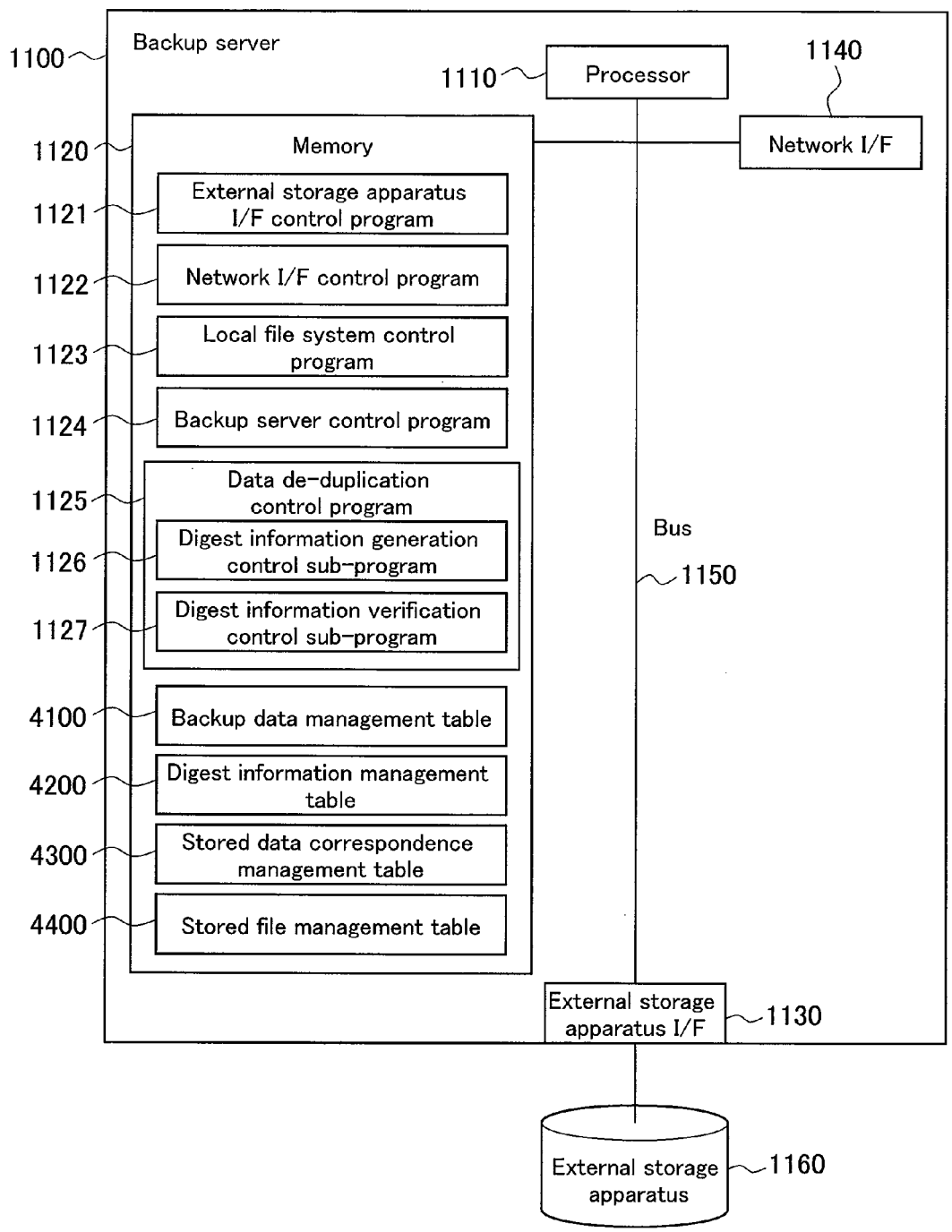
FIG. 2 is a diagram showing a hardware configuration example of a backup server.

FIG. 2 is a functional block diagram showing a hardware configuration example of the backup server 1100. The backup server 1100 comprises: a processor (CPU) 1110 that executes programs; a memory (HDD or the like) 1120 that temporarily stores programs and data; an external storage apparatus I/F (interface) 1130 for accessing an external storage apparatus 1160; a network I/F (interface) 1140 for accessing another apparatus connected via a network; and a bus 1150 connecting the above. There is stored in the memory 1120: an external storage apparatus I/F control program 1121, which is a program that controls the external storage apparatus I/F 1130; a network I/F control program 1122, which is a program that controls the network I/F 1140; a local file system control program 1123, which is a program that controls a file system for managing data on the backup server 1100; a backup server control program 1124, which is a program for providing data backup and restoring functions on the backup server 1100; a data de-duplication control program 1125, which is a program for performing de-duplication of stored data on the backup server 1100; and a backup data management table 4100, a digest information management table 4200, a stored data correspondence management table 4300, and a stored file management table 4400 that are used by the backup server control program 1124 and the data de-duplication control program 1125. Programs are loaded into memory, and processes are executed by the processor 1110.

The data de-duplication control program 1125 comprises therewithin a digest information generation control sub-program 1126 and a digest information verification control sub-program 1127. The digest information generation control sub-program 1126 performs a process where, when backup data is stored on the backup server 1100, digest information of the backup data is generated and stored in the digest information management table 4200. The digest information generation control sub-program 1126 generates digest information in accordance with a scheme prescribed in the data de-duplication control program 1125.

In addition, when a backup data storage request is made to the backup server 1100, the digest information verification control sub-program 1127 generates digest information of the data to be backed up, and performs verification against digest information of backup data already stored on the backup server 1100. If it is identified by this verification that backup data having the same digest information is already stored, de-duplication is realized by reusing the existing backup data without newly storing the data to be backed up. If it is identified that no backup data having the same digest information is stored, the backup data is newly stored. Details of the backup data management table 4100, the digest information management table 4200, the stored data correspondence management table 4300, and the stored file management table 4400 will be described later.

Figure 3:
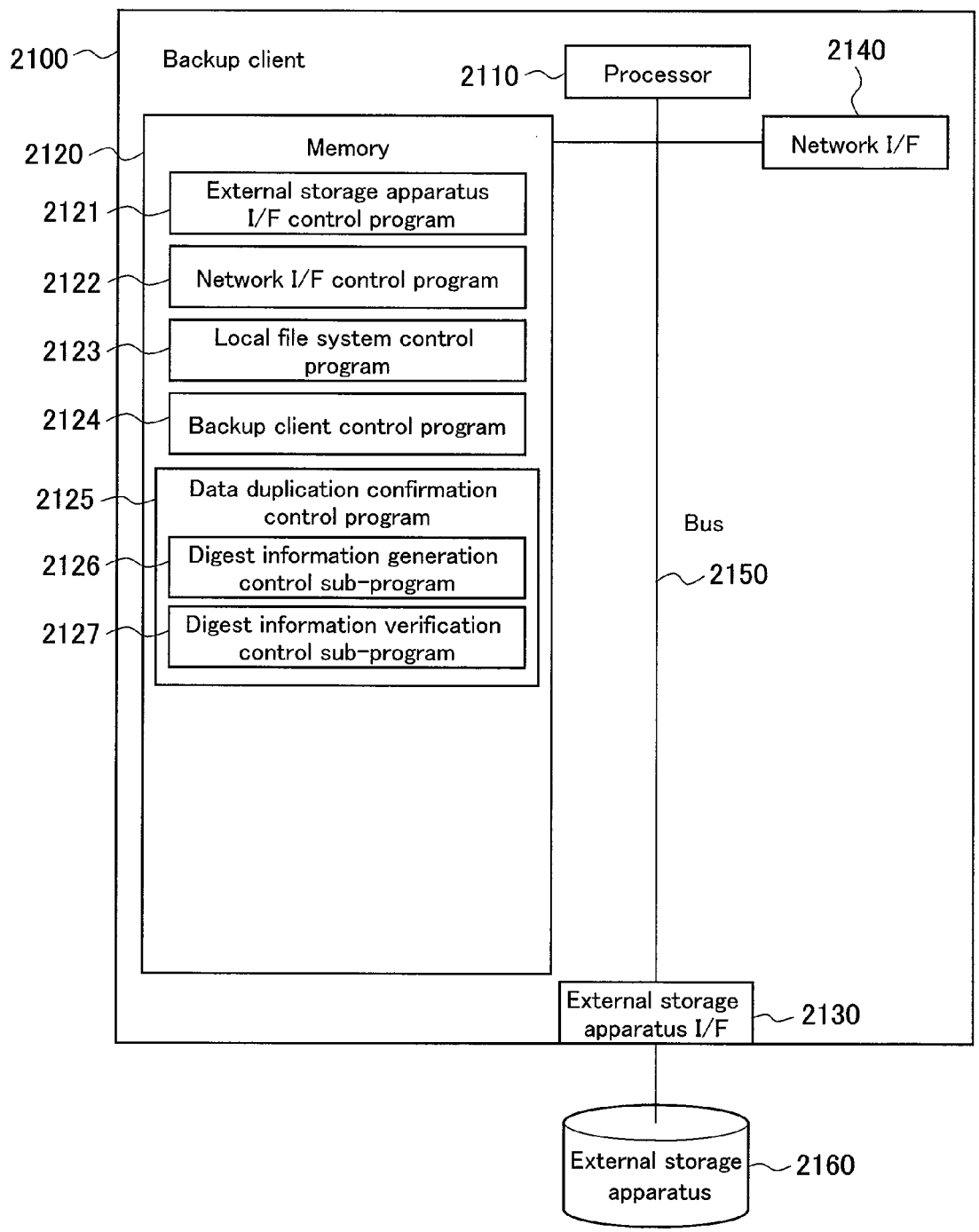
FIG. 3 is a diagram showing a hardware configuration example of a backup client.

FIG. 3 is a functional block diagram showing a hardware configuration example of the backup client 2100. The backup client 2100 comprises: a processor 2110 that executes programs; a memory 2120 that temporarily stores programs and data; and external storage apparatus I/F 2130 for accessing an external storage apparatus 2160; a network I/F 2140 for accessing another apparatus connected via a network; and a bus 2150 connecting the above.

There is stored in the memory 2120: an external storage apparatus I/F control program 2121, which is a program that controls the external storage apparatus I/F 2130; a network I/F control program 2122, which is a program that controls the network I/F 2140; a local file system control program 2123, which is a program that controls a file system for managing data on the backup client 2100; a backup client control program 2124, which is a client-side program for providing data backup and restoring functions on the backup client 2100; and a data duplication confirmation control program 2125, which is a program for performing at the backup client 2100 duplication confirmation of data to be backed up. It is noted that since other backup clients may also be of a configuration similar to that described above, descriptions thereof are omitted.

FIG. 4 is a diagram showing a configuration example of the backup data management table 4100 managed on the backup server 1100. In the backup data management table 4100 shown in FIG. 4, information that is necessary for the backup server 1100 to store backup data received from a backup client is managed. Specifically, the backup data management table 4100 comprises such components as: entry number 4110, data identifier 4120, metadata 4130, and registration/update date and time 4140.

Here, the entry number 4110 is used as a serial number for managing events where a backup request is made to the backup server 1100. In addition, the data identifier 4120 is used to uniquely identify within the backup server 1100 data to be backed up in relation to the backup request. In addition, the metadata 4130 is used to manage various information associated with the backup data. In FIG. 4, name 4131, data size 4132, and owner 4133 of respective data are shown as examples of the metadata 4130. However, various other information may also be managed as metadata of backup data. In addition, the registration/update date and time 4140 is used to store information on the date and time on/at which an entry was registered or updated in the backup data management table 4100 upon a backup request.

FIG. 5 is a diagram showing a configuration example of the digest information management table 4200 that manages digest information of backup data managed on the backup server 1100. In order to efficiently perform de-duplication of the backup data managed on the backup server 1100, digest information that is generated from the backup data is managed in the digest information management table 4200. More specifically, the digest information management table 4200 comprises such components as stored file identifier 4210, digest information 4220, digest information calculation method 4230, and registration/update date and time 4240.

Here, the stored file identifier 4210 is used at the backup server 1100 as an identifier for identifying, from among data to be backed up, those that are to be actually stored in the file system as files. In addition, the digest information 4220 is the digest information itself that is calculated from the stored files. In addition, the digest information calculation method 4230 manages information for identifying the scheme with which the digest information 4220 was calculated. In the example shown in FIG. 5, SHA-1, which is capable of calculating 160-bit hash values, is indicated as information for identifying the scheme with which the digest information was calculated.

In the data de-duplication control process, a method of generating digest information of stored data and of data to be stored may include, for example, a method that uses a fixed-length hash value generated using a one-way function. In order to calculate digest information using SHA-1, a program that implements a one-way function for generating a hash-value that is compliant with the specification of SHA-1 is used. When the one-way function used in this program is executed with the data for which digest information is to be generated is specified as input, a 160-bit hash value that is compliant with the specification of SHA-1 is outputted as digest information. Therefore, when this program is used, a hash value compliant with the specification of SHA-1 can be generated as digest information by executing the program while specifying as input the data for which digest information is to be generated.

In addition, if the data is a media file such as music data or video data, there may be used digest information that is generated by a verification method that is capable of determining if the content is the same even if the format or quality of the data is different. For example, with respect to music data of differing formats, a method that first converts the format of one of the music data to the format of the other music data and then uses a fixed-length hash value generated using the one-way function may be contemplated. Naturally, digest information may be generated not only by the methods described herein, but also by various other methods, and digest information thus generated may also be used.

In addition, the registration/update date and time 4240 is used to store, when a backup request is made and the relevant backup data is stored on the backup server 1100, information on the date and time on/at which digest information of the backup data was generated and the entry was registered or updated in the digest information management table 4200.

FIG. 6 is a diagram showing a configuration example of the stored data correspondence management table 4300 that manages, with respect to backup data managed on the backup server 1100, the correspondence relationship between data that is received from backup clients and files actually stored on the backup server 1100. Specifically, the stored data correspondence management table 4300 comprises such components as data identifier 4310 and stored file identifier 4320. Here, the data identifier 4310 is an identifier that is assigned in order to identify the respective backup data received from backup clients. The same identifier as the data identifier 4120 in the backup data management table 4100 shown in FIG. 4 may be used therefor. In addition, the stored file identifier 4210 is an identifier that is assigned in order to identify files actually stored in the file system on the backup server 1100. The same identifier as the stored file identifier 4210 in the digest information management table 4200 shown in FIG. 5 as well as stored file identifier 4210 in the stored file management table 4400, which will be described later in the description of FIG. 7, may be used therefor.

FIG. 7 is a diagram showing a configuration example of the stored file management table 4400 that manages the storage location of files actually stored in the file system of the backup server 1100 as well as the reference status of the files in connection with de-duplication. Specifically, the stored file management table 4400 comprises such components as stored file identifier 4210, file storage path name 4420, and reference count 4430. The stored file identifier 4210, as previously mentioned in the description of FIG. 6, is an identifier that is assigned in order to identify the respective backup data received from backup clients. In addition, the file storage path name 4420 is used to indicate the storage locations of the files in the file system. In addition, the reference count 4430 indicates the number of times the files are used as actual instances of a plurality of backup data. For example, if two data of the same content are backed up, instead of storing both data as files, only one of them is stored as a file, and both data reference this stored file. In this case, the value of the reference count 4430 of this stored file would be 2.

Figure 8:
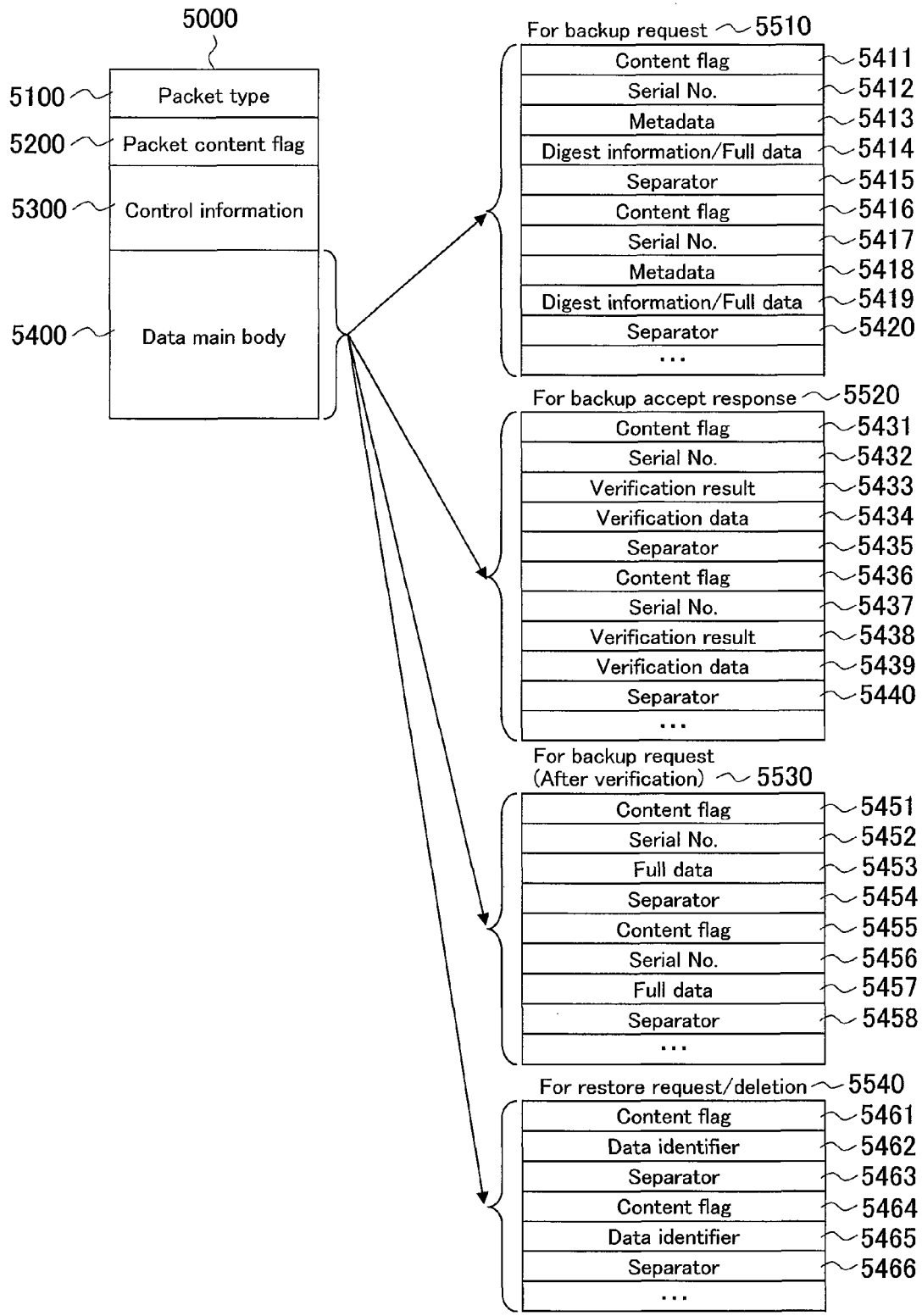
FIG. 8 is a diagram showing an example of a packet configuration.

FIG. 8 is a diagram showing a configuration example of a packet used in the communication between the backup client 2100 and the backup server 1100. A communication packet 5000 comprises, in order from the beginning thereof, such components as packet type 5100, packet content flag 5200, control information 5300, and data main body 5400. Here, the packet type 5100 is a region that stores information indicating whether the packet is a process request packet or a process response packet. The packet content flag 5200 is a region that stores information indicating the type of information stored in the packet. Examples may include "backup mode" for requesting data backup, "data list acquisition mode" for requesting the acquisition of a list of stored data, "restore mode" for requesting data restoration, "delete mode" for requesting deletion of stored data, and the like. The control information 5300 is a region that stores information that is necessary for controlling communications, information that is necessary for identifying the backup server 1100 and the backup client 2100, and the like. The data main body 5400 is a region that stores actual instances of the information exchanged through the communication packet 5000.

There are four internal configuration examples for this data main body 5400. The first example is a configuration example 5510 for when a backup request is made from the backup client 2100 to the backup server 1100. A packet configuration example of the first example comprises, in order from the beginning thereof, such components as content flags 5411 and 5416, serial numbers 5412 and 5417, metadata 5413 and 5418, digest information/full data 5414 and 5419, and separators 5415 and 5420. Here, a single data main body portion is divided into a plurality of data main body partial regions by the separators 5415 and 5420, thereby making it possible to store a plurality of data main bodies. The content flags 5411 and 5416 are regions that store information indicating the contents of the respective data main body partial regions. In the present case, there is stored information indicating "digest information transmission mode" for transmitting digest information of the backup data, or "digest information non-transmission mode" for transmitting full data of the backup data. The serial numbers 5412 and 5417 are regions that store numbers assigned on the client side in order to identify the backup data. The metadata 5413 and 5418 are regions that store information associated with the backup data.

As the second example, a configuration example 5520 for when a response is made from the backup server 1100 to the backup client 2100 will be described. The packet configuration example of the present case comprises, in order from the beginning thereof, such components as content flags 5431 and 5436, serial numbers 5432 and 5437, verification results 5433 and 5438, verification data 5434 and 5439, and separators 5435 and 5440. Here, as in the description above, a single data main body portion is divisible into a plurality of data main body partial regions by the separators 5435 and 5440. The content flags 5431 and 5436 are regions that store information indicating the contents of the respective data main body partial regions. In the second example, there is stored information indicating "full data for verification transmission mode" for transmitting full data for verification. The serial numbers 5432 and 5437 are regions that store numbers assigned on the client side in order to identify the backup data. The verification results 5433 and 5438 are regions that store information indicating verification results between the backup data and existing data stored on the backup server 1100. The verification data 5434 and 5439 are regions that are used to transmit the verification data to the client side when duplicate data is found on the side of the backup server 1100 as a result of the verification of the backup data. If there is no need to transmit verification data, this region may be left empty.

In the third example, a description is provided for a configuration example 5530 for requesting backup to the backup server 1100 after data examination has been performed at the backup client 2100. The packet configuration of the third example comprises, in order from the beginning thereof, such components as content flags 5451 and 5455, serial numbers 5452 and 5456, full data 5453 and 5457, and separators 5454 and 5458. Here, as in the description above, a single data main body portion is divisible into a plurality of data main body partial regions by the separators 5454 and 5458. The content flags 5451 and 5455 are regions that store information indicating the contents of the respective data main body partial regions. In the present case, there is stored information indicating "data transmission mode" for transmitting full data of backup data, or "data non-transmission mode" for non-transmission of the full data of the backup data. The serial numbers 5452 and 5456 are regions that store numbers assigned on the client side in order to identify the backup data. The full data 5453 and 5457 are regions that, when there is a need to transmit relevant backup data, are used to store such data. If data transfer is unnecessary, these regions may be left empty.

In the fourth example, a description is provided for a configuration example 5540 for making a restore request or a backup data delete request to the backup server 1100 from the backup client 2100. The packet configuration of the fourth example comprises, in order from the beginning thereof, such components as content flags 5461 and 5464, data identifiers 5462 and 5465, and separators 5463 and 5466. Here, as in the description above, a single data main body portion is divisible into a plurality of data main body partial regions by the separators 5463 and 5466. The content flags 5461 and 5464 are regions that store information indicating the contents of the respective data main body partial regions. In the present case, there is stored information indicating "restore mode" for transmitting a backup data restore request, or "delete mode" for transmitting a backup data delete request. The data identifiers 5462 and 5465 are regions that store identifiers for identifying the backup data to be manipulated.

It is noted that in the case of acquiring a list of backup data, the data main body 5400 of the request packet may be left empty. The requested list information is later stored in the data main body 5400 of the response packet.

Configuration examples of the system, configuration examples of the management information, and configuration examples of the transmitted/received packets that are provided by the present embodiment have been described above. Process schemes realized by the present embodiment are described below. Here, there are described: a backup request process at the backup client 2100 (FIG. 9); a backup accept process at the backup server 1100 (FIG. 10 and FIG. 11); a restore request process at the backup client 2100 (FIG. 12); a restore accept process at the backup server 1100 (FIG. 13 and FIG. 14), a backup data delete request process at the backup client 2100 (FIG. 15); and a backup data delete accept process at the backup server 1100 (FIG. 16).

Figure 9:
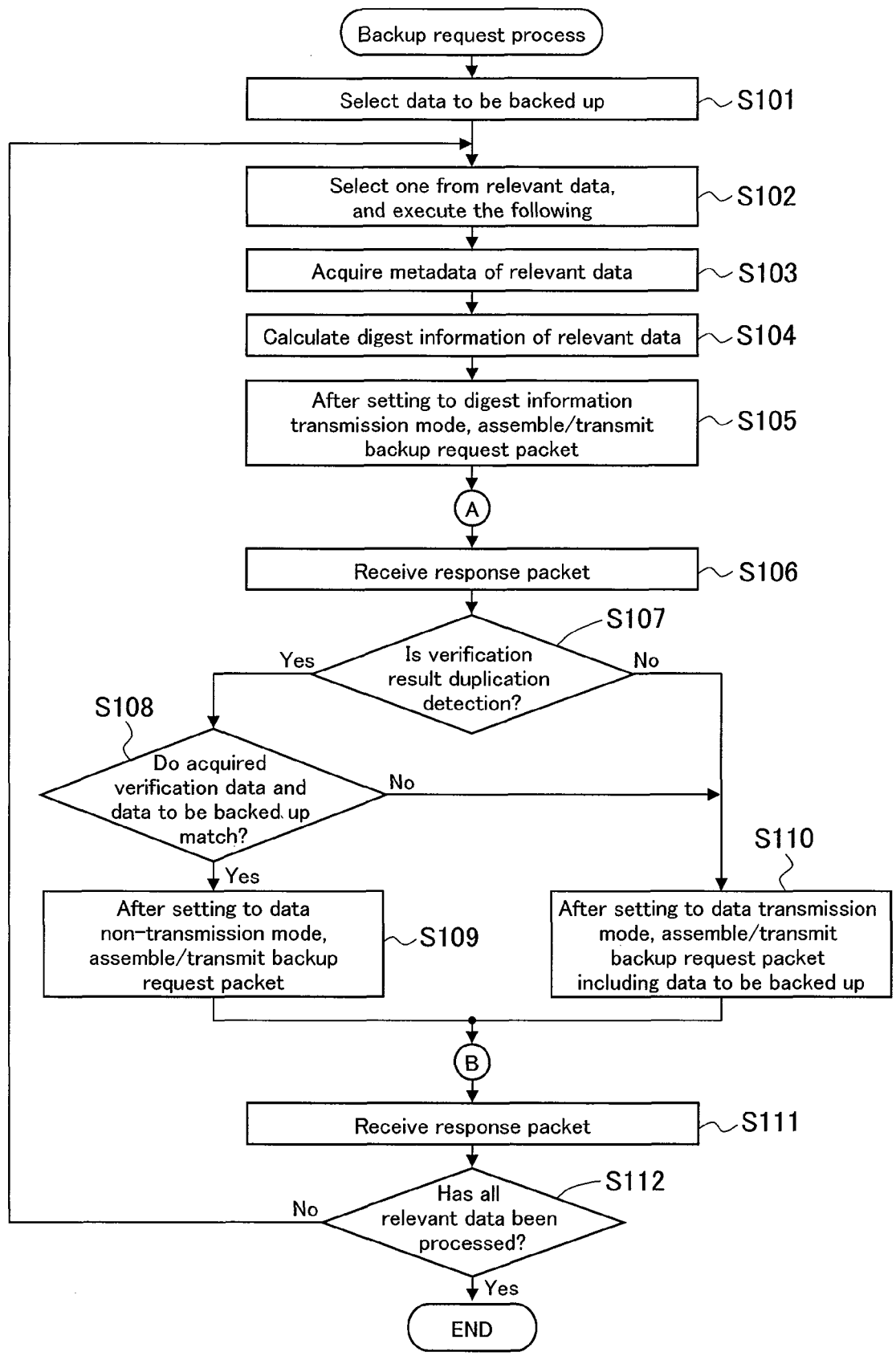
FIG. 9 is a flowchart showing the flow of a backup request process.

FIG. 9 is a flowchart showing the flow of a series of steps in a backup request at the backup client 2100 as an example of a data management process according to the present embodiment. First, from among data groups stored within itself, the backup client 2100 selects data to be backed up (step S101). Next, from among the selected data, one data is arbitrarily selected (step S102), and the process below is executed.

First, metadata of the selected data is acquired for backup (step S103). Next, digest information of the selected data is calculated by the prescribed scheme indicated in FIG. 5 (step S104). Next, after being set to digest information transmission mode, a backup request packet is assembled and transmitted to the backup server 1100 (step S105). The process on the side of the backup server 1100 will be described later as process A with reference to FIG. 10. After a response packet from the backup server 1100 is received (step S106), a verification result field in the response packet is referenced and it is checked whether or not information indicating duplication detection is stored (step S107). If there is information indicating duplication detection (Yes), verification data would also be stored in the response packet. Therefore, it is checked whether or not the verification data and the data to be backed up match (step S108). If they match (Yes), the data to be backed up is not transmitted since it has been confirmed that the same data as the data to be backed up is already stored on the backup server 1100. A backup request packet is assembled and transmitted after being set to data non-transmission mode (step S109). The process on the side of the backup server 1100 will be described later as process B with reference to FIG. 11. After a response packet is received from the backup server 1100 (step S111), it is checked whether or not all of the data that was selected this time in process step S101 has been processed (step S112). If all has been processed (Yes), the process is terminated. If not all has been processed (No), returning to process step S102, the process is repeated.

In addition, at process step S107, if no information indicating duplication detection is stored (No), it is necessary to send to the backup server 1100 the data to be backed up. Here, a backup request packet is assembled and transmitted after being set to data transmission mode (step S110). Thereafter, the process on the side of the backup server 1100 is as previously described. In addition, if the verification data and the data to be backed up do not match in process step S108, it is necessary to send to the backup server 1100 the data to be backed up. Here, process step S110 mentioned above is executed.

Figure 10:
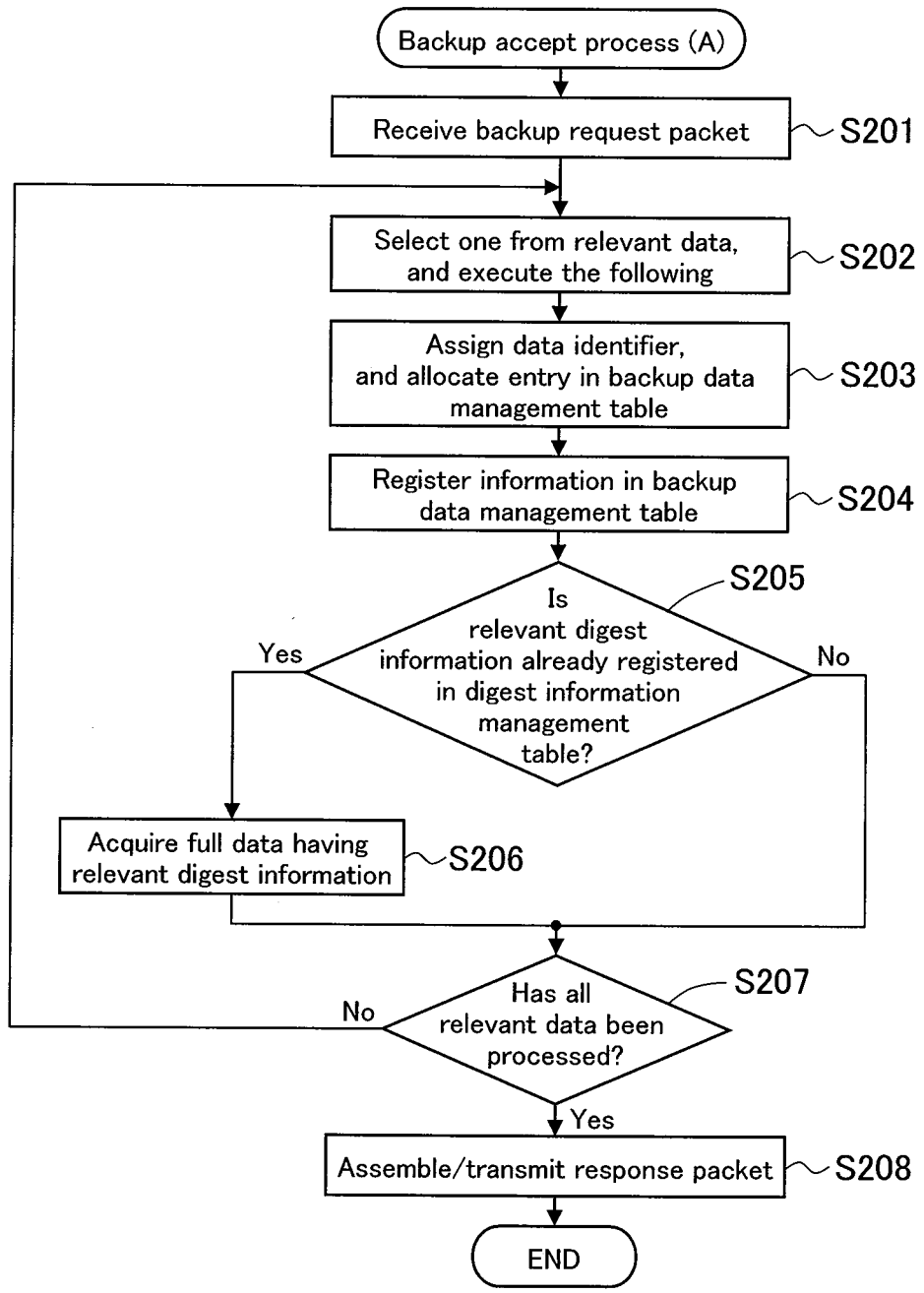
FIG. 10 is a flowchart showing the process flow of the first half portion of a backup accept process.

FIG. 10 is a flowchart showing the flow of the first half of the process in backup accept at the backup server 1100. The process flow shown here corresponds to the portion indicated as process A in FIG. 9. The portion indicated as process B will be described with reference to FIG. 11.

As shown in FIG. 10, first, a backup request packet transmitted from the backup client 2100 is received (step S201). Next, one data is selected from among the packet (step S202), and the following process is executed.

First, a data identifier 4120 is newly assigned to the selected data, and an entry in the backup data management table 4100 is allocated (step S203). Next, such information as metadata relating to the selected data is registered in the entry allocated in the backup data management table 4100 (step S204). Next, it is checked whether or not the same digest information as the digest information of the selected data is registered in the digest information management table 4200 on the backup server 1100 (step S205). If the same digest information is registered (Yes), the full data having this digest information is acquired (step S206). Here, the relevant full data is acquired by acquiring from the digest information management table 4200 the stored file identifier 4210 having the relevant digest information 4220, checking the stored file management table 4400, and acquiring the file storage path name 4420 corresponding to the relevant stored file identifier 4210. Then, it is checked whether or not all relevant data stored in the backup request packet has been processed (step S207). If all has been processed (Yes), a response packet containing the current verification result and, if present, full data for verification is assembled and transmitted (step S208), and the process is terminated. If not all has been processed (No), returning to process step S202, the process is repeated.

In addition, at process step S205, if no digest information that is identical to the digest information of the selected data is registered (No), the process proceeds directly to process step S207. In this case, the verification result in the response packet is set to no duplication detection, and no full data for verification is transmitted.

Figure 11:
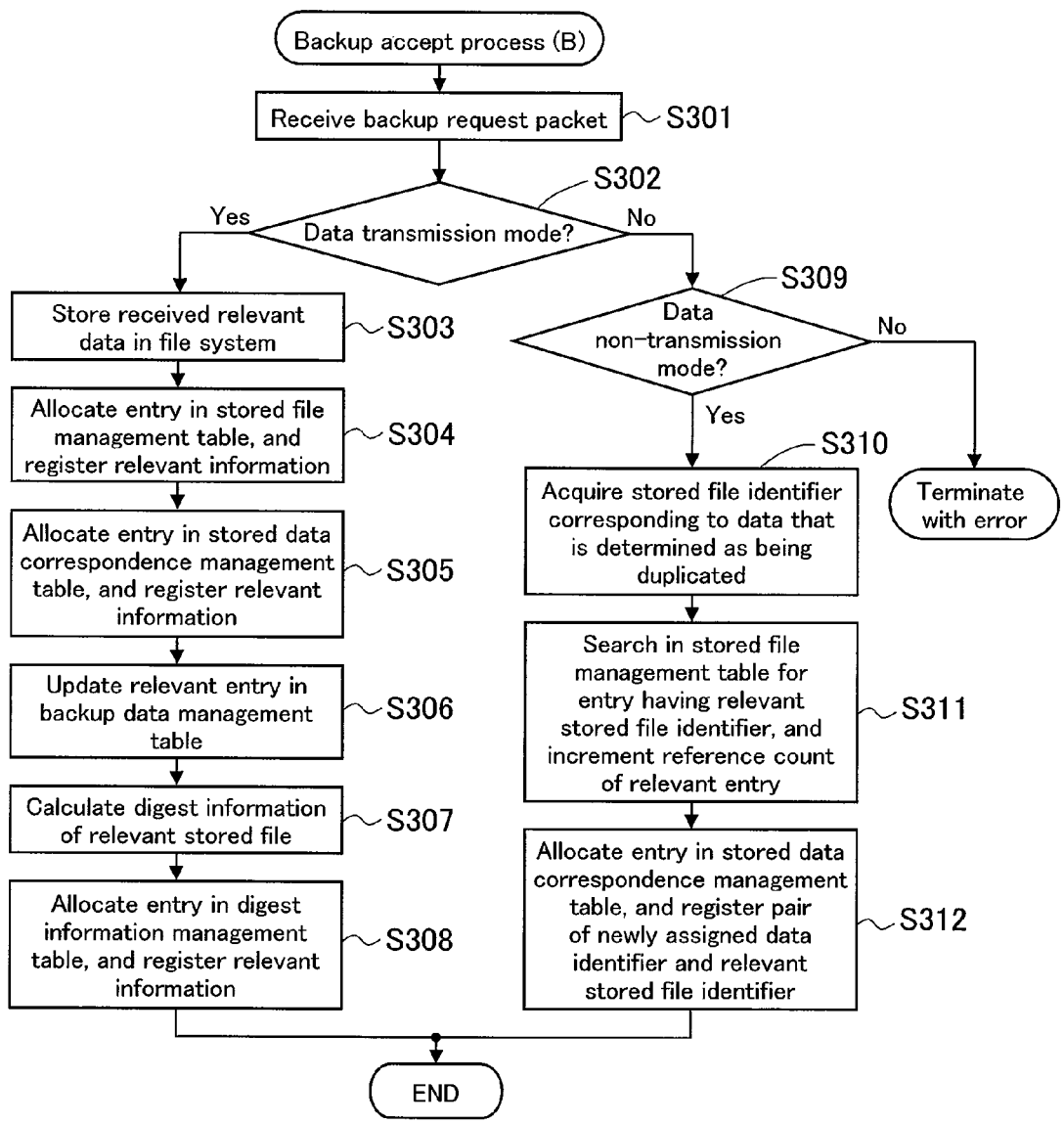
FIG. 11 is a flowchart showing the process flow of the latter half portion of a backup accept process.

FIG. 11 is a flowchart showing the flow of the latter half of the process of backup accept at the backup server 1100. The process flow shown here corresponds to the portion indicated as process B in FIG. 9.

First, a backup request packet transmitted from the backup client 2100 is received (step S301). Next, the content flag 5451 of the packet is checked, and it is checked whether or not it is set to data transmission mode (step S302). If so set (Yes), the backup server 1100 stores the relevant data stored in the received request packet in its file system (step S303). Then, an entry is allocated in the stored file management table 4400, and information on the relevant data that has just been stored in the file system is registered (step S304). Then, an entry is allocated in the stored data correspondence management table 4300, and the stored filed identifier 4210 of the relevant data and the data identifier 4120 assigned in process step S203 previously described in FIG. 10 are registered (step S305). Then, in the backup data management table 4100, information in the entry allocated in process step S203 of FIG. 10 is updated (step S306). Then, digest information of the relevant stored file is calculated (step S307). Here, the prescribed scheme is used for the method of calculating digest information. Then, an entry is allocated in the stored file 4400, and the stored file identifier 4210, the file storage path name 4420, and the reference information count method 4430 are registered as related information (step S308). After the process above, a response packet is transmitted to the backup client 2100, and the process is terminated.

In addition, at process step S302, if the content flag 5451 is not set to data transmission mode (No), the content flag 5451 of the packet is similarly checked, and it is checked whether or not it is set to data non-transmission mode (step S309). If it is not so set (No), the process is terminated with an error. If it is so set (Yes), it would be a case where it has been determined on the side of the backup client 2100 that the verification data and the data to be backed up are duplicated. In such a case, the stored file identifier 4210 of the relevant data that has been determined as being duplicated is acquired from the digest information management table 4200 (step S310). Then, the entry having this stored file identifier 4210 is searched for in the stored file management table 4400, and the reference count 4430 of this entry is incremented (step S311). Then, an entry is newly allocated in the stored data correspondence management table 4300, and the pair of the data identifier 4120 newly assigned in process step S203 in FIG. 9 and the stored file identifier 4210 is registered (step S312). After the process above, a response packet is transmitted to the backup client 2100, and the process is terminated.

Figure 12:
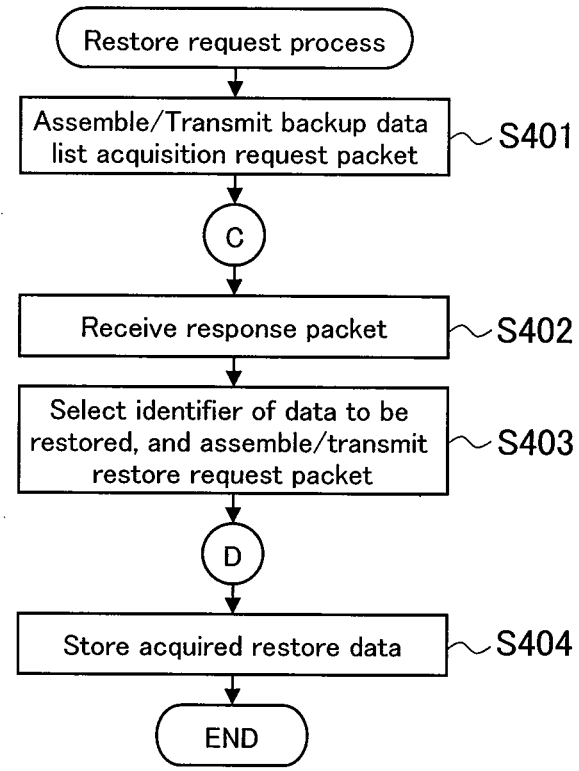
FIG. 12 is a flowchart showing an example of a restore request process.

FIG. 12 is a flowchart showing the flow of a series of steps in a restore request at the backup client 2100. First, at the backup client 2100, in order to acquire list information of backup data stored on the backup server 1100, a backup data list acquisition request packet is assembled and transmitted (step S401). In this backup data list acquisition request packet, information indicating data list acquisition mode is stored in the field of the packet content flag 5200. The process on the side of the backup server 1100 will be described later as process C with reference to FIG. 13. After a response packet from the backup server 1100 is received (step S402), data identifier(s) of data to be restored is/are selected based on the acquired data list information, and a restore request packet is assembled and transmitted (step S403). In this restore request packet, information indicating restore mode is stored in the field of the packet content flag 5200. The process on the side of the backup server 1100 will be described later as process D with reference to FIG. 14. After a response packet from the backup server 1100 is received, the acquired restore data is stored in the file system of the backup client 2100 itself (step S404).

Figure 13:
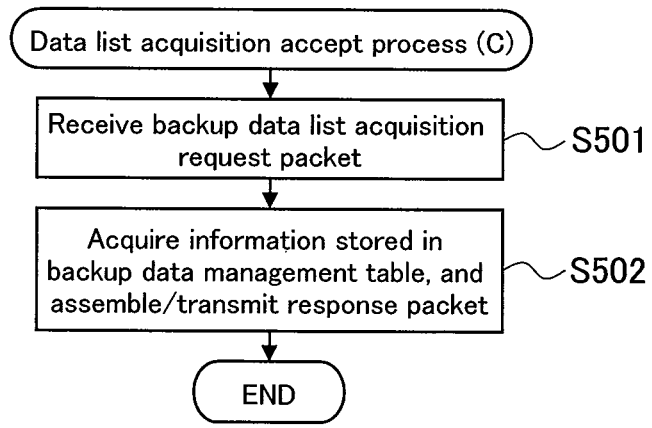
FIG. 13 is a flowchart showing an example of a data list acquisition accept process.

FIG. 13 is a flowchart showing the flow of an accept process at the backup server 1100 in response to a backup data list request. The process flow shown here corresponds to the portion indicated as process C in FIG. 12. First, a backup data list acquisition request packet transmitted from the backup client 2100 is received (step S501). Next, the packet content flag 5200 of the packet is checked. After it is confirmed that it is a backup data list acquisition request, the whole set of information stored in the backup data management table 4100 is acquired, and a response packet is then assembled and transmitted (step S502).

Figure 14:
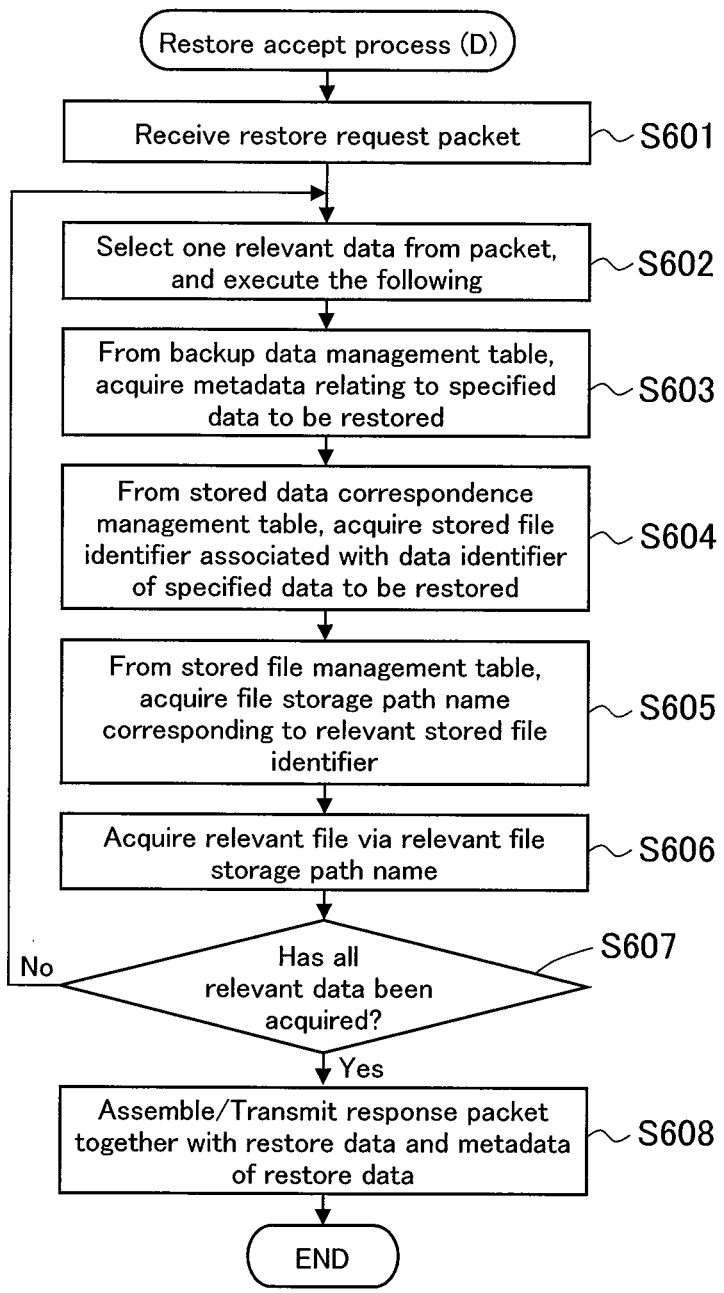
FIG. 14 is a flowchart showing an example of a restore accept process.

FIG. 14 is a flowchart showing the flow of an accept process at the backup server 1100 in response to a restore request. The process flow shown here corresponds to the portion indicated as process D in FIG. 12. First, a restore request packet transmitted from the backup client 2100 is received (step S601). Next, one relevant data is selected from among the packet (step S602), and the following process is executed. First, based on the data identifier 4120 of the received selected data, the metadata 4130 related to the specified data to be restored is acquired from the backup data management table 4100 (step S603). Then, the stored file identifier 4210 that is associated with the data identifier 4120 of the specified data to be restored is acquired from the stored data correspondence management table 4300 (step S604). Then, the file storage path name 4420 corresponding to the relevant stored file identifier 4210 is acquired from the stored file management table 4400 (step S605). Then, the file to be restored is acquired via the file storage path name 4420 (step S606). Then, it is checked whether or not all relevant data stored in the restore request packet has been processed (step S607). If all has been processed (Yes), a response packet is assembled with the restore data and the metadata of the restore data and is transmitted (step S608), and the process is terminated. The response packet created here has the same configuration as the backup request packet 5510. However, the serial numbers 5412 and 5417 are set to numbers that are assigned on the side of the backup server 1100. At process step S607, if not all has been processed (No), returning to process step S602, the process is repeated.

Figure 15:
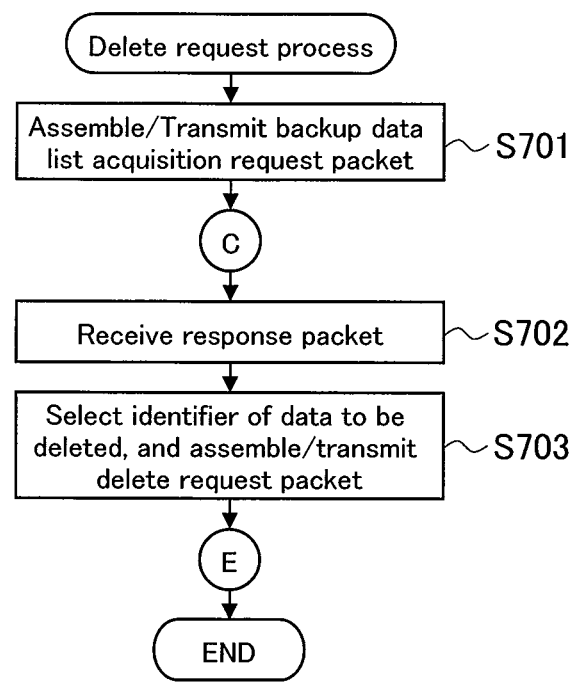
FIG. 15 is a flowchart showing an example of a delete request process.
Figure 16:
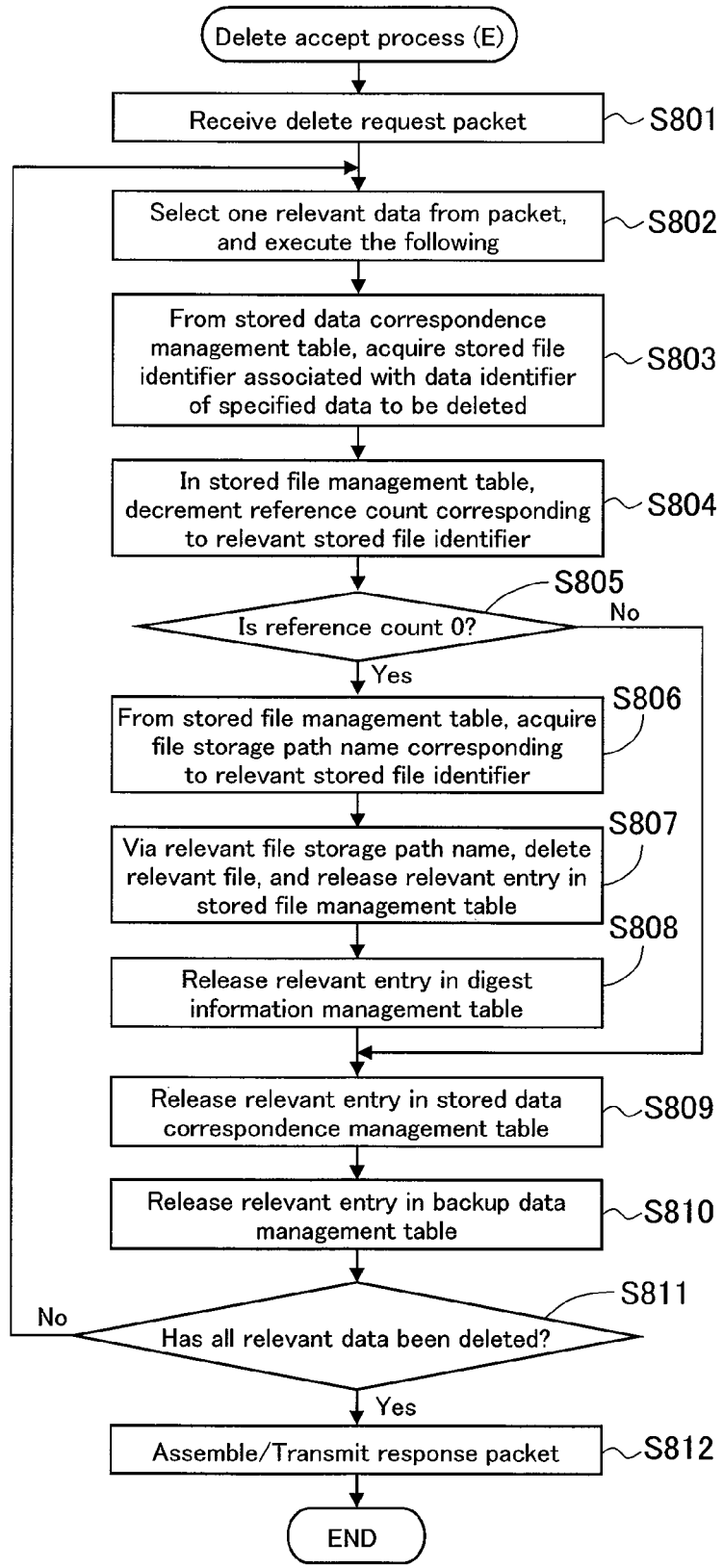
FIG. 16 is a flowchart showing an example of a delete accept process.

FIG. 15 is a flowchart showing the flow of a series of steps in a backup data delete request at the backup client 2100. First, at the backup client 2100, in order to acquire list information of backup data stored on the backup server 1100, a backup data list acquisition request packet is assembled and transmitted (step S701). In this backup data list acquisition request packet, information indicating data list acquisition mode is stored in the field of the packet content flag 5200. The process on the side of the backup server 1100 is the same as that described as process C with reference to FIG. 13. After a response packet from the backup server 1100 is received (step S702), data identifier(s) of data to be deleted is/are selected based on the acquired data list information, and a delete request packet is assembled and transmitted (step S703). In this delete request packet, information indicating delete mode is stored in the field of the packet content flag 5200. The process on the side of the backup server 1100 will be described later as process E with reference to FIG. 16. After a response packet from the backup server 1100 is received, the process is terminated.

FIG. 16 is a flowchart showing the flow of an accept process at the backup server 1100 in response to a delete request. The process flow shown here corresponds to the portion indicated as process E in FIG. 15. First, a backup data delete request packet transmitted from the backup client 2100 is received (step S801). Next, one relevant data is selected from among the packet (step S802), and the following process is executed. First, based on the data identifier 4120 of the received selected data, the stored file identifier 4210 associated with the data identifier 4120 of the specified data to be deleted is acquired from the stored data correspondence management table 4300 (step S803). Then, in the stored file management table 4400, the reference count 4430 corresponding to this stored file identifier 4210 is decremented (step S804). Then, in the stored file management table 4400, it is checked whether or not the value of the reference count 4430 corresponding to this stored file identifier 4210 has reached 0 (step S805). If it has reached 0 (Yes), the file storage path name 4420 corresponding to this stored file identifier 4210 is acquired from the stored file management table 4400 (step S806). Then, the relevant file is deleted via this file storage path name 4420, and this entry in the stored file management table 4400 is released (step S807). Then, in the digest information management table 4200, the entry having this stored file identifier 4210 is identified, and this entry is released (step S808). Then, in the stored data correspondence management table 4300, the entry having the data identifier 4120 of the data to be deleted is identified, and this entry is released (step S809). Then, in the backup data management table 4100, the entry having the data identifier 4120 of the data to be deleted is identified, and this entry is released (step S810). Then, it is checked whether or not all relevant data stored in the delete request packet has been processed (step S811). If all has been processed (Yes), a response packet is assembled with the delete result and is transmitted (step S812), and the process is terminated. At process step S811, if not all has been processed (No), returning to process step S802, the process is repeated.

In addition, at process step S805, if the value of the reference count 4430 has not reached 0 (No), the process skips to process step S809, and thereafter, a process similar to that described above is performed.

As described above, according to the present embodiment, in data duplication detection at a server using digest information, data loss in cases where a collision of digest information has occurred can be prevented. This is because by sending to the user who made a data storage request existing stored data that has been determined as being duplicated by way of digest information, and then performing an examination with respect to the data that this user was requesting to send to the server, it becomes possible to actually determine also on the user side whether or not the relevant data is duplicate. As a result, there is an advantage where even if a collision of the digest information were to occur, data loss due thereto can be prevented.

Second Embodiment

Next, the second embodiment of the present invention is described. In the first embodiment described above, a description was provided with respect to an embodiment in which data to be backed up is sent from the backup clients 2100, 2200 to the backup server 1100. However, it does not go so far as to consider a case in which a backup server acquires the data to be backed up from somewhere other than the backup client that transmitted the backup request. For example, the backup server may also separately acquire the data to be backed up from a server from which the data to be backed up was originally acquired. As such, described below is a control scheme where a backup server acquires data to be backed up from another server from which a backup client originally acquired the data to be backed up.

Here, the server from which a backup client acquired the data to be backed up will be referred to as the original server. In such a case, in order to enable acquisition of the data to be backed up from the original server, it is necessary for the backup client to communicate, as information from when the data to be backed up was acquired, to the backup server information on the original server, as well as information that is required in order to access the original server.

Changes to the system configuration, the backup data management table, the packet configuration, and the content of the backup process that are necessary in order to separately acquire data to be backed up from an original server instead of a backup client as described above are described with reference to FIGS. 17, 18, 19, 20, 21, 22, and 23.

Figure 17:
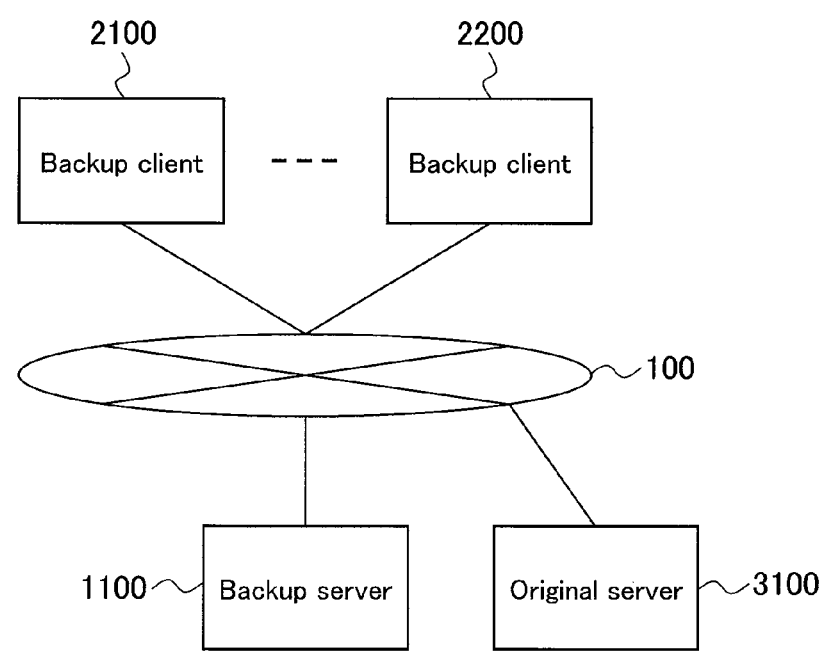
FIG. 17 is a functional block diagram showing a configuration example of an internet backup system according to the second embodiment of the present invention.

FIG. 17 is a functional block diagram showing changes to the system configuration shown in FIG. 1. With respect to the system configuration shown in FIG. 1, an original server 3100 is additionally connected to the network 100, and is made accessible from each of the backup clients 2100 and 2200, as well as the backup server 1100 connected to the network 100. Further description continues below on the assumption that the backup clients 2100 and 2200 have acquired respective data to be backed up from the original server 3100 in advance.

Figure 18:
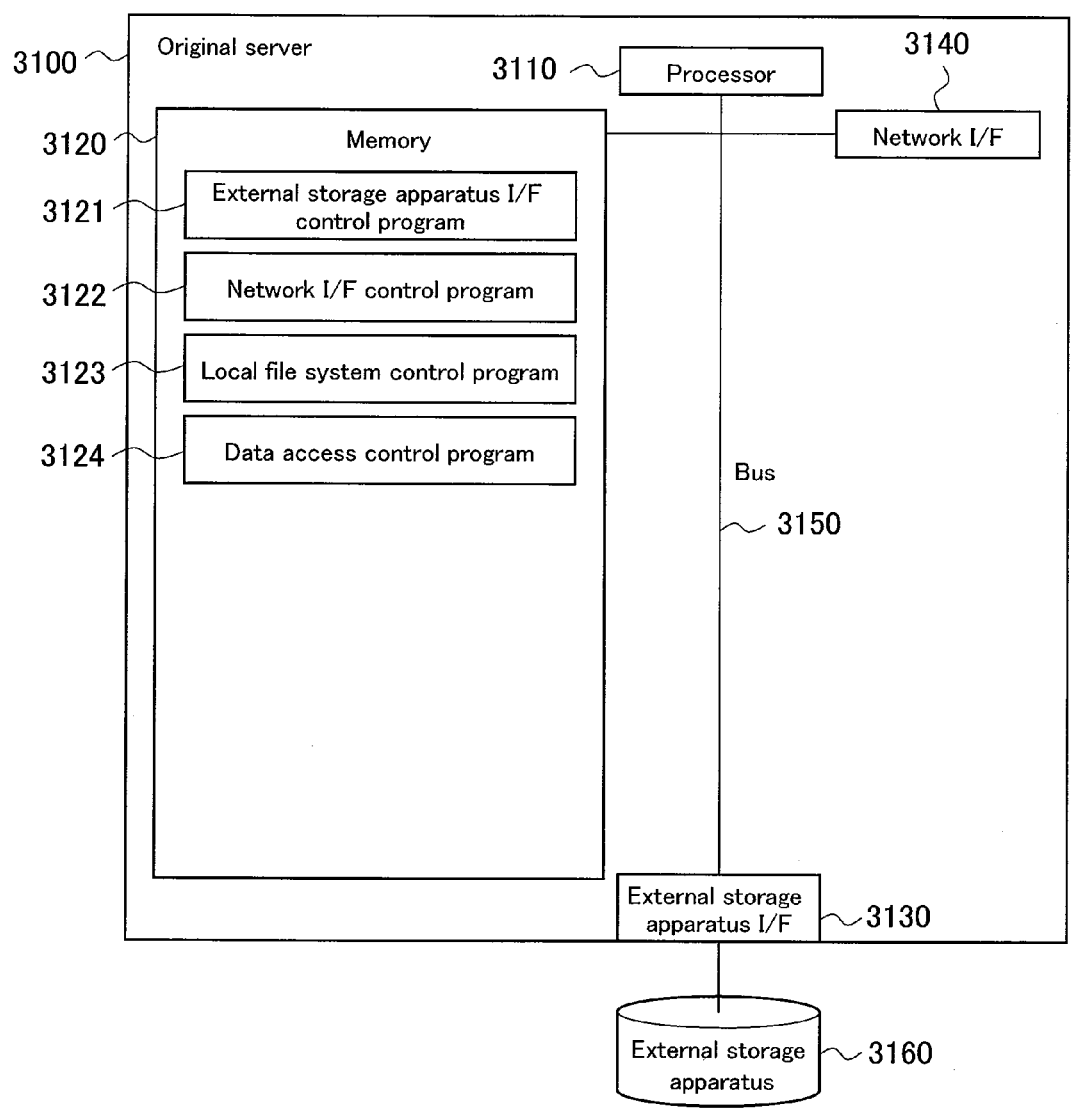
FIG. 18 is a diagram showing a hardware configuration example of an original server according to the second embodiment of the present invention.

FIG. 18 is a functional block diagram showing a hardware configuration example of the original server 3100. The original server 3100 comprises: a processor 3110 that executes programs; a memory 3120 that temporarily stores programs and data; an external storage apparatus I/F 3130 for accessing an external storage apparatus 3160; a network I/F 3140 for accessing another apparatus connected via a network; and a bus 3150 connecting the above. There is stored in the memory 3120: an external storage apparatus I/F control program 3121, which is a program that controls the external storage apparatus I/F 3130; a network I/F control program 3122, which is a program that controls the network I/F 3140; a local file system control program 3123, which is a program that controls a file system for managing data on the original server 3100; and a data access control program 3124, which is a program for providing a data access function on the original server 3100.

FIG. 19 is a diagram showing changes to the backup data management table 4100 shown in FIG. 4. The point that has changed from FIG. 4 is that the following two entries have been newly added. The first additional information is original server information 4150. When information on the server from which the data to be backed up was acquired is sent from the backup client 2100 to a backup server, this entry is used to store this information (svrA, svrB, and the like). The second additional information is access information 4160 for original server. Similar to the original server information 4150, when information that was required in order to access the data to be backed up is received from the backup client 2100, this entry is used to store this information. For example, this may include user account information (data1@taro, etc.) for the original server 3100.

Figure 20:
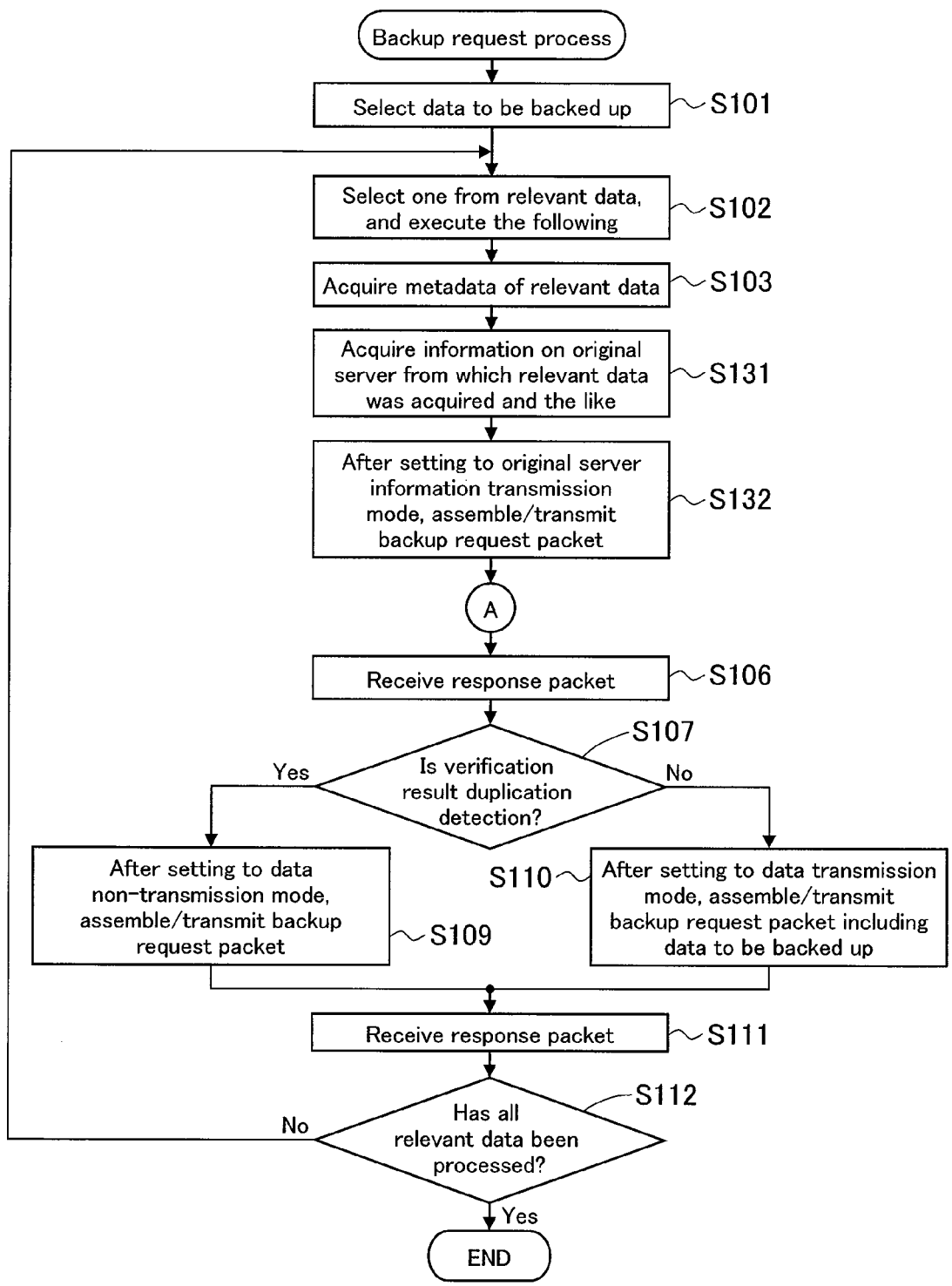
FIG. 20 is a flowchart showing the flow of a backup request process according to the second embodiment of the present invention.

FIG. 20 is a diagram showing changes to the flowchart of the backup request process shown in FIG. 9. Three points are changed from FIG. 9 as follows. The first change is that instead of process step S104 in FIG. 9, the original server information 4150 and the access information 4160 for original server are acquired as information relating to the original server 3100 from which the data to be backed up was acquired. With respect to the latter access information 4160 for original server, the whole set of information required for accessing the data to be backed up is included (step S131). The second change is that instead of process step S105 in FIG. 9, a backup request packet is assembled and transmitted to the backup server 1100 after being set to original server information transmission mode (step S132). The setting of the original server information transmission mode performed here is set in the regions of the content flags 5411 and 5416 in a backup request packet 5550 described later. The third change is that, whereas in FIG. 9 the process of process step S108 was performed when Yes was selected at the conditional branch of process step S107, the process of this process step S108 is not performed in FIG. 20.

Figure 21:
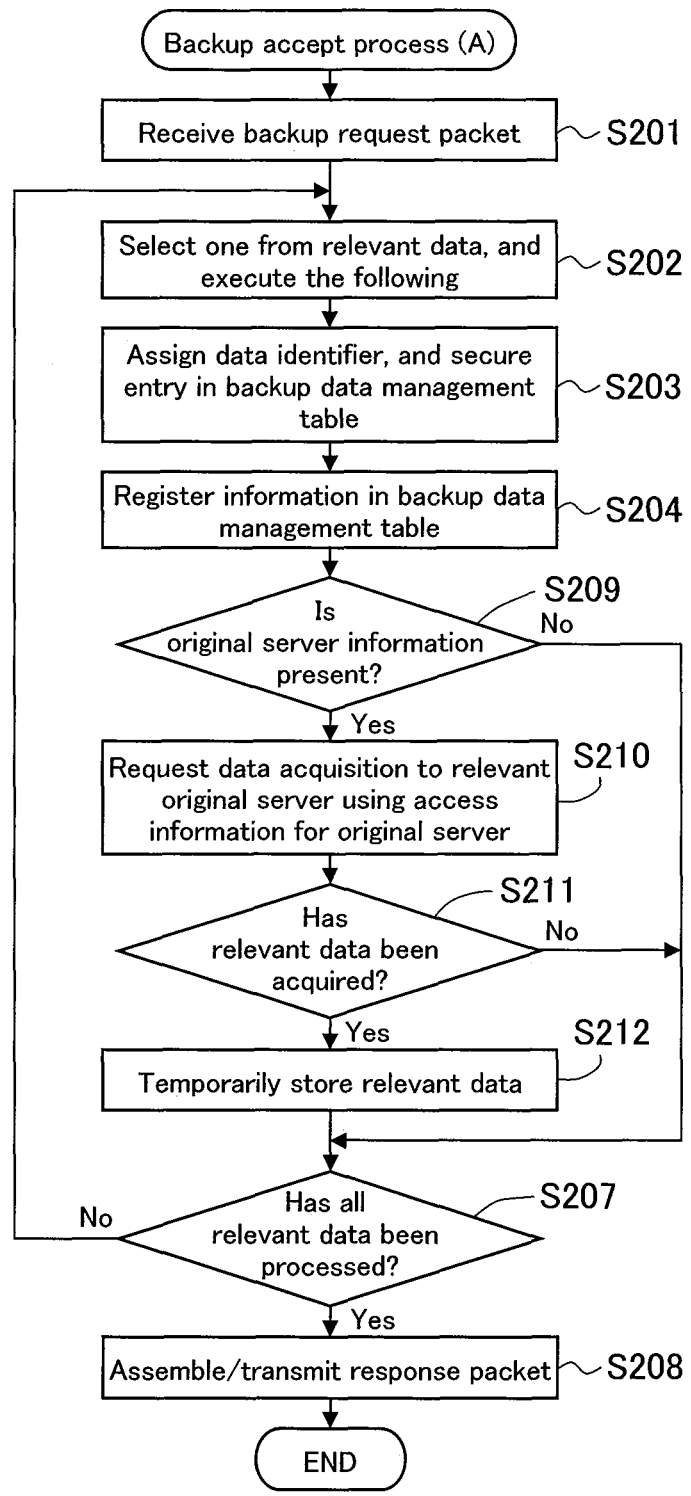
FIG. 21 is a flowchart showing the first half portion of a backup accept process according to the second embodiment of the present invention.

FIG. 21 shows changes to the backup accept process shown in FIG. 10. The changes from FIG. 10 are as follows.

Whereas in FIG. 10 the process of process step S205 was performed in the process subsequent to process step S204, in FIG. 21, instead of process step S205, the process from process step S209 to process step S212 described below is performed. First, it is confirmed whether or not the original server information 4150 is stored in the backup request packet received from the backup client 2100 (step S209). If the original server information 4150 is not stored (No), the process proceeds to process step S207 in order to have this data sent from the backup client 2100. If the original server information 4150 is stored (Yes), then, using the access information 4160 for original server that is stored therewith, data acquisition is requested to the original server 3100 (step S210). Next, it is checked whether or not it was possible to acquire this data (step S211). If it was not possible to acquire this data (No), the process proceeds to process step S207 in order to have this data sent from the backup client 2100. If it was possible to acquire this data (Yes), then the data to be backed up is temporarily stored on the backup server 1100 (step S212). Here, the temporarily stored data is used for such purposes as verification in order to detect duplication and the like. After process step S212 of temporary storage, the process proceeds to process step S207.

Figure 22:
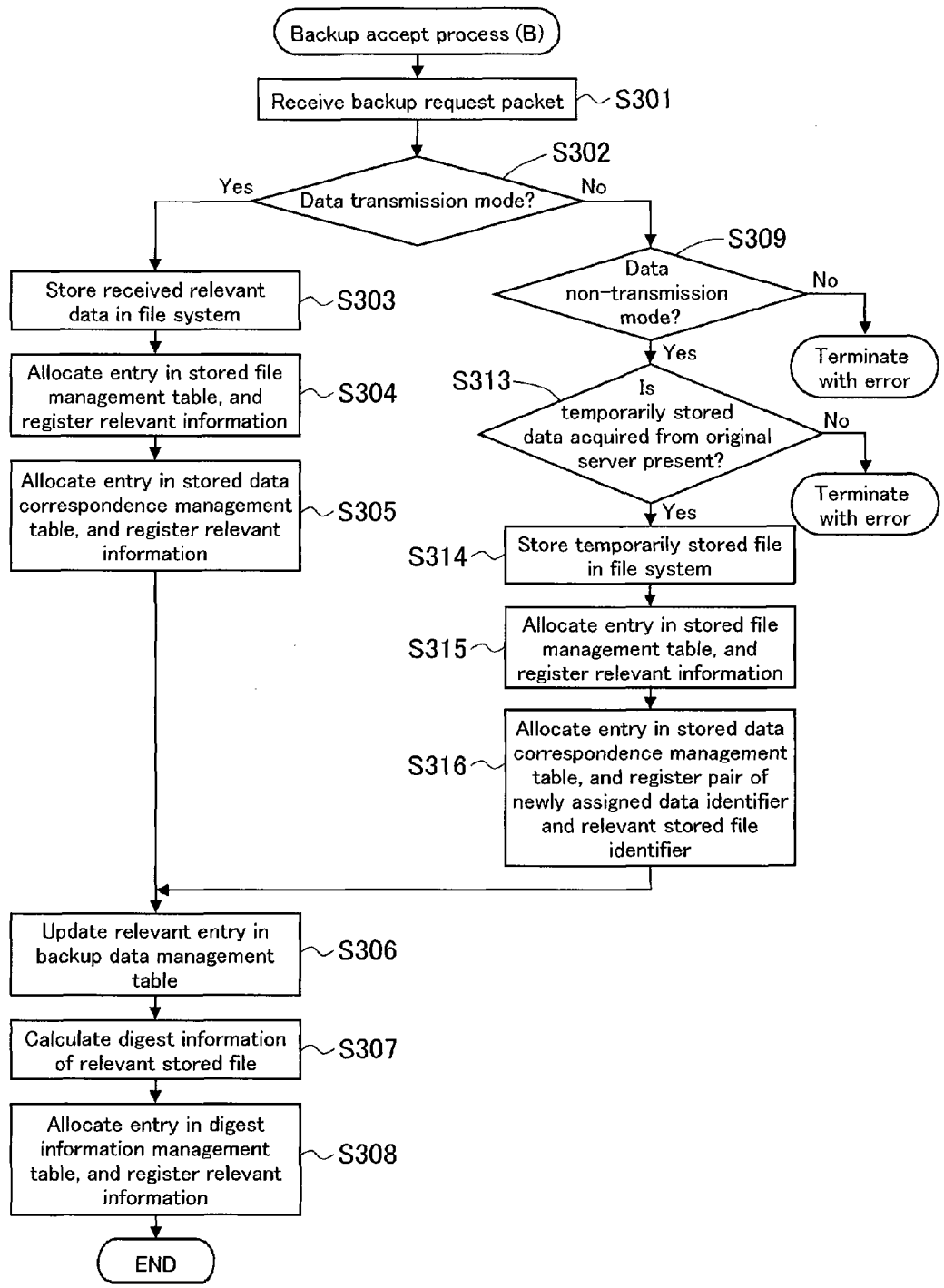
FIG. 22 is a flowchart showing the latter half portion of a backup accept process according to the second embodiment of the present invention.

FIG. 22 is a diagram showing changes to the backup accept process shown in FIG. 11. The changes are as follows. In the process subsequent to process step S309, whereas in FIG. 11 the process of process step S310 was performed, in FIG. 22, the process from process step S313 to process step S316 described below is performed instead.

First, at the backup server 1100, it is checked whether or not the data temporarily stored in process step S212 in FIG. 21 exists (step S313). If it does not exist (No), the process is terminated with an error. If it does exist (Yes), the relevant temporarily stored data is stored in the file system on the backup server 1100 (step S314). Then, an entry in the stored file management table 4400 is allocated, and information on the relevant data that was just stored in the file system is registered (step S315). Then, an entry in the stored data correspondence management table 4300 is allocated, and the stored file identifier 4210 of the relevant data and the data identifier 4120 that was assigned in process step S203 in FIG. 21 are registered (step S316). Then, the process proceeds to process step S306, and the same process as in FIG. 11 is performed.

Figure 23:
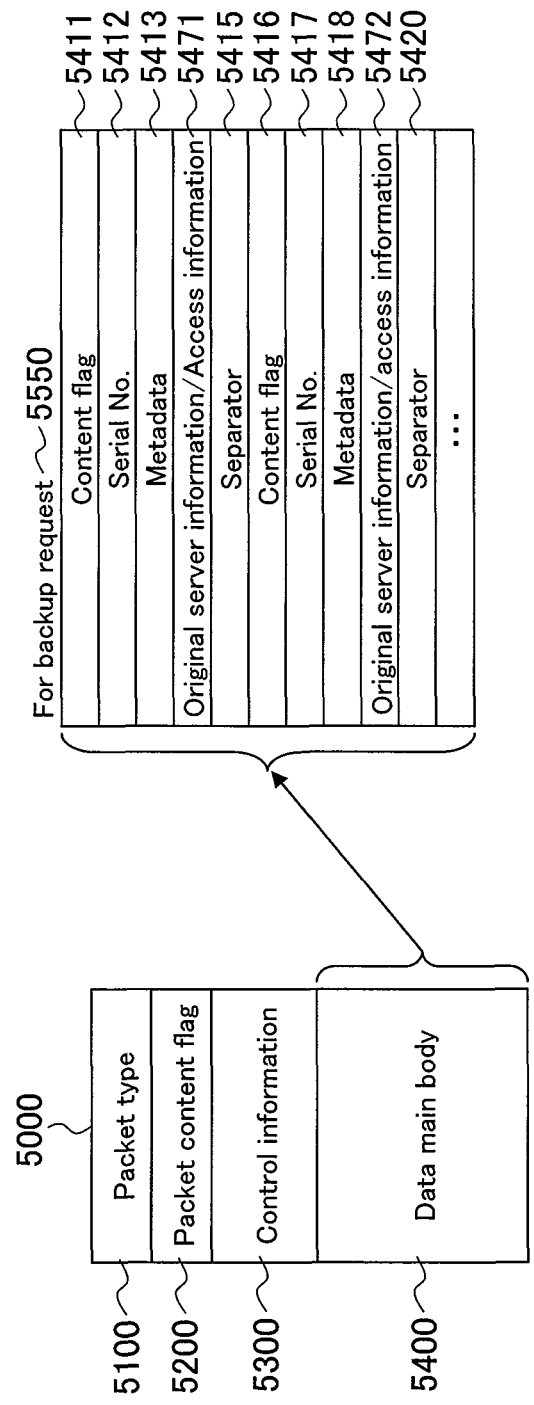
FIG. 23 is a diagram showing a configuration example of a packet according to the second embodiment of the present invention.

FIG. 23 is a diagram showing a configuration example including changes to the packet configuration shown in FIG. 8. The changes are as follows. Instead of the backup request packet 5510 shown in FIG. 8, the backup request packet 5550 is used. In the backup request packet 5550, instead of the entries of the digest information/full data 5414 and 5419 that were present in the backup request packet 5510, there are provided entries of original server information/access information 5471 and 5472. These entries are used to store the original server information 4150, which is used to identify the original server 3100 used in the present embodiment, as well as the access information 4160 for original server, which is necessary in order to access the relevant data via the original server 3100.

As described above, the present embodiment is advantageous in that, even in cases where a backup server acquires data to be backed up from a different server from which a backup client originally acquired the data to be backed up, even if a collision of digest information were to occur, data loss due thereto can be prevented.

Third Embodiment

In the first embodiment described above, in sending the verification data from the backup server 1100 to the backup client 2100, this data is sent as is.

However, after acquiring the verification data, the backup client 2100 is able to reuse it for purposes other than verification, and it does not go so far as to consider preventing reuse of the verification data at the backup client 2100.

As such, in the present embodiment below, a control technique is described where the backup server 1100 transmits the verification data to the backup client 2100 in a form that makes reuse difficult.

Here, in order to prevent reuse of the verification data on the side of the backup client 2100, a known public-key encryption scheme is used. A public key for encryption and a private key for decryption are used, and what is characteristic is that while any client having the public key may perform encryption, only the client having the private key can perform decryption, and that it is difficult to infer the private key from the corresponding public key. Here, based on the public-key encryption scheme, the backup server 1100 generates a public key for encryption and a private key for decryption. In transmitting verification data to the backup client 2100, the backup server 1100 encrypts the verification data with this public key, and then transmits the encrypted data along with the public key as well as information for identifying the encryption scheme. At the backup client 2100, based on the received public key and the information for identifying the encryption scheme, the data to be backed up that it possesses itself is similarly encrypted. After encryption, it is determined whether or not the data match by verifying the received encrypted data for verification against the data it encrypted itself.

This case is premised on the fact that, depending on the encryption scheme used, if data to be encrypted are identical at the bit level, the resultant encrypted data would also be identical at the bit level. Thus, not only can data verification be performed at the backup client 2100, but since the backup client 2100 does not have the private key for decrypting the encrypted data, reuse of the encrypted data is also difficult.

In order to make it difficult to reuse the verification data at the backup client 2100 in the manner described above, parts of the packet configuration and the backup process need to be changed. These changes will be described with reference to FIG. 24, FIG. 25, and FIG. 26.

Figure 24:
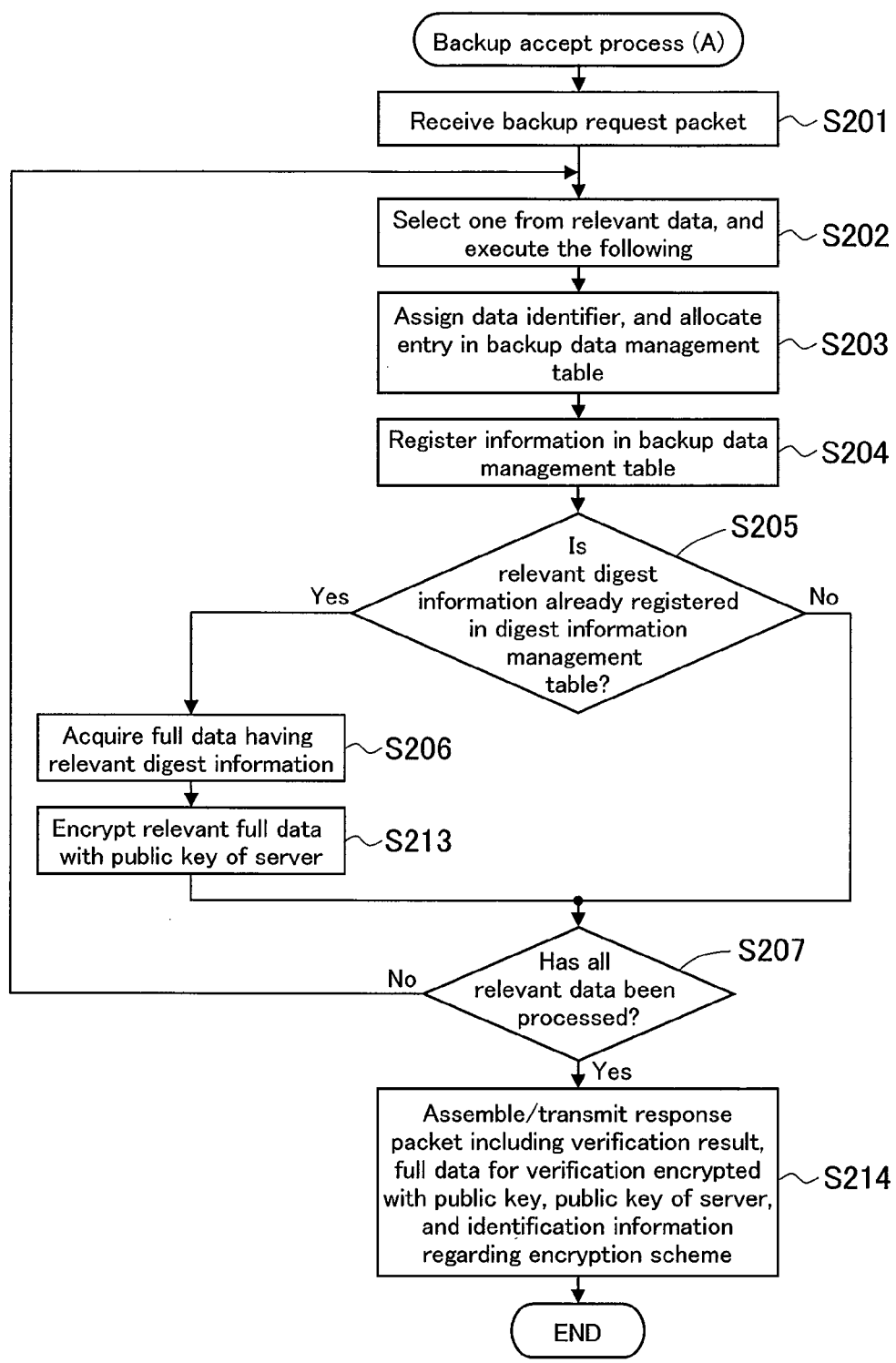
FIG. 24 is a flowchart showing the first half portion of a backup accept process according to the third embodiment of the present invention.

FIG. 24 is a diagram showing changes that are made to the backup accept process shown in FIG. 10. Two points are changed as follows. The first point is that after process step S206 in FIG. 10, a process of encrypting the full data for verification with the public key of the backup server 1100 (step S213) is added. After process step S213, the process proceeds to process step S207. The second point is that instead of process step S208 in FIG. 10, a response packet, which includes the verification result, the full data for verification that has been encrypted with the public key, the public key of the server, and identification information relating to the encryption scheme, is assembled and transmitted (step S214). Here, the content of the packet to be assembled will be described later with reference to FIG. 26.

Figure 25:
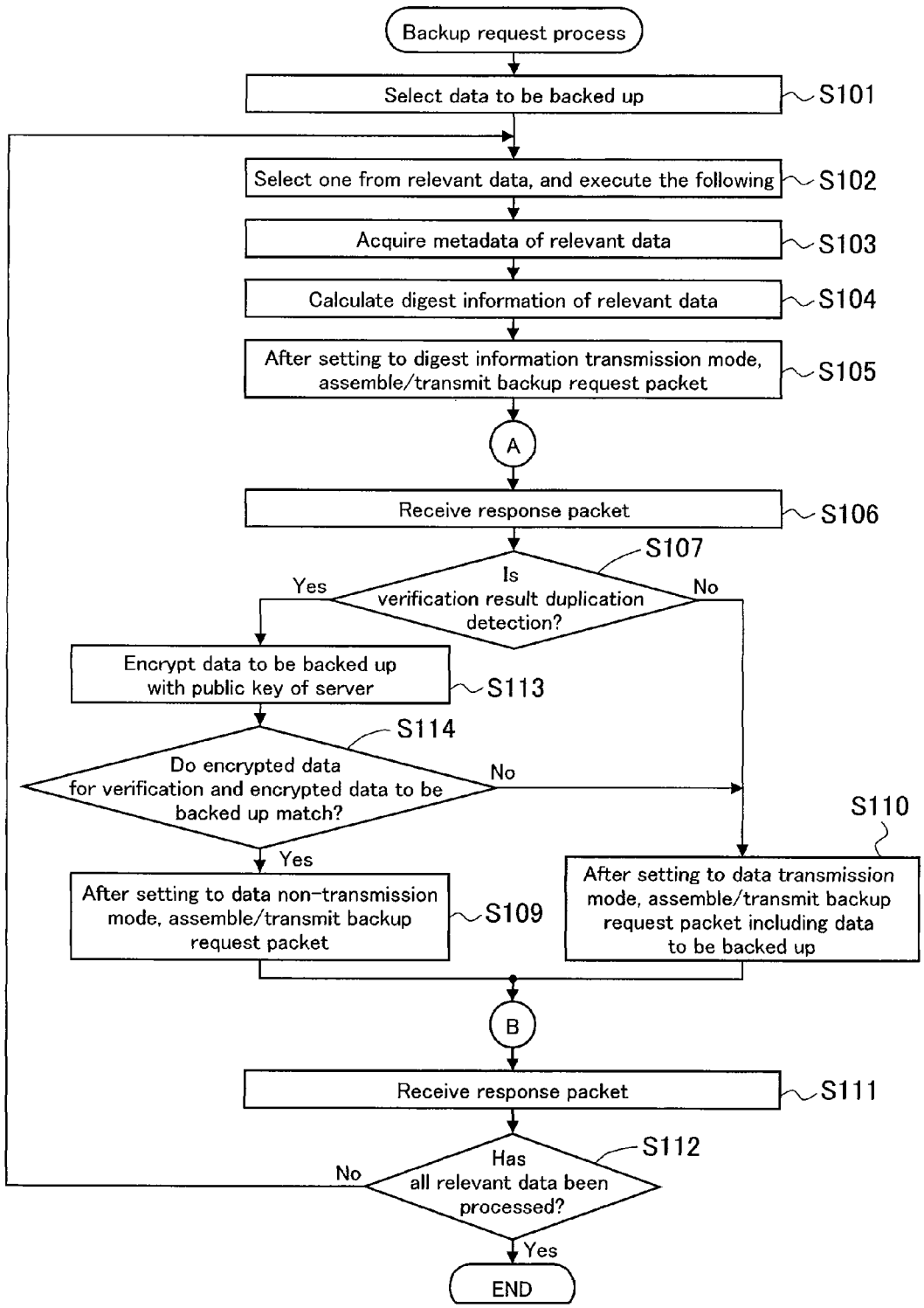
FIG. 25 is a flowchart showing a backup request process according to the third embodiment of the present invention.

FIG. 25 is a diagram showing changes to the backup request process shown in FIG. 9. The changes are as follows. At process step S107 shown in FIG. 25, if the verification result indicates duplication detection (Yes), here, first, based on the public key of the server as well as the identification information relating to the encryption scheme received from the backup server 1100, the data to be backed up that the backup client 2100 possesses is encrypted (step S113). Then, it is checked whether or not the encrypted data for verification, which is received from the backup server 1100, and the encrypted data to be backed up, which is created in process step S113, match (step S114). If they do match (Yes), the process proceeds to process step S109. If they do not match (No), the process proceeds to process step S110.

Figure 26:
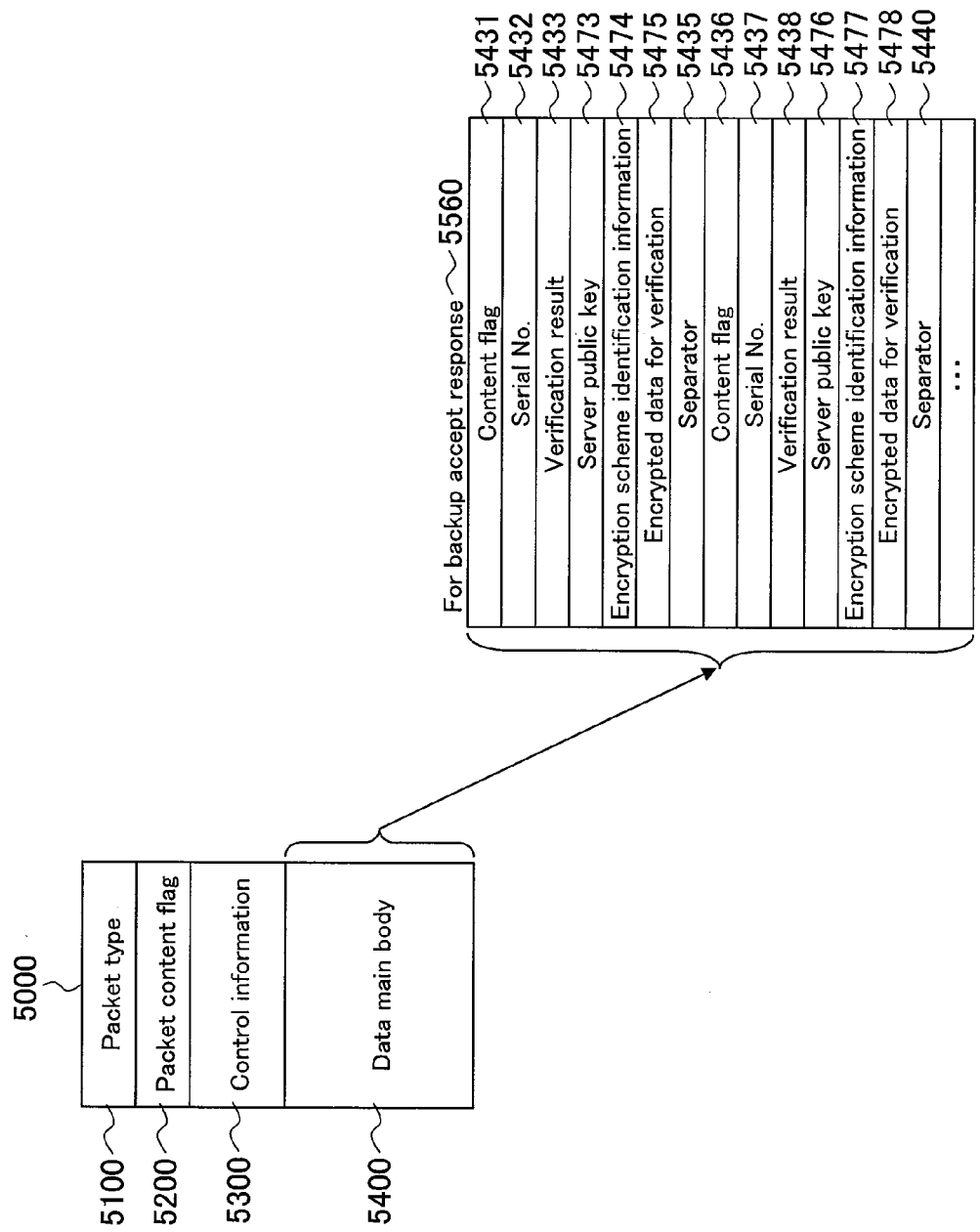
FIG. 26 is a diagram showing a packet configuration example according to the third embodiment of the present invention.

FIG. 26 is a diagram showing a configuration example including changes to the packet configuration shown in FIG. 8. The changes are as follows. Instead of the backup accept response packet 5520 shown in FIG. 8, a backup accept response packet 5560 is used. In the backup accept response packet 5560, instead of the entries of the verification data 5434 and 5439 that were present in the backup accept response packet 5520, there are provided entries of server public keys 5473 and 5476, entries of encryption scheme identification information 5474 and 5477, and entries of encrypted data for verification 5475 and 5478. The server public keys 5473 and 5476 are used to store public key information of the backup server 1100 that was used in order to encrypt the verification data on the side of the backup server 1100. The encryption scheme identification information 5474 and 5477 are used to store information for identifying the encryption scheme that was used in encrypting the verification data on the side of the backup server 1100. The encrypted data for verification 5475 and 5478 are used to store data that is created by encrypting the verification data using the public key and the encryption scheme above on the side of the backup server 1100.

As described above, according to the present embodiment, using a public-key encryption scheme, a backup server is able to transmit verification data to a backup client in a form that is difficult to reuse.

Fourth Embodiment

The first embodiment described above dealt with an embodiment in which, in order to perform on the side of the backup client 2100 verification relating to data to be backed up, the backup server 1100 sends to the backup client 2100 full data that has been determined as being a match with the data to be backed up. However, in cases where the size of the data to be backed up is large, or where complete verification confirmation at the bit level is not necessarily required and so forth, instead of sending the verification data itself, digest information of the verification data may be sent, and data verification may be performed at the backup client 2100 using this digest information. As such, a control technique is described below where the backup server 1100 sends to the backup client 2100 digest information of the verification data for the purpose of data verification.

In the present embodiment, as digest information of verification data that the backup server 1100 sends to the backup client 2100, it is made possible to handle information whose volume is equal to or greater than that of digest information that the backup client 2100 transmits to the backup server 1100 for data duplication detection. In addition, by making it possible for the backup server 1100 to perform the transaction of sending the digest information of the verification data to the backup client 2100 a plurality of times, it is made possible to increase the volume of the digest information of the verification data in stages, and to change the digest information calculation method used.

For example, if the amount of the digest information initially sent from the backup client 2100 to the backup server 1100 is 128 bits, it is made possible to increase the amount of the digest information that the backup server 1100 next sends to the backup client 2100, such as 160 bits, 256 bits, and the like. Ultimately, after this process is repeated, instead of digest information, the verification data itself may be sent as in the first embodiment.

In order to send digest information of verification data from the backup server 1100 to the backup client 2100 in the manner described above, parts of the packet configuration and the backup process need to be changed. These changes will be described with reference to FIG. 27, FIG. 28, FIG. 29, and FIG. 30.

Figure 27:
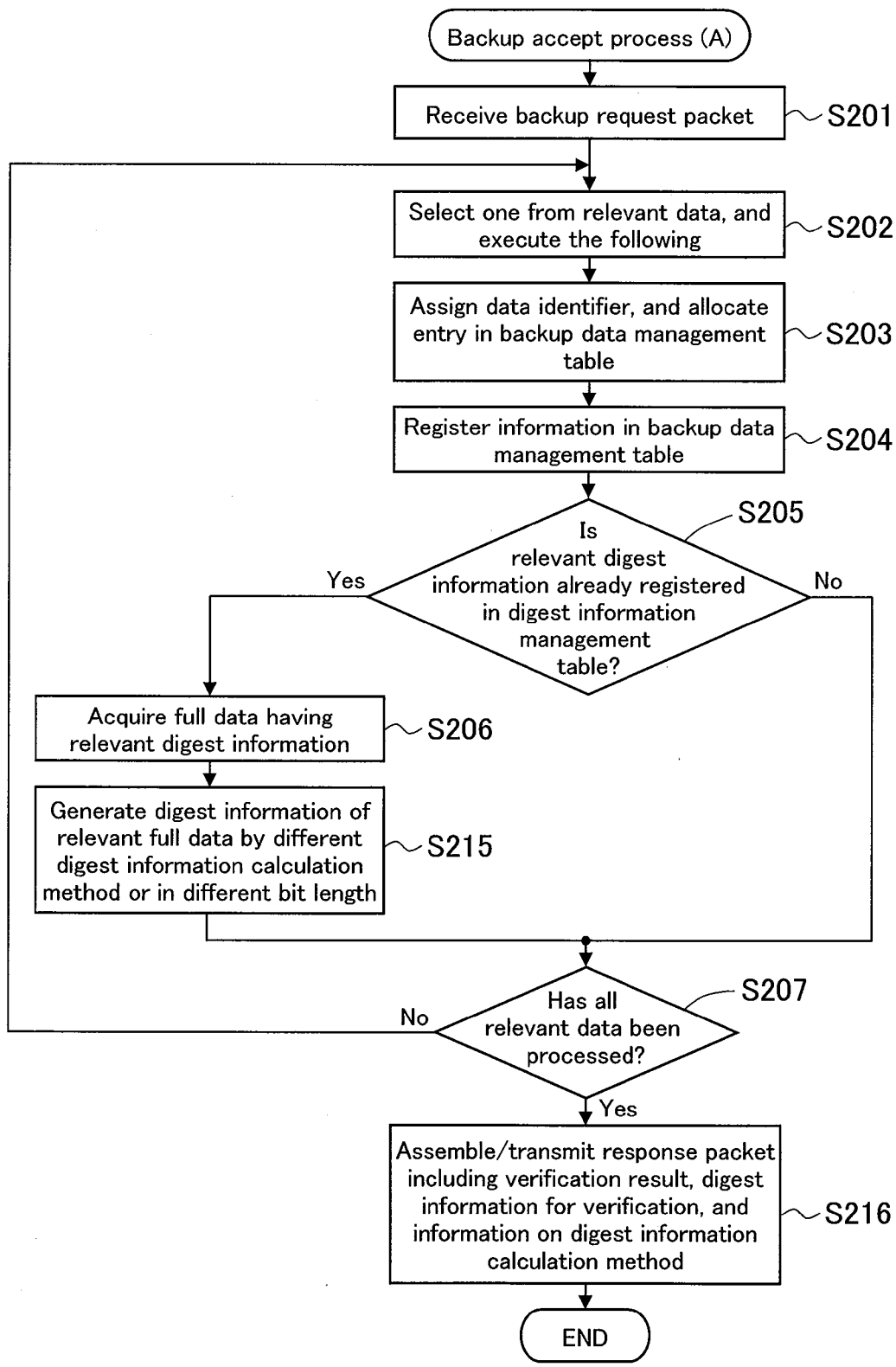
FIG. 27 is a flowchart showing the first half portion of a backup accept process according to the fourth embodiment of the present invention.

FIG. 27 shows changes to the backup accept process shown in FIG. 10. Two points are changed as follows. The first point is that after the process of process step S206, a process of generating digest information of the verification data acquired in that process is added (step S215). In this process, in generating the digest information of the relevant data, a digest scheme that differs from that of when the digest information, which the backup client 2100 sent to the backup server 1100 for data duplication detection, was calculated is used, or the digest information is generated in a different bit length. Thus, the calculation method and the bit length that the backup client 2100 initially used for digest information calculation are avoided. The second point is that after the process of process step S207, instead of process step S208 above, a step of assembling and transmitting a response packet, which includes the verification result, the digest information for verification, and information for identifying the digest information calculation method, and the like, is provided (step S216). The packet configuration assembled here will be described with reference to FIG. 30.

Figure 28:
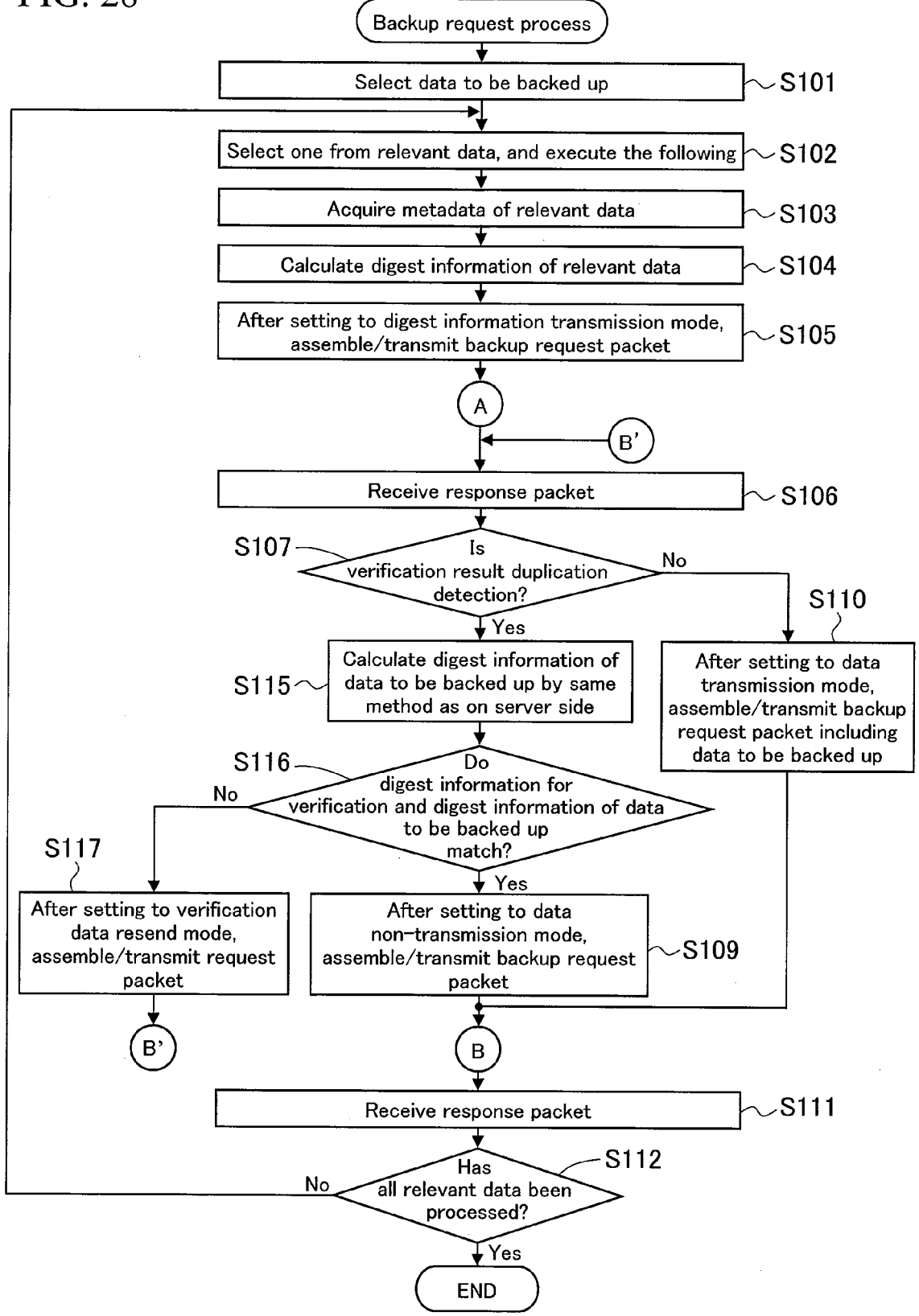
FIG. 28 is a flowchart showing a backup request process according to the fourth embodiment of the present invention.

FIG. 28 is a diagram showing a configuration example including changes to the backup request process shown in FIG. 9. The changes are as follows. Before performing the process of process step S109 in FIG. 28, the backup client 2100 calculates digest information of the data to be backed up (step S115) by the same method as the digest information calculation method received from the backup server 1100. Then, it is checked whether or not the digest information calculated in process step S115 and the digest information received from the backup server 1100 for verification match (step S116). If they do match (Yes), the process proceeds to process step S109 previously described. If they do not match (No), after being set to verification data resend mode, a request packet is assembled and transmitted to the backup server 1100 (step S117). Here, the setting of verification data resend mode is done by using the regions of the content flags 5431 and 5436 in the packet configuration described with reference to FIG. 30. In addition, after the packet is transmitted to the backup server 1100 in process step S117, a response packet is received through process step S106. Thus, it is made possible to repeat execution of verification based on digest information again after the response packet is received.

Figure 29:
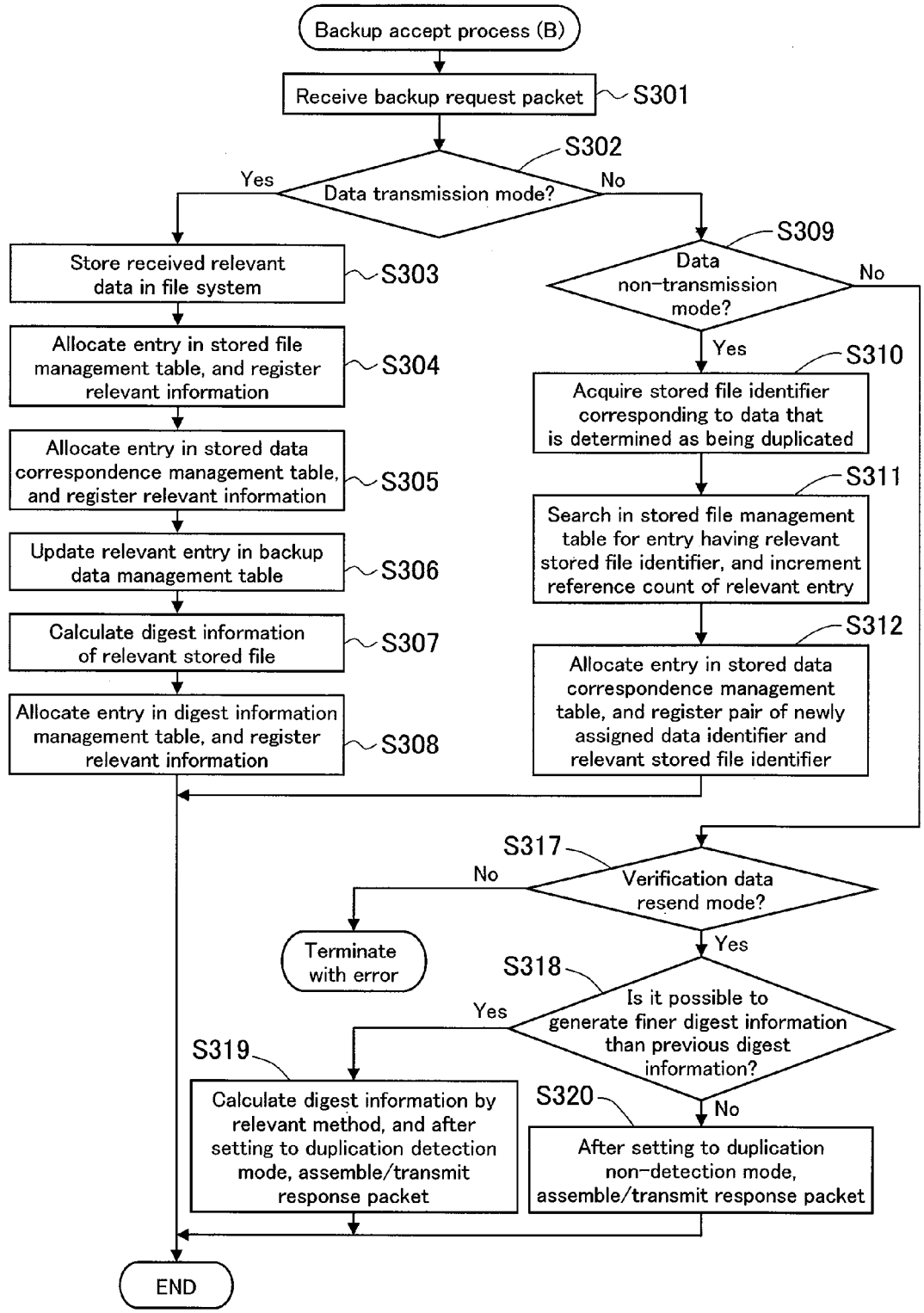
FIG. 29 is a flowchart showing the latter half portion of a backup accept process according to the fourth embodiment of the present invention.

FIG. 29 is a flowchart showing a process flow including changes to the backup accept process shown in FIG. 11. The changes are as follows. After it has been determined in process step S309 in FIG. 29 that the backup request packet is not in data non-transmission mode (No), it is further checked whether or not the backup request packet is in verification data resend mode (step S317). If it is not in verification data resend mode, the process is terminated with an error as being in an illegal state. If it is in verification data resend mode, it is checked whether or not finer digest information, as compared in terms of digest information generation scheme and digest information volume to those previously used in process step S215 in FIG. 27 or in process step S319 in FIG. 29 later described, can be generated (step S318). If it can be generated (Yes), digest information of the relevant verification data is generated by that scheme, and after being set to duplication detection mode, a response packet is assembled and transmitted (step S319). The setting of the duplication detection mode is performed using the regions of the content flags 5431 and 5436 in the packet configuration that will be described with reference to FIG. 30. In addition, at process step S318, if it cannot be generated (No), after being set to duplication non-detection mode, a response packet is assembled and transmitted (step S320). The setting of the duplication non-detection mode is performed using, as described above, the regions of the content flags 5431 and 5436 in the packet configuration that will be described with reference to FIG. 30.

Figure 30:
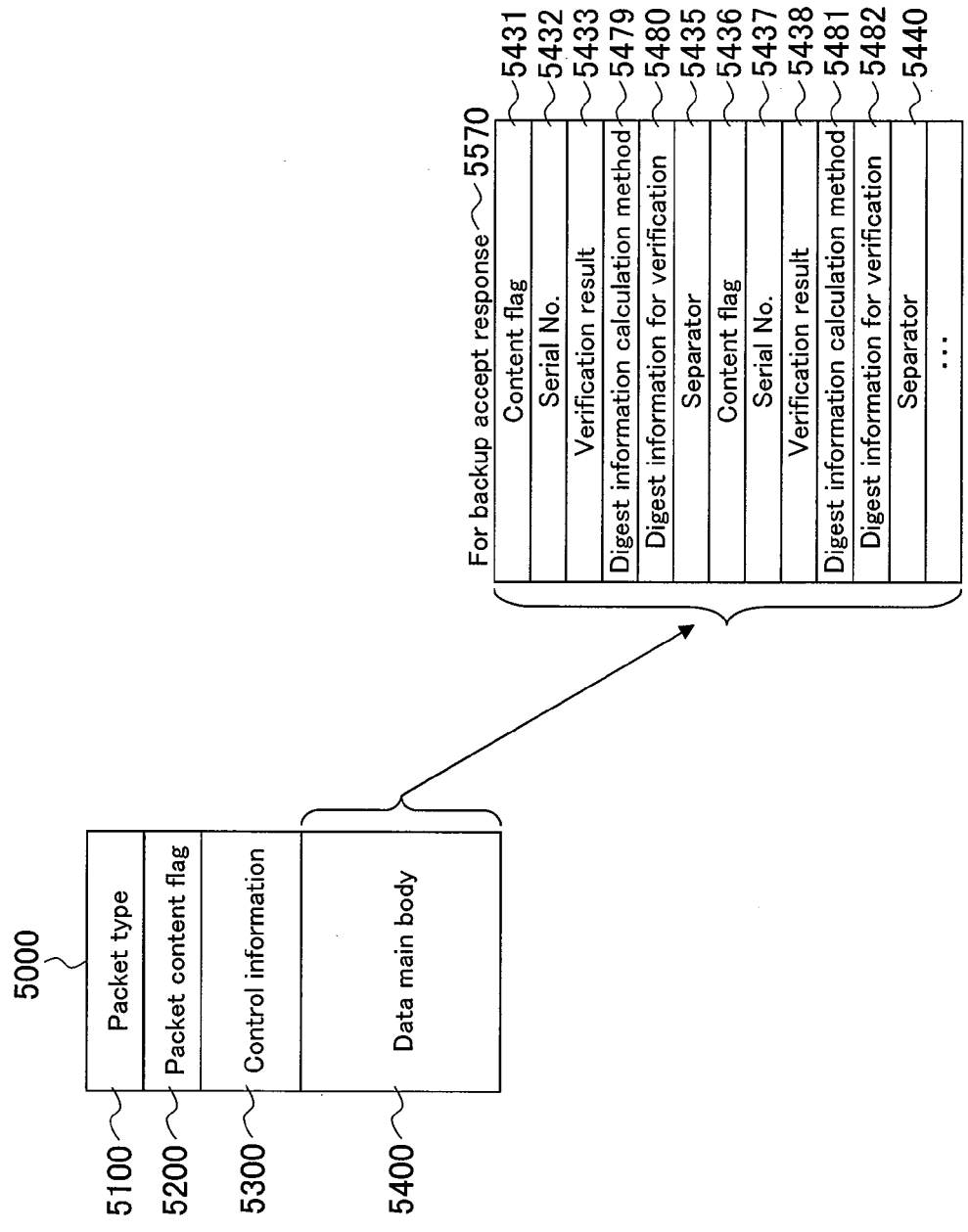
FIG. 30 is a diagram showing a packet configuration example according to the fourth embodiment of the present invention.

FIG. 30 is a diagram showing a configuration example including changes to the packet configuration shown in FIG. 8. The changes are as follows. Instead of the backup accept response packet 5520 shown in FIG. 8, a backup accept response packet 5570 is used. In the backup accept response packet 5570, instead of the entries of the verification data 5434 and 5439 that were present in the backup accept response packet 5520, there are provided entries of digest information calculation methods 5479 and 5481, and entries of digest information for verification 5480 and 5482. The digest information calculation methods 5479 and 5481 are used to store information that is necessary in order to identify the digest information calculation method that was used to calculate the digest information of the verification data on the side of the backup server 1100. The digest information for verification 5480 and 5482 are used to store digest information that is created using this digest information calculation method on the verification data on the side of the backup server 1100.

In the present embodiment, instead of sending the relevant verification data itself, by sending digest information of the verification data, and performing data verification at a backup client using this digest information, it is possible to accommodate cases where the size of the data to be backed up is large or cases where complete verification confirmation at the bit level is not necessarily required.

Fifth Embodiment

The first embodiment described above deals with an embodiment in which the transfer scheme for the data to be backed up and from the backup clients 2100 and 2200 to the backup server 1100 is fixed. However, it is not possible to allow a selection to be made on the side of the backup clients 2100 and 2200 as to what sort of scheme the data to be backed up should be transferred by, and to allow a scheme suited to one's needs to be selected at a client. For example, for a client who prioritizes completeness of data over higher efficiency through transfer volume reduction by means of de-duplication, it is conceivable that the client may wish to transmit the data to be backed up right at the outset, as is done in ordinary backup, without exchanging digest information for de-duplication. As such, a control scheme will be described below with respect to the fifth embodiment where the transfer scheme for the data to be backed up is selected at the backup client 2100.

In order to have the transfer scheme for the data to be backed up selected at the backup client 2100 in the manner described above, parts of the system configuration and the backup process need to be changed, and a transfer scheme selection function and the like also need to be newly added. These changes and additions will be described with reference to FIGS. 31, 32, 33, 34, 35, 36, and 37.

Figure 31:
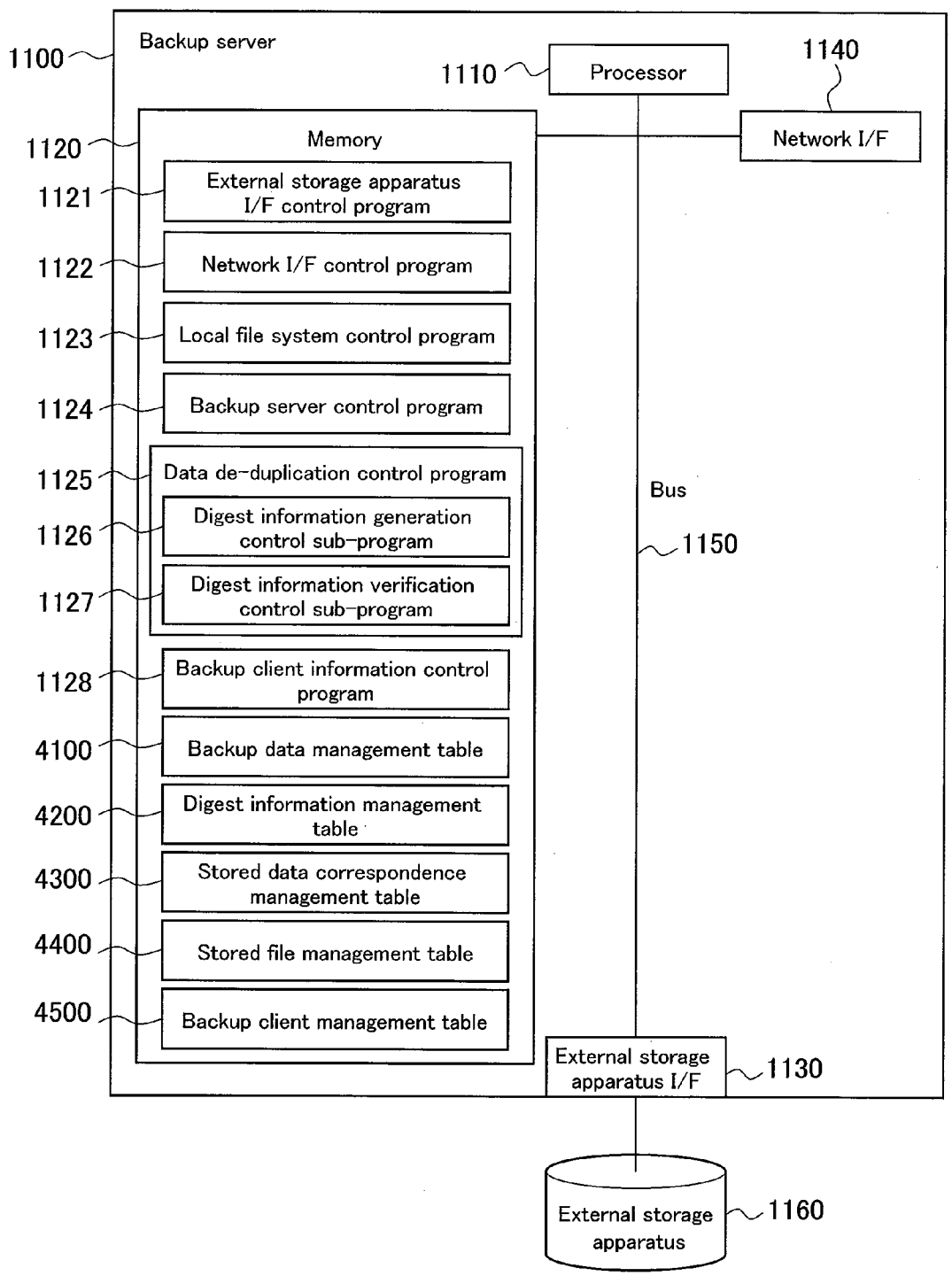
FIG. 31 is a diagram showing a hardware configuration example of a backup server according to the fifth embodiment of the present invention.

FIG. 31 shows changes to the hardware configuration of the backup server 1100 shown in FIG. 2. What has changed from FIG. 2 is that the following two features have been added. The first is a backup client information control program 1128. In this program, there is provided a function of accepting and managing information per backup client that uses the backup service provided by the backup server 1100. The second is a backup client management table 4500. The backup client management table 4500 is used to store and manage information that the backup client information control program 1128 has accepted from each backup client 2100. Information of all clients using the backup server 1100 is stored in the backup client management table 4500. The configuration and the like of the backup client management table 4500 will be described later with reference to FIG. 34.

Figure 32:
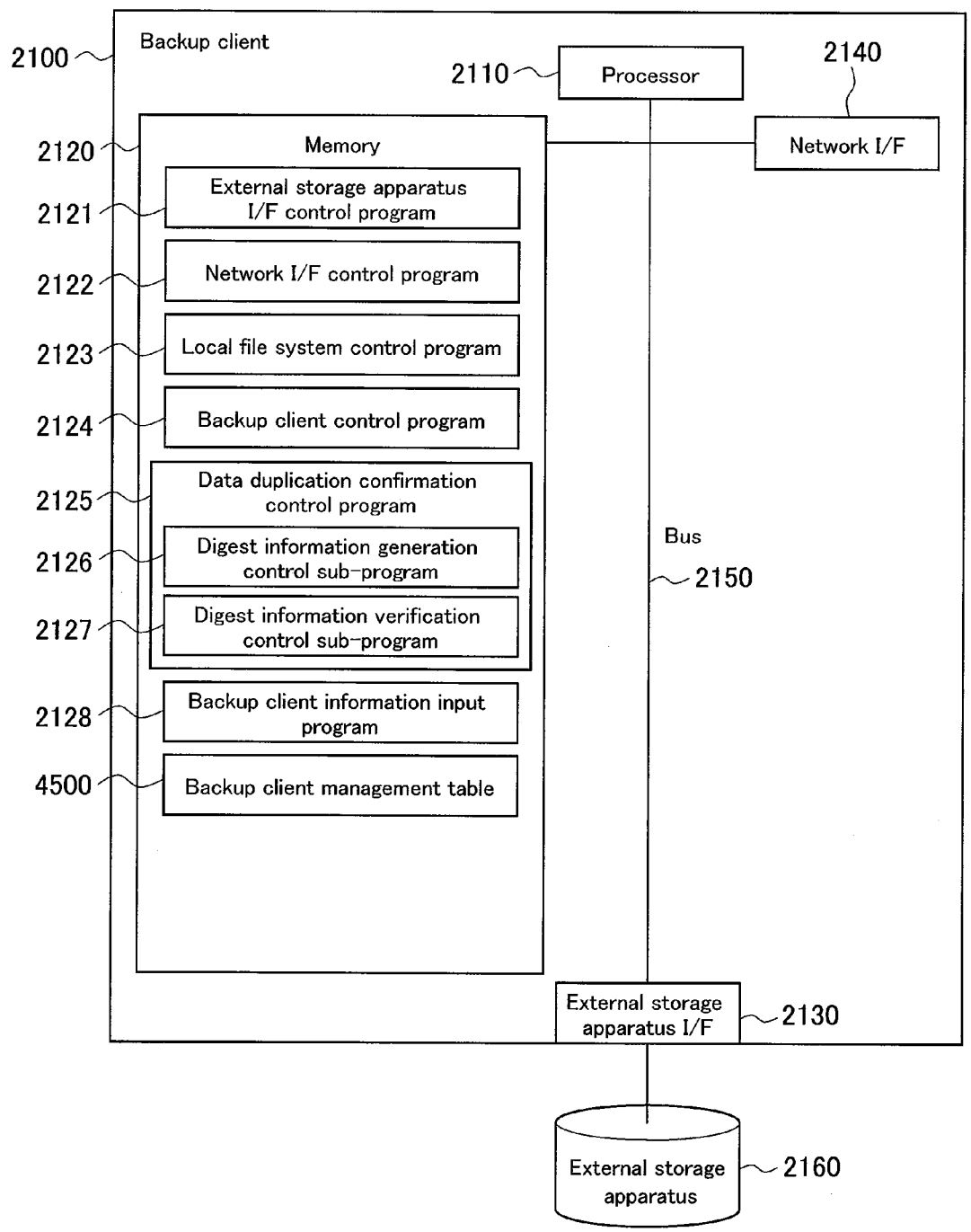
FIG. 32 is a diagram showing a hardware configuration example of a backup client according to the fifth embodiment of the present invention.

FIG. 32 is a diagram including changes to the hardware configuration of the backup client 2100 shown in FIG. 3. What has changed is that the following two features have been added. The first is a backup client information input program 2128. In this program, there is provided an information input function for a user, who uses the backup client 2100, to select a transfer scheme for data to be backed up. A configuration example and the like of this input screen will be described later with reference to FIG. 33. The second is the backup client management table 4500. The backup client management table 4500 is used to store and manage information that the backup client information input program 2128 has accepted. Only information of users that use this backup client 2100 is stored in this backup client management table 4500. A configuration and the like of the backup client management table 4500 shown in FIGS. 31 and 32 will be described with reference to FIG. 34.

FIG. 33 is a diagram showing a display example of a backup client information input screen 6100 that the backup client information input program 2128 provides. In the backup client information input screen 6100, there are: a user identifier input field 6110 and a password input field 6120 for inputting a user identifier and a password, respectively, for identifying the relevant user; an IP address input field 6130 for inputting an IP address for identifying the backup client 2100 that the user is using; a backup mode selection field 6140 for selecting the backup mode to be used; an OK button 6150 for reflecting the inputted content in the system; and a cancel button 6160 for cancelling the inputted content. At the backup mode selection field 6140, it is possible to select either a trust mode 6141 or an efficient transfer mode 6142. The trust mode 6141 refers to a method in which only the data to be backed up is transmitted from the outset without digest information being sent from the backup client 2100. The efficient transfer mode 6142 refers to a method for performing de-duplication by first sending digest information from the backup client 2100. Here, if the efficient transfer mode 6142 is selected, it is necessary to further select either one of the following two choices. The first is a backup client side full data verification mode 6143 (verified on the client side using full data). When this mode 6143 is selected, the backup server 1100 sends to the backup client 2100 full data of the relevant data as verification data. The second is a backup client side digest information verification mode 6144 (verified on the client side using digest data). When this mode 6144 is selected, the backup server 1100 sends to the backup client 2100, as described in the fourth embodiment, digest information of the relevant data as verification data.

In addition, when the backup client side digest information verification mode 6144 is selected, a digest information calculation method that is usable at the backup client 2100 is further inputted into a digest information calculation method input field 6145. If there are a plurality of usable methods, the digest information calculation method input field 6145 can be increased by using an entry addition button 6146.

By using the OK button 6150 after the inputs above have been completed, the inputted content can be reflected in the backup server 1100 and the backup client 2100. In addition, by using the cancel button 6160, the inputted content can be cancelled. It is noted that, in displaying the backup client information input screen 6100 at the backup client 2100, it is displayed in a state where the backup client information that is already set on the backup client 2100 is inputted. For the content to be displayed here, the content registered in the backup client management table 4500 on the backup client 2100 is used. Naturally, a screen for confirming the setting content may be provided separately.

FIG. 34 is a diagram showing a configuration example of the backup client management table 4500 that manages the registered contents of the backup client information. In the backup client management table 4500, the backup client information that is set at the backup client 2100 is managed. The backup client management table 4500 that is maintained at the backup server 1100 manages information of all users that use the backup server 1100. In contrast, the backup client management table 4500 maintained at the backup client 2100 only manages information of users that use this backup client 2100. Specifically, the backup client management table 4500 comprises such components as: user identifier 4510; password 4520; IP address 4530; backup mode 4540; digest scheme 4550; and registration/update date and time 4560. Here, the user identifier 4510 is used to identify the relevant user, and reflects the information inputted into the user identifier input field 6110 in FIG. 33. The password 4520 is similarly used for identifying the relevant user, and reflects the information inputted into the password input field 6120 in FIG. 33. The IP address 4530 is used to identify the backup client that the relevant user uses, and reflects the information inputted into the IP address input field 6130 in FIG. 33. The backup mode 4540 is used to identify the backup mode selected by the relevant user, and reflects the information selected through the backup mode selection field 6140 in FIG. 33. The digest scheme 4550 is used to identify the digest scheme selected by the relevant user as being usable, and reflects the information inputted into the digest information calculation method input field 6145 in FIG. 33. The registration/update date and time 4560 stores information on the date and time on/at which the relevant entry was registered or updated.

Figure 35:
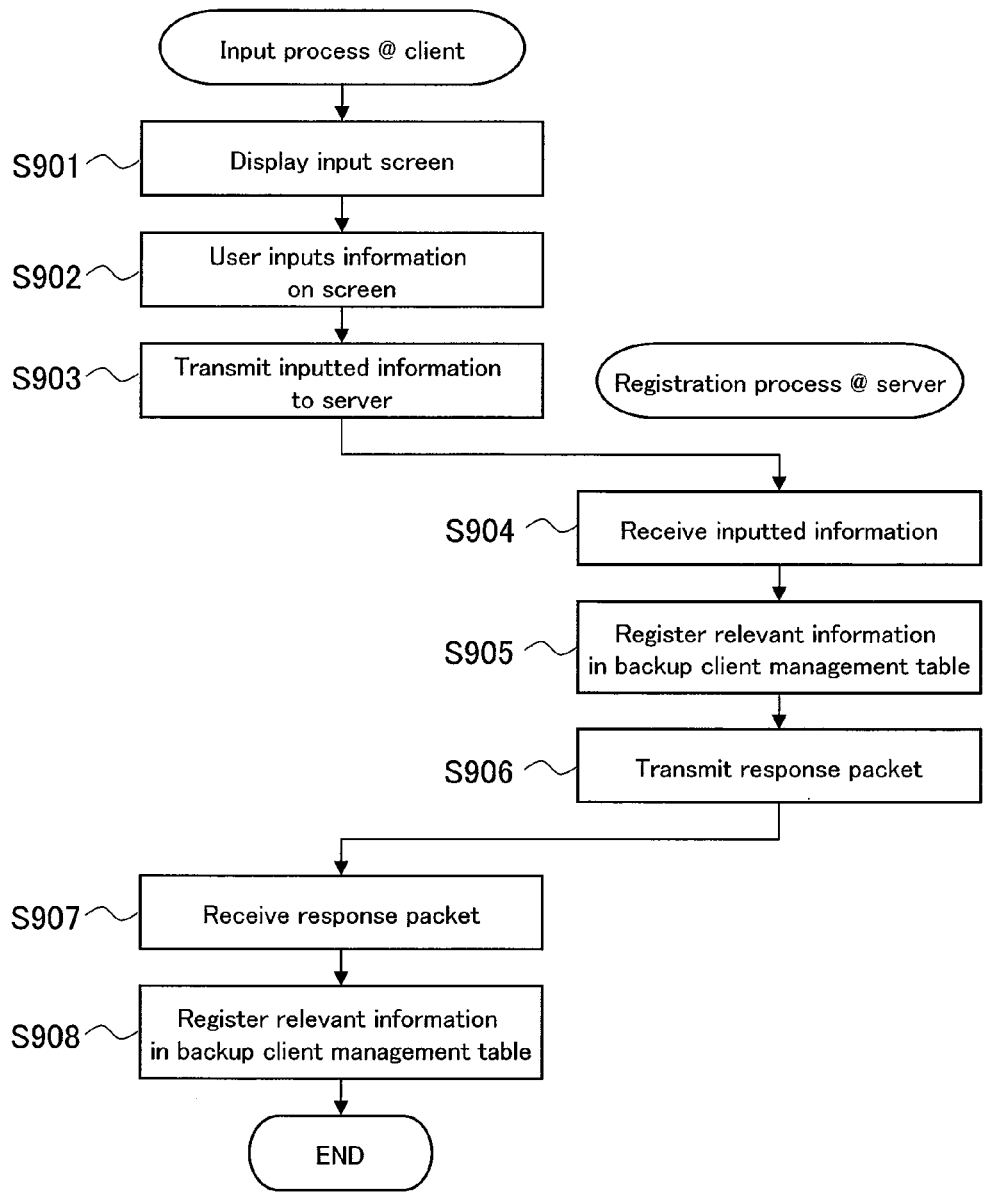
FIG. 35 is a flowchart illustrating a backup client information input process according to the fifth embodiment of the present invention.

FIG. 35 is a flowchart showing the process flow from the inputting of backup client information up to registration thereof in the system. First, at the backup client 2100, using the backup client information input program 2128, the backup client information input screen 6100 is launched (step S901). Then, through this screen 6100, the user inputs information (step S902). Then, by clicking the OK button 6150 on this screen 6100, the inputted information is transmitted to the backup server 1100 (step S903). At the backup server 1100, the transmitted inputted information is received (step S904), and this information is registered in the backup client management table 4500 on the backup server 1100 (step S905). After registration, a response packet is transmitted (step S906). At the backup client 2100, the response packet is received (step S907), and the information inputted by the user is registered in the backup client management table 4500 on the backup client 2100 (step S908).

Figure 36:
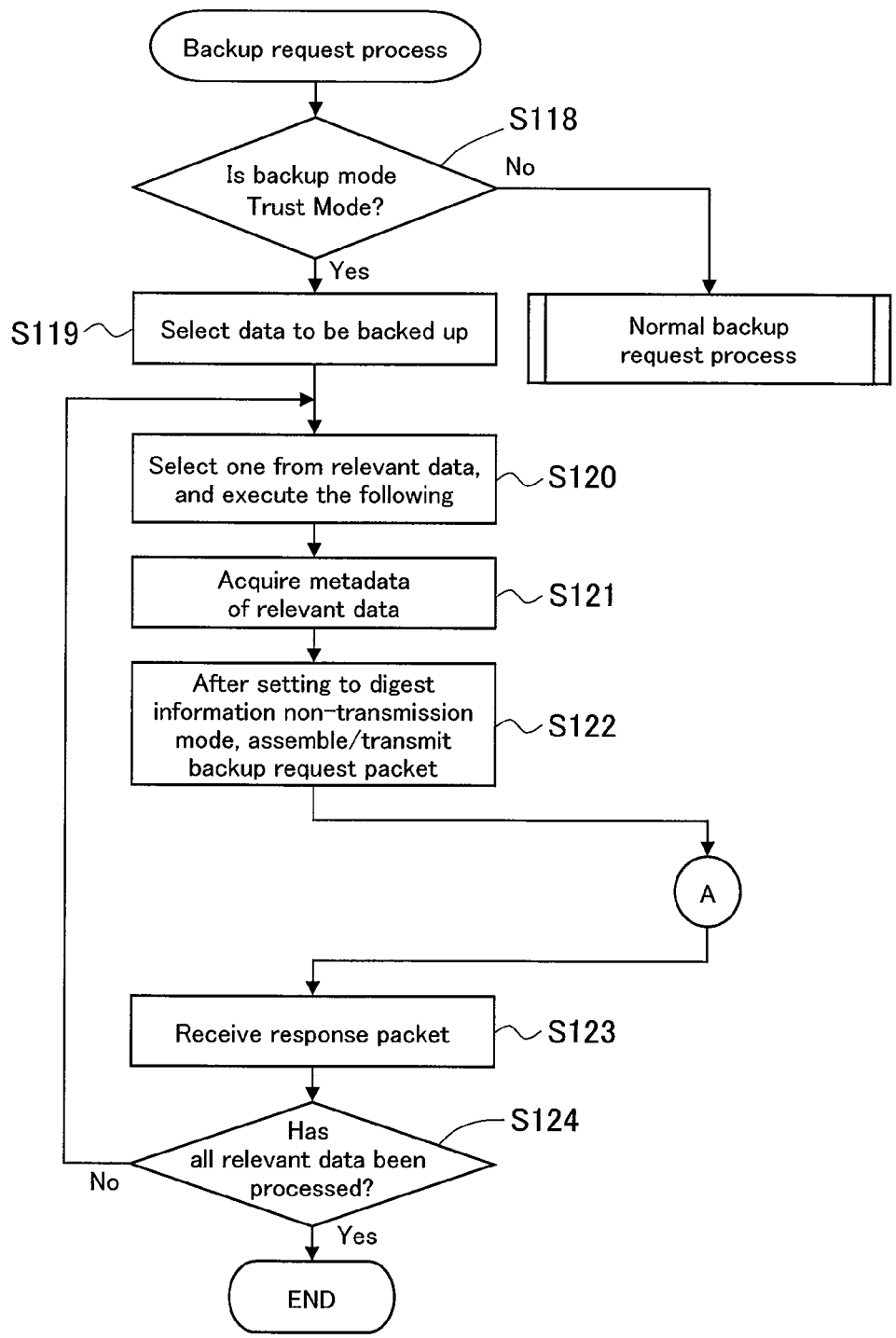
FIG. 36 is a flowchart illustrating a backup request process according to the fifth embodiment of the present invention.

FIG. 36 shows changes to the backup request process shown in FIG. 9. The changes are as follows. Prior to the backup request process at the backup client 2100, first, it is checked whether or not the backup mode set by the user is the trust mode or not (step S118). For this information, the information stored in the backup client management table 4500 at the backup client 2100 is referenced. If it is not the trust mode (No), the process proceeds to process step S101 in FIG. 9 so as to perform the previously described backup request process shown in FIG. 9. If it is the trust mode (Yes), the following process is performed so as to send to the backup server 1100 the data to be backed up itself. First, at the backup client 2100, the data to be backed up is selected from among the data groups stored within itself (step S119). Next, from among the selected data, any one data is selected (step S120), and the following process is executed. First, metadata of the selected data is acquired for backup (step S121). Next, after being set to digest information non-transmission mode, a backup request packet including the data to be backed up and the metadata is assembled and transmitted to the backup server 1100 (step S122). The process at the backup server 1100 is the same as the process described as process A with reference to FIG. 10. After the response packet from the backup server 1100 is received (step S123), it is checked whether or not all the relevant data that was selected this time in process step S119 has been processed (step S124). If all has been processed (Yes), the process is terminated. If not all has been processed (No), returning to process step S120, the process is repeated.

Figure 37:
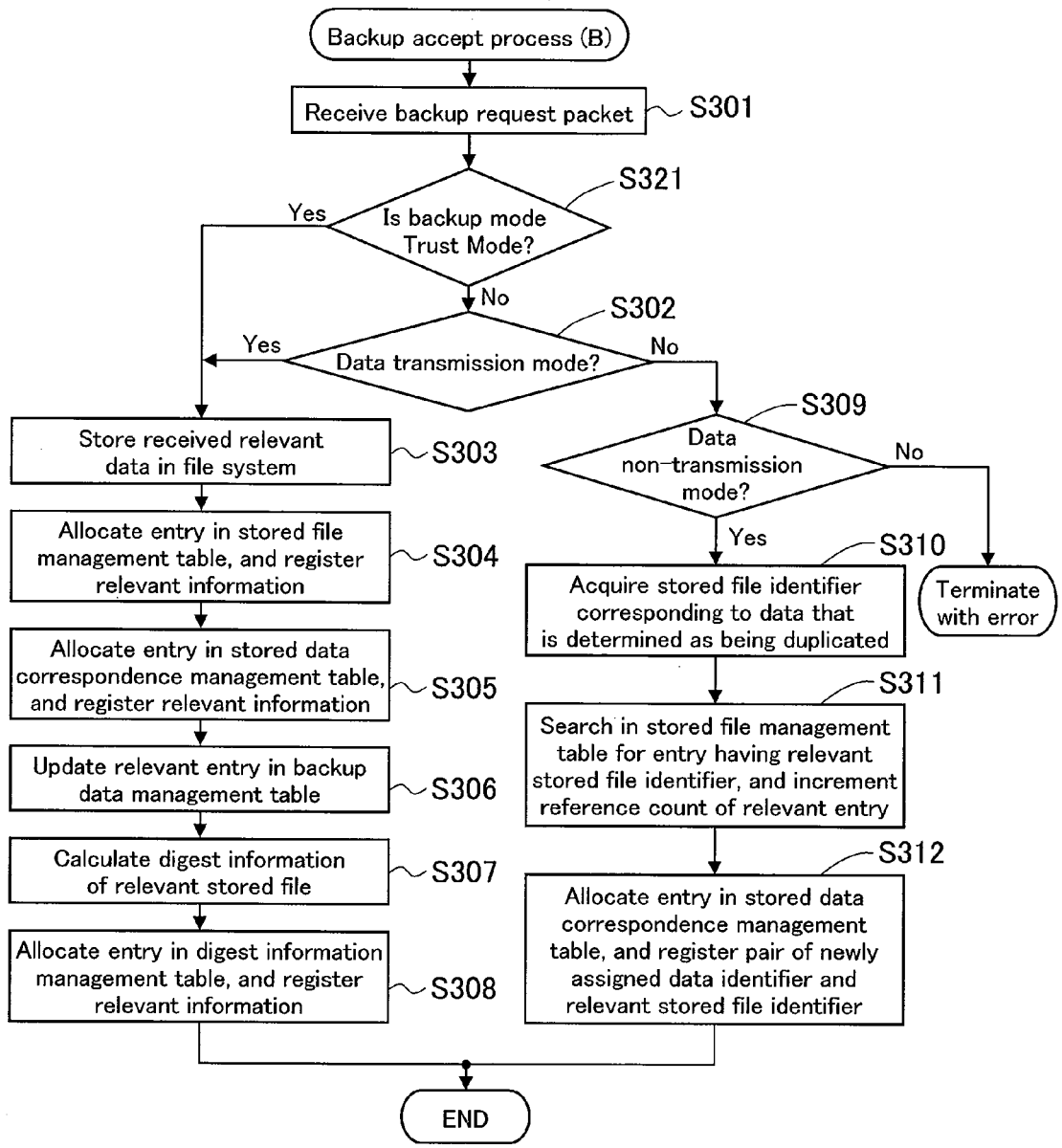
FIG. 37 is a flowchart illustrating the latter half portion of a backup accept process according to the fifth embodiment of the present invention.

FIG. 37 is a diagram showing a process including changes to the backup accept process shown in FIG. 11. The changes are as follows. After the process of process step S301 in FIG. 37, it is checked whether or not the backup mode registered by the user who transmitted the received request packet is the trust mode (step S321). Specifically, information on the user who transmitted the received request packet is acquired from the information stored in the control information 5300 of this packet, the entry corresponding to this user information is searched for in the backup client management table 4500, and the backup mode 4540 registered in this entry is acquired. At process step S321, if it is not the trust mode (No), the process proceeds to process step S302 that was described with reference to FIG. 11, and a similar process to that of FIG. 11 is performed. At process step S321, if it is the trust mode (Yes), the process proceeds to process step S303 that was described with reference to FIG. 11, and a similar process to that of FIG. 11 is performed.

According to the present embodiment, it is made possible to select on the backup client side what sort of scheme data to be backed up should be transferred by, and it is made possible to select at the client a scheme that suits one's needs.

Sixth Embodiment

The first embodiment described above dealt with an embodiment in which, by calculating digest information for all the data stored on the backup server 1100, verification was performed with respect to all stored data in order to perform de-duplication. Thus, in order to perform data verification on the side of the backup client 2100, the data stored on the backup server 1100 was being sent to the backup client 2100 as verification data.

However, it is conceivable that among the stored data, there might be included data for which transmission to another client other than itself for use in verification would be difficult for security reasons and the like. Since the first embodiment takes, in order to perform de-duplication with respect to all stored data, all stored data as being subject to verification, it does not go so far as to consider making it possible to set per data whether or not it should be subject to verification.

As such, a control scheme is described below where a client that uses the backup server 1100 allows or disallows the use of its own stored data as verification data for performing de-duplication.

In order to make it possible for the client using the backup server 1100 to set information on the possibility of registration as being subject to de-duplication with respect to its own stored data in the manner described above, parts of the system configuration, the backup data management table, the backup client management table, and the backup process need to be changed, and a selection function per data and the like also need to be newly added. These changes and additions will be described with reference to FIGS. 38, 39, 40, 41, 42, 43, 44, and 45.

Figure 38:
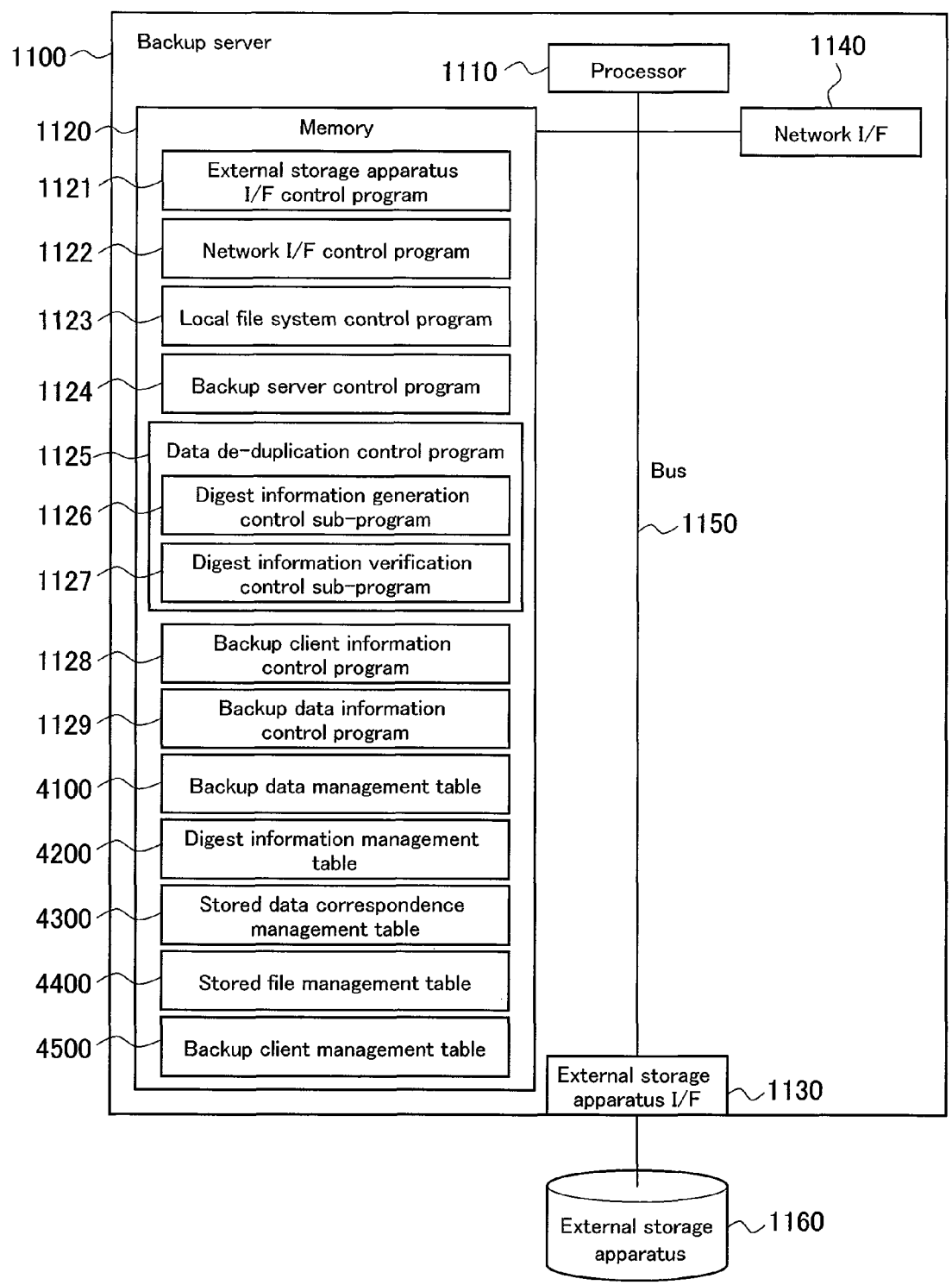
FIG. 38 is a hardware configuration diagram of a backup server according to the sixth embodiment of the present invention.

FIG. 38 is a diagram showing a configuration including changes to the hardware configuration of the backup server 1100 shown in FIG. 31. What has changed is that a backup data information control program 1129 has been added. In this program, a function is provided where, for each backup client using the backup service provided by this backup server 1100, information on the possibility of registration as being subject to de-duplication is accepted and managed.

Figure 39:
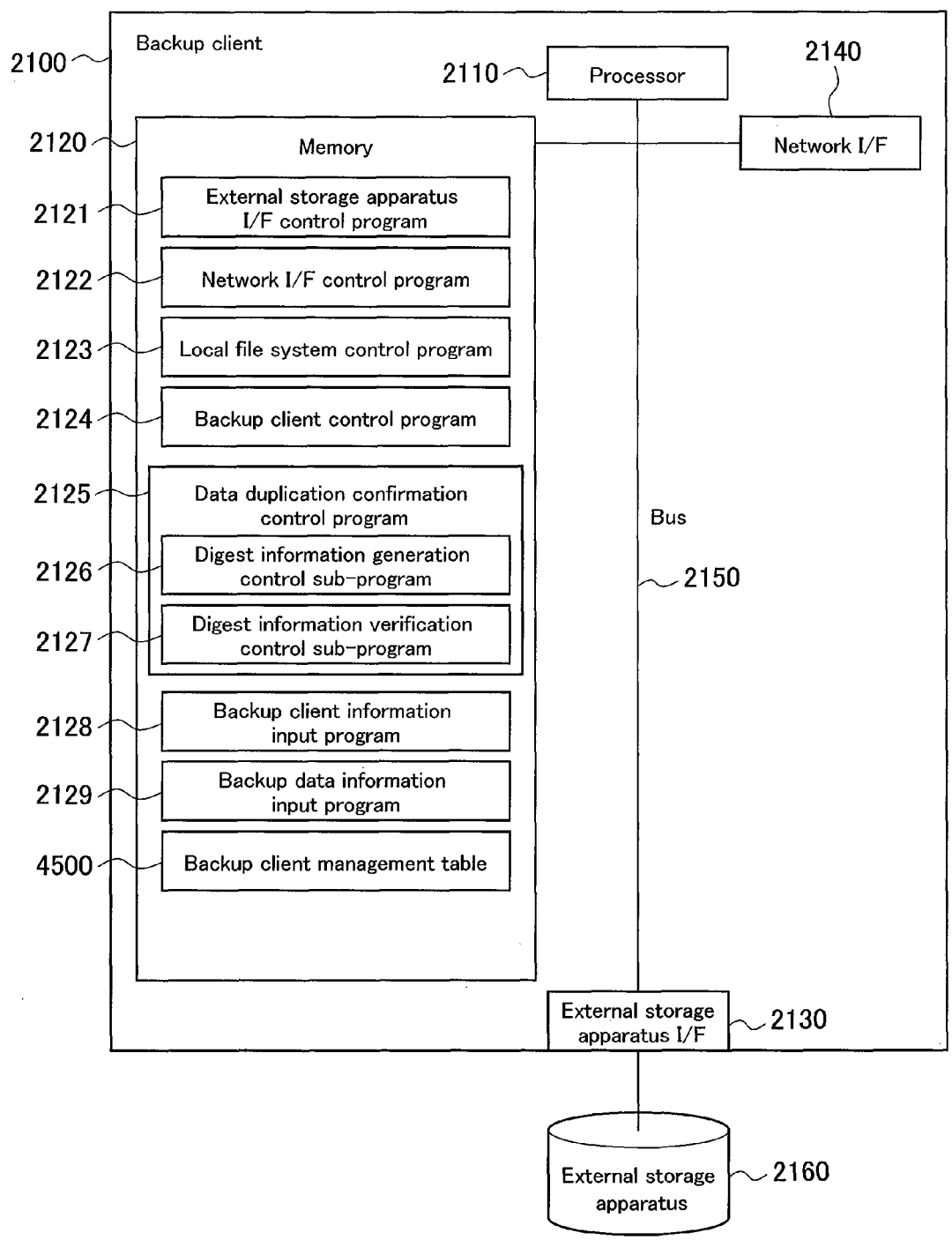
FIG. 39 is a hardware configuration diagram of a backup client according to the sixth embodiment of the present invention.

FIG. 39 is a diagram showing a configuration example including changes to the hardware configuration of the backup client 2100 shown in FIG. 32. What has changed is that a backup data information input program 2129 has been added. In this program, there is provided an information input function for a user using this backup client 2100 to set, with respect to data to be backed up, information on the possibility of registration as being subject to de-duplication. The configuration and the like of the input screen thereof will be described later with reference to FIG. 40.

Figure 40:
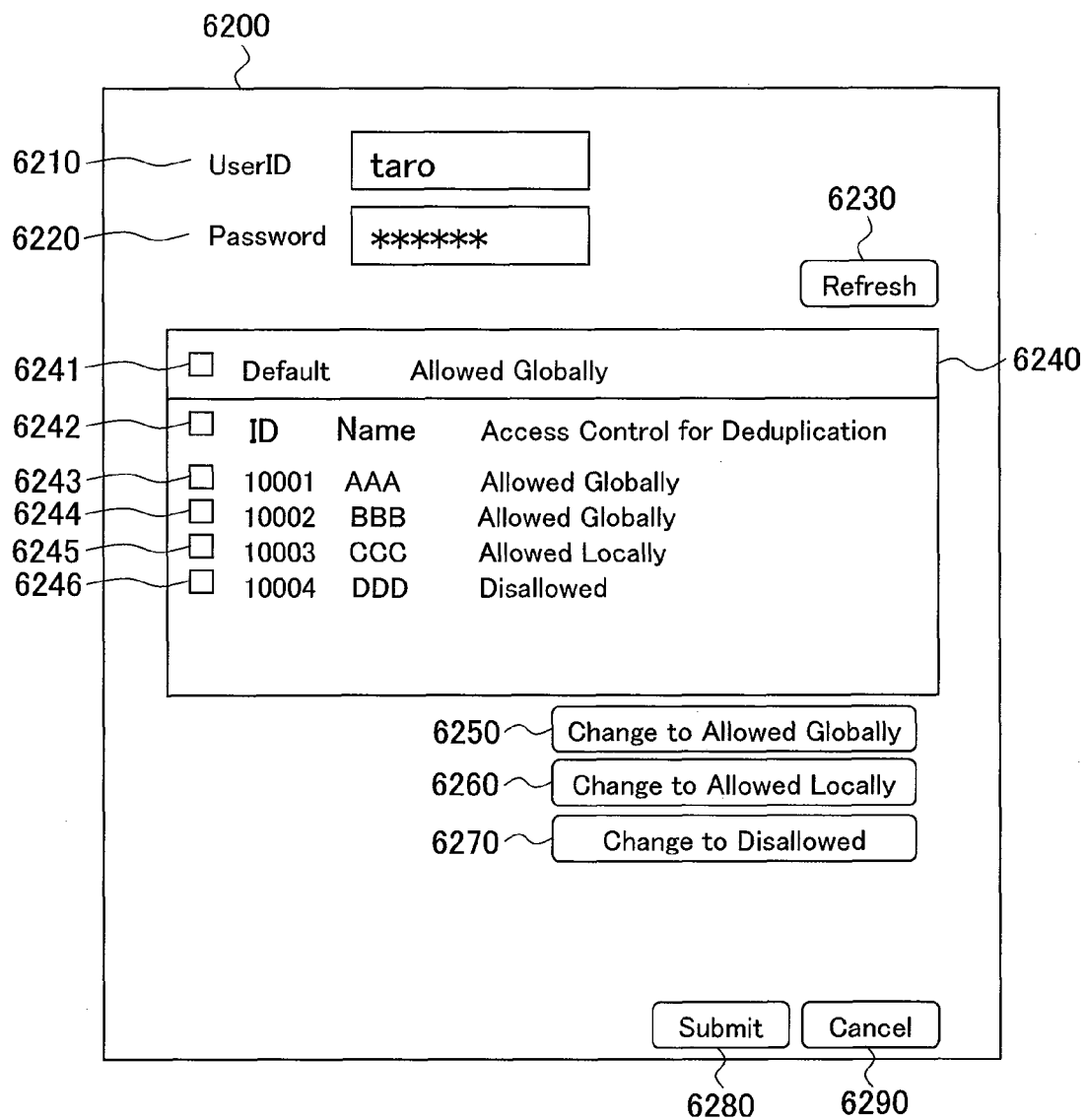
FIG. 40 is an illustrative diagram showing an example of a backup data information input screen according to the sixth embodiment of the present invention.

FIG. 40 is a diagram showing a display screen example of a backup data information input screen 6200 that is provided by the backup data information input program 2129. On the backup data information input screen 6200, there are: a user identifier input field 6210 and a password input field 6220 for inputting a user identifier and a password, respectively, for identifying the relevant user; a refresh button 6230 for acquiring information that has been set; a list display field 6240 that displays as a list the information that is set; a registration allowance setting button 6250 which, with respect to the relevant data, changes the setting to allow registration as being subject to de-duplication for all users; a limited registration allowance setting button 6260 which, with respect to the relevant data, changes the setting to allow registration as being subject to de-duplication only for its own user(s); a registration disallowance setting button 6270 which, with respect to the relevant data, changes the setting to disallow registration as being subject to de-duplication; a submit button 6280 for reflecting the inputted content in the system; and a cancel button 6290 for cancelling the inputted content.

In the list display field 6240, there are: a default setting field 6241 which allows a default setting, for data that the relevant user registers, of registration allowance/disallowance as being subject to de-duplication; a collective setting field 6242 which makes it possible to set, for all data stored by the relevant user, registration allowance/disallowance as being subject to de-duplication; and individual setting fields 6243, 6244, 6245, and 6246 which make it possible to set, per data stored by the relevant user, registration allowance/disallowance as being subject to de-duplication. In each entry displayed in the list display field, there is displayed the content that is set for that entry. For example, if "Allowed Globally" is displayed, it indicates a state in which registration as being subject to de-duplication is allowed with respect to all users. If "Allowed Locally" is displayed, it indicates a state in which registration as being subject to de-duplication is allowed only to its own user(s). If "Disallowed" is displayed, it indicates a state in which registration as being subject to de-duplication is not allowed.

In addition, in the list display field 6240, for the individual stored data, such information as the data identifier 4120, the name 4131, and the like that are assigned to the respective data are also displayed. If it is desired that the default setting applied to data that the relevant user stores be changed, the checkbox of the default setting field 6241 is enabled, and from among the registration allowance setting button 6250, the limited registration allowance setting button 6260, and the registration disallowance setting button 6270, that which matches the desired setting is selected and clicked. If it is desired that the settings of all of the stored data be changed collectively, the checkbox of the collective setting field 6242 is enabled, and a similar operation is performed. If it is desired that the settings of some of the data be changed collectively, the checkboxes of the desired individual setting fields 6243, 6244, 6245, and 6246 are enabled, and a similar operation is performed.

By using the submit button 6280 after the inputs above have been completed, the inputted content is reflected in the backup server 1100. In addition, by using the cancel button 6290, it is possible to cancel the inputted content. It is noted that, in displaying the backup data information input screen 6200 at the backup client 2100, the backup data information input screen 6200 is displayed in a state where the backup data information that is already set on the backup client 2100 is inputted. For the content to be displayed here, the contents registered in the backup data management table 4100 and the backup client management table 4500 on this backup client 2100 are used. Here, in order to update the displayed content to the newest state, the refresh button 6230 is clicked. Naturally, a screen for confirming the setting content may be provided separately.

FIG. 41 is a diagram showing changes to the backup data management table 4100 shown in FIG. 4. What has changed is that usability for de-duplication flag 4170 has been newly added. This entry is used to store information as to whether or not users using the backup server 1100 allow, with respect to data stored on the client, registration as being subject to de-duplication using the backup data information input program 2129 at the backup client 2100. The kind of information stored matches that of the information inputted through the backup data information input screen 6200 in FIG. 40. Specifically, if "Allowed Globally" is stored, it indicates a state in which registration as being subject to de-duplication is allowed with respect to all users. If "Allowed Locally" is stored, it indicates a state in which registration as being subject to de-duplication is allowed only to its own user(s). If "Disallowed" is stored, it indicates a state in which registration as being subject to de-duplication is not allowed. It is noted that, although not shown in the drawing, registration as being subject to de-duplication may also be allowed to a group comprising any number of users.

FIG. 42 is a diagram showing a configuration including changes to the backup client management table 4500 shown in FIG. 34. What has changed is that digest information creation default setting information 4570 has been newly added. This entry is used to store information as to whether or not a user using the backup server 1100 allows by default, with respect to data stored by this user, registration as being subject to de-duplication using the backup data information input program 2129 at the backup client 2100. The kind of information stored matches that of the information inputted through the backup data information input screen 6200 in FIG. 40. Specifically, it is the same as the usability for de-duplication flag 4170 in FIG. 41 described above.

Figure 43:
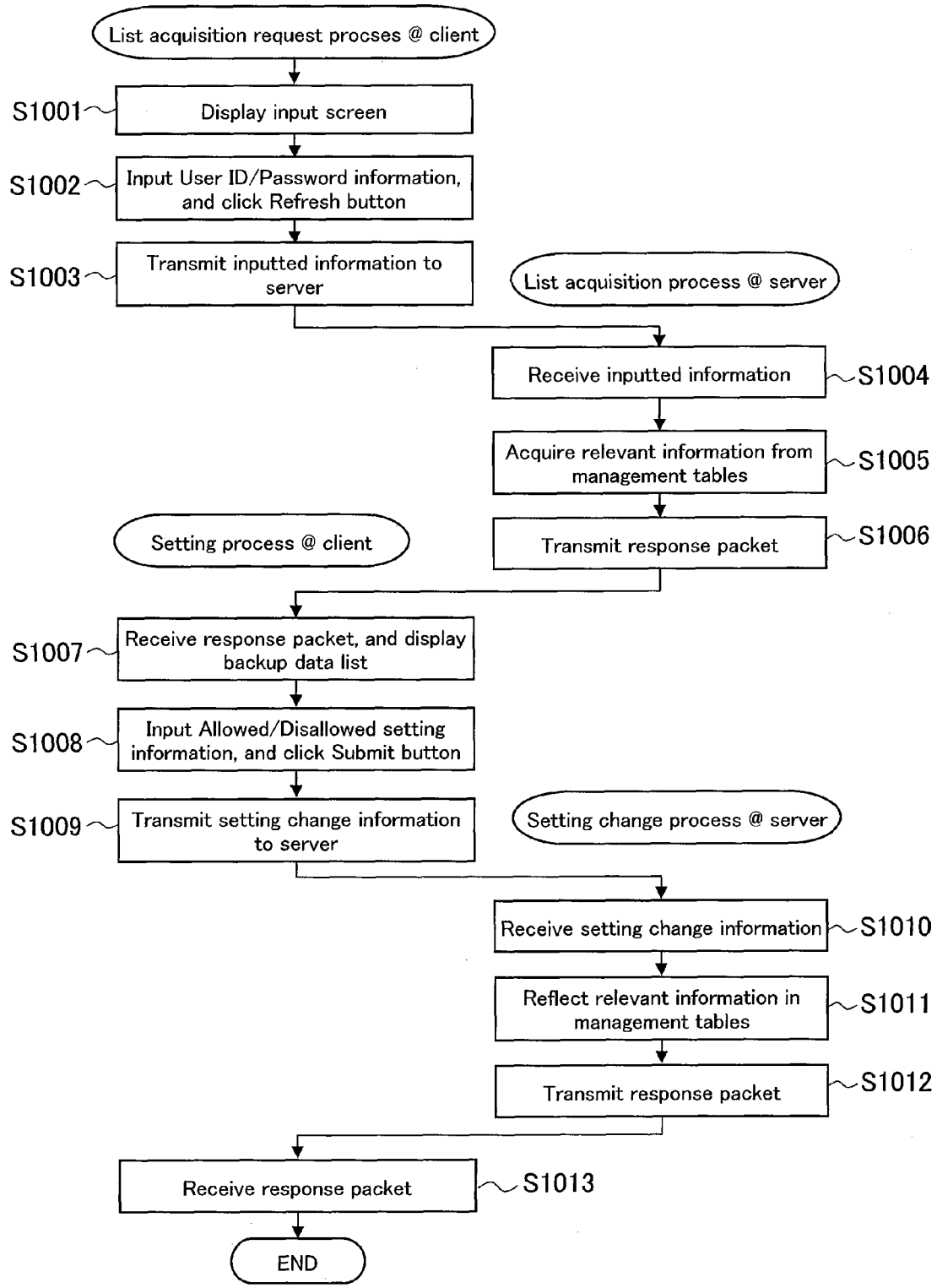
FIG. 43 is a flowchart illustrating a backup data information input process according to the sixth embodiment of the present invention.

FIG. 43 is a flowchart showing the process flow from the inputting of backup data information up to registration thereof in the system. First, at the backup client 2100, using the backup data information input program 2129, the backup data information input screen 6200 is launched (step S1001). Then, through this screen 6200, the user inputs his own user identifier and password into the user identifier input field 6210 and the password input field 6220, respectively, and clicks the refresh button 6230 (step S1002). Thus, the inputted information is transmitted to the backup server 1100 (step S1003). At the backup server 1100, the transmitted inputted information is received (step S1004), and the corresponding information is acquired from the backup client management table 4500 and the backup data management table 4100 on the backup server 1100 (step S1005). After acquisition, a response packet is transmitted (step S1006). At the backup client 2100, the response packet is received, and the acquired backup data list is displayed on the screen 6200 (step S1007). Thus, there is displayed in the list display field 6240 default setting information corresponding to the user, as well as setting information for the data that this user stored. Then, on the screen 6200, after changes are made to the default setting information corresponding to the user as well as to the setting information for the data that this user stored, the submit button 6280 is clicked (step S1008). The method for changing setting information performed here is similar to the method described with reference to FIG. 40. By process step S1008, setting change information is transmitted to the backup server 1100 (step S1009). At the backup server 1100, the transmitted setting change information is received (step S1010), and this information is reflected in the backup client management table 4500 and the backup data management table 4100 on the backup server 1100 (step S1011). After this reflection takes place, a response packet is transmitted (step S1012). At the backup client 2100, the response packet is received (step S1013), and the process is terminated.

Figure 44:
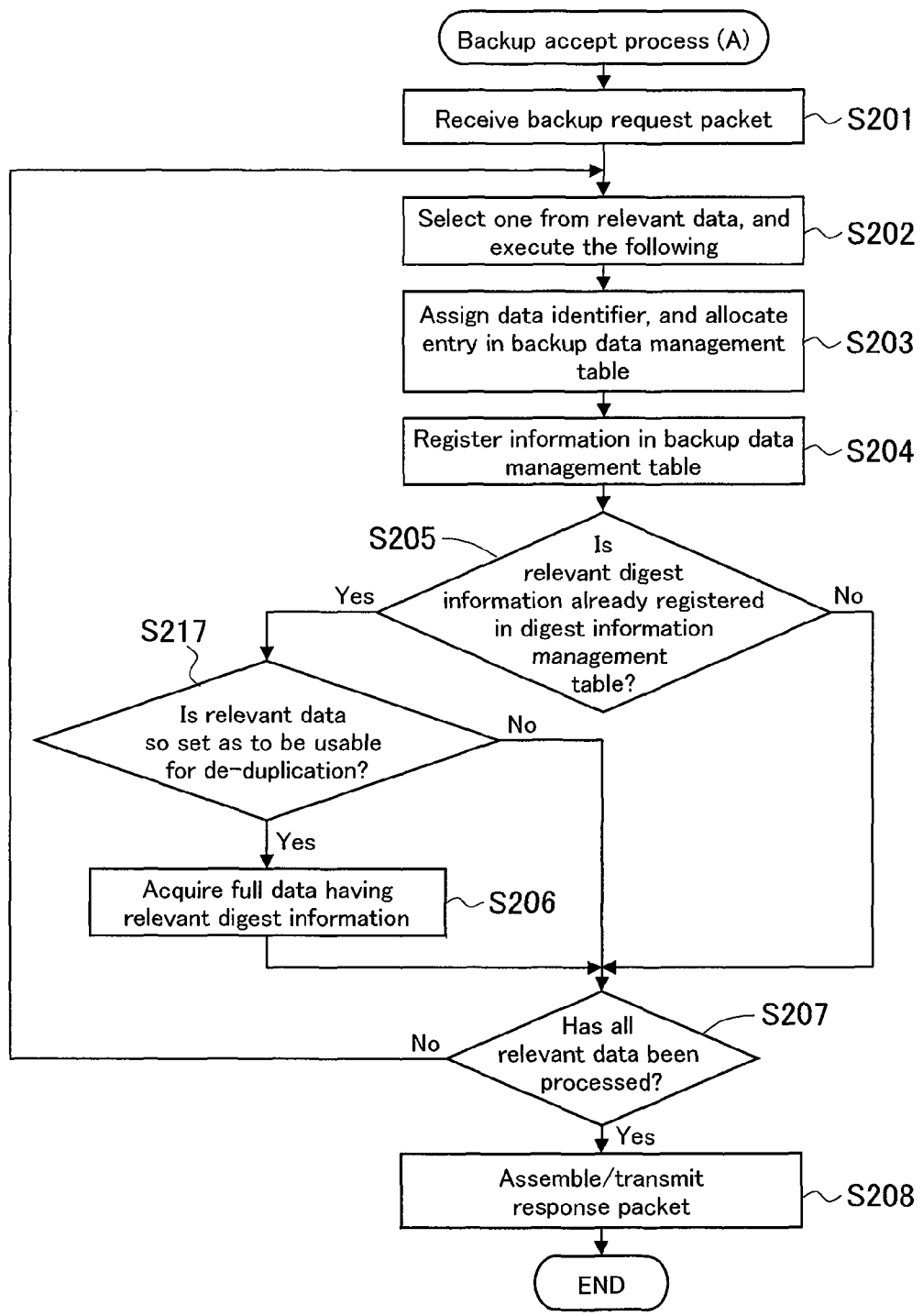
FIG. 44 is a flowchart illustrating the first half portion of a backup accept process according to the sixth embodiment of the present invention.

FIG. 44 is a flowchart including changes to the backup accept process shown in FIG. 10. What has changed is that, prior to the process of process step S206 in FIG. 10, there has been added a process (step S217) of checking, if it is found in process step S205 that relevant digest information is registered, whether or not the relevant data is set to be usable for de-duplication. Here, specifically, the corresponding stored file identifier 4210 is acquired from the digest information management table 4200 in which this digest information is stored. Next, from the stored data correspondence management table 4300, the corresponding data identifier 4120 is acquired from the entry in which the acquired stored file identifier 4210 is registered. Next, from the backup data management table 4100, the corresponding usability for de-duplication flag 4170 is acquired from the entry in which the acquired data identifier 4120 is registered. Based on the information of this usability for de-duplication flag 4170, the determination process of process step S217 is performed. At process step S217, if the setting is such that use in de-duplication is possible (Yes), the process proceeds to process step S206 in FIG. 10 so as to use this data as verification data in de-duplication. If the setting is such that use in de-duplication is impossible (No), this data is not to be used as verification data in de-duplication, and the process proceeds to process step S206 in FIG. 10. In this case, at the backup server 1100, it is determined that no data matching the data to be backed up was found, and this is notified to the side of the backup client 2100.

Figure 45:
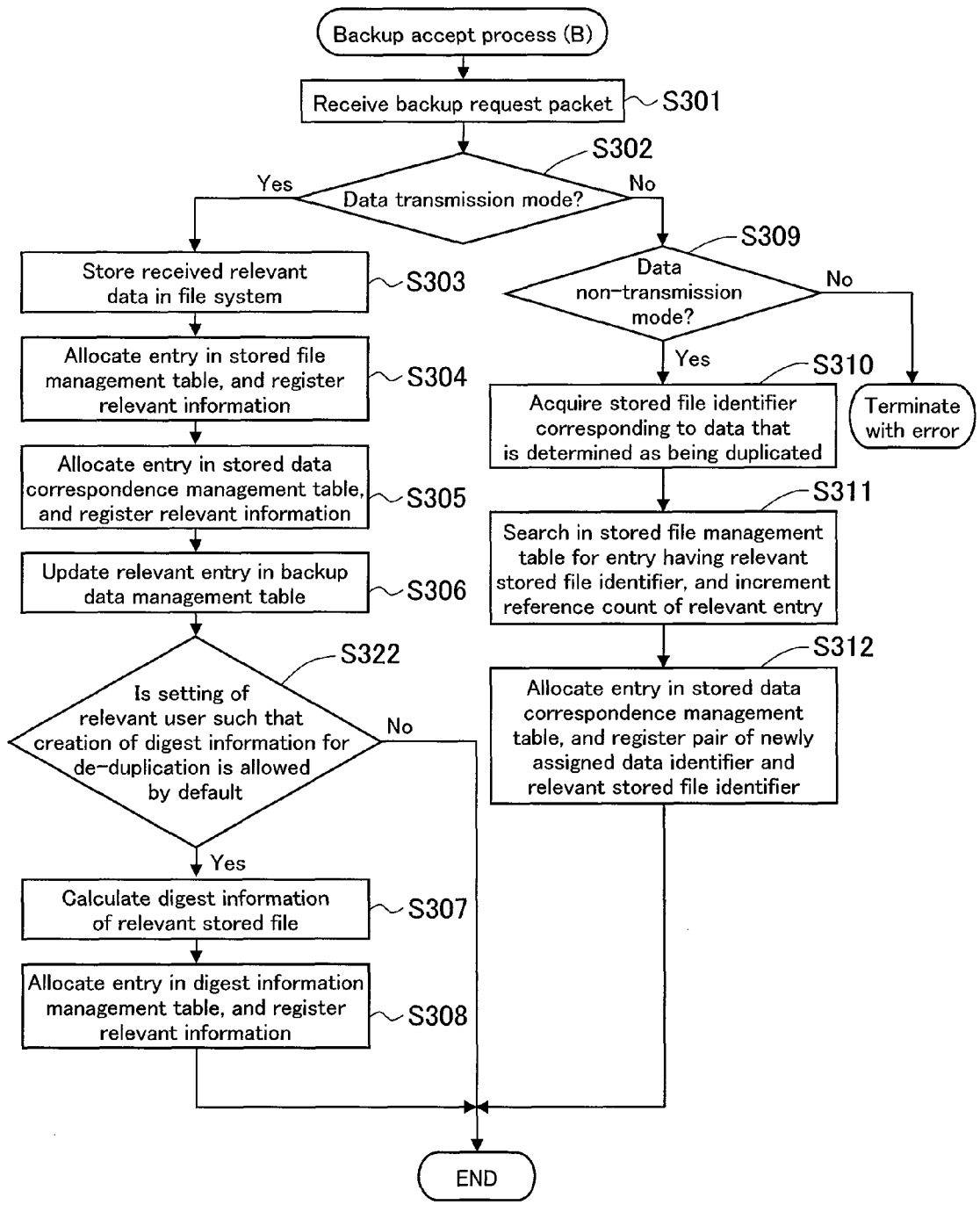
FIG. 45 is a flowchart illustrating the latter half portion of a backup accept process according to the sixth embodiment of the present invention.

FIG. 45 is a flowchart showing changes to the backup accept process shown in FIG. 11. What has changed is that, prior to the process of process step S307 in FIG. 11, there has been added a process (step S322) of checking whether or not the setting of the user currently making the backup request is such that digest information creation for de-duplication is possible by default. Here, specifically, based on information stored in the control information 5300 portion and the like of the packet in which the backup request is stored, the user requesting the process is identified, and the user identifier 4510 is acquired. Next, from the backup client management table 4500, the corresponding digest information creation default setting information 4570 is acquired from the entry in which the acquired user identifier 4510 is registered. Based on the information of this digest information creation default setting information 4570, the determination process of process step S322 is performed. At process step S322, if the setting is such that digest information creation is possible (Yes), the process proceeds to process step S307 in FIG. 45 so as to calculate the digest information of the relevant data. If the setting is not such that digest information creation is possible (No), the digest information of this data is not to be calculated, and the process of FIG. 45 is terminated.

According to the present embodiment, clients using a backup server are able to exercise control where, with respect to their own stored data, they allow or disallow use as verification data for performing de-duplication.

Seventh Embodiment

In the first embodiment discussed above, an embodiment was described where, in transmitting verification data from the backup server 1100 to the backup client 2100, relevant verification data was transmitted all at once. However, although it does not go so far as to consider transmitting only parts of the verification data, and performing verification of the data as a whole by repeating verification of partial data, if such a scheme can be realized, mismatch may be detected early on on the side of the backup client 2100 in cases of mismatch, and is thus preferable. As such, a control scheme is described below where a verification process is performed by having the backup server 1100 repeatedly transmit verification data to the backup client 2100 in parts.

In order to perform the verification process by having the backup server 1100 repeatedly transmit the verification data to the backup client 2100 in parts in the manner described above, parts of the backup process and the packet configuration need to be changed. These changes will be described with reference to FIGS. 46, 47, 48, and 49.

Figure 46:
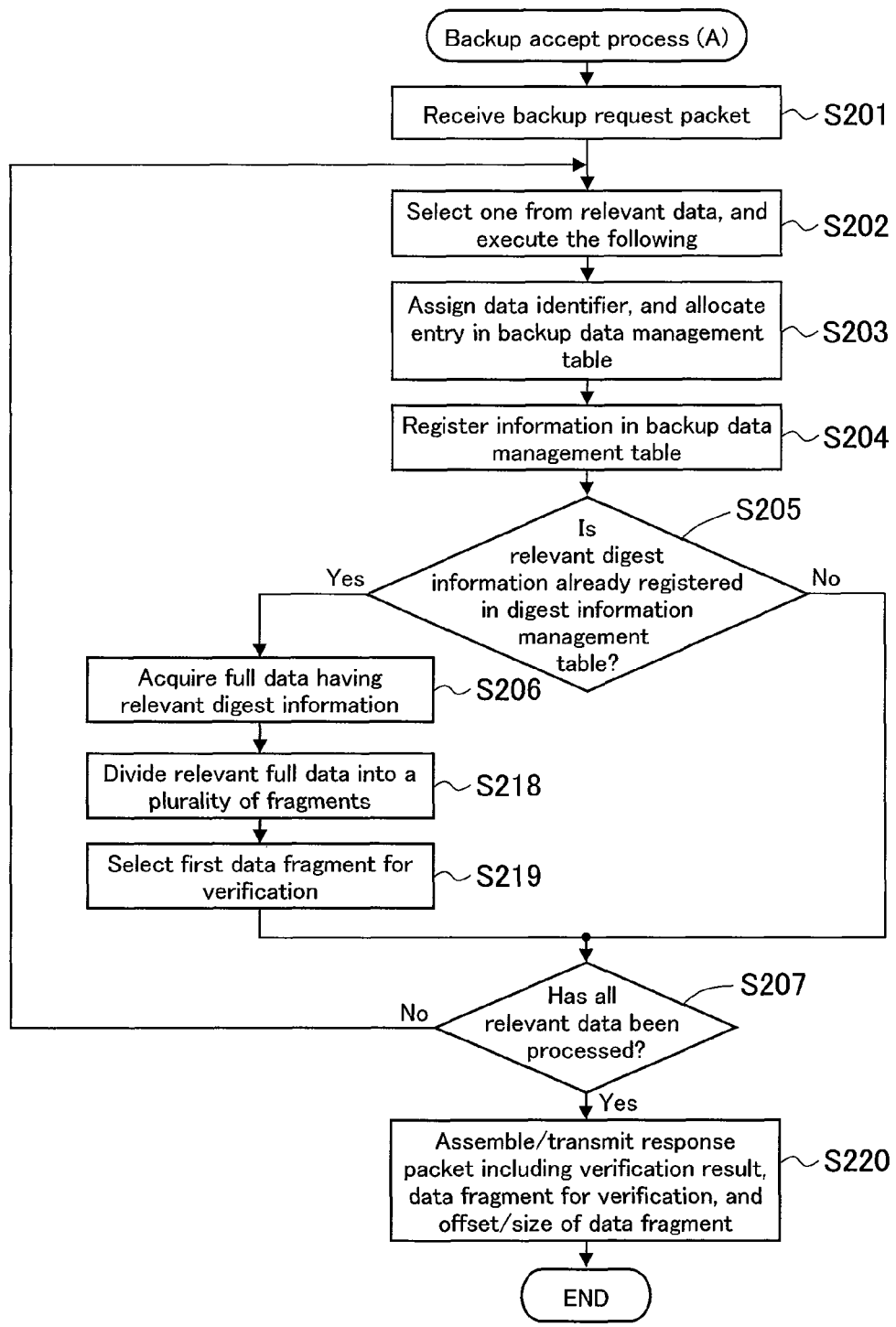
FIG. 46 is a flowchart illustrating the first half portion of a backup accept process according to the seventh embodiment of the present invention.

FIG. 46 is a diagram showing changes to the backup accept process shown in FIG. 10. The changes are as follows. After process step S206 in FIG. 10, the following process is newly added. First, the full data acquired in process step S206 is divided into any number of fragments (step S218). Next, of the divided fragments, the first data fragment is selected as verification data to be transmitted (step S219). Then, the process proceeds to process step S207 of FIG. 46. In addition, in process step S207, if it is determined that all relevant data has been processed, here, instead of process step S208, a process of assembling and transiting a response packet including the verification result, the data fragment for verification, and the offset/size of the data fragment is performed (step S220). A specific packet configuration will be described later with reference to FIG. 49.

Figure 47:
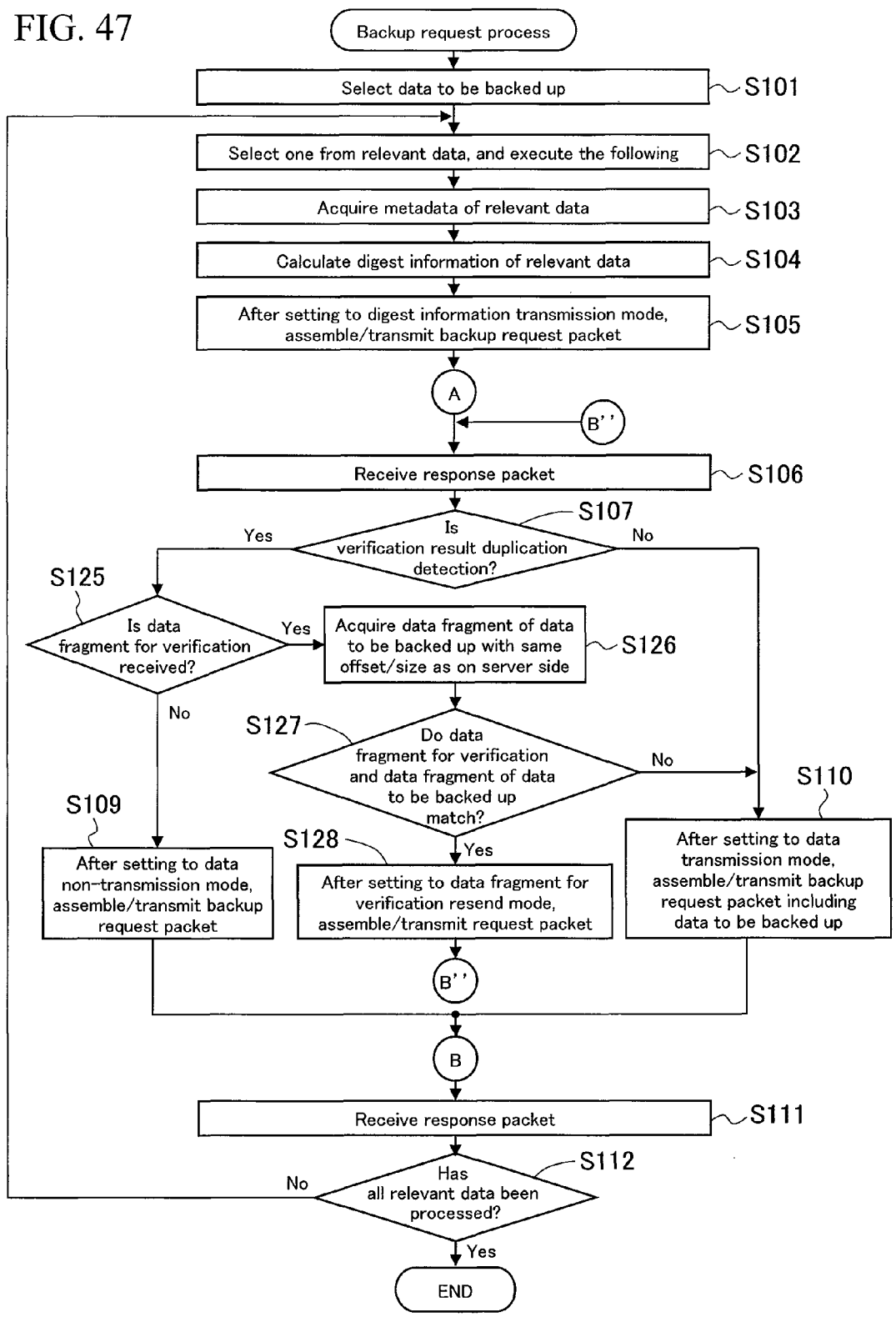
FIG. 47 is a flowchart illustrating a backup request process according to the seventh embodiment of the present invention.

FIG. 47 is a flowchart including changes to the backup request process shown in FIG. 9. The changes are as follows. Before performing the process of process step S109 in FIG. 9, the backup client 2100 checks whether or not a data fragment for verification is received from the backup server 1100 (step S125). Here, specifically, by checking the configuration of the received packet, it is checked whether or not a data fragment is present. If no data fragment is received, proceeding to process step S109, the process is performed. If a data fragment is received, the following process is performed.

First, with the same offset/size as those on the side of the backup server 1100, a data fragment of the data to be backed up possessed by the backup client 2100 is acquired (step S126). Then, it is checked whether or not the data fragment for verification and the fragment just acquired of the data to be backed up match (step S127). If they do not match (No), it is determined as being a mismatch early on, and the process proceeds to process step S110. If they do match (Yes), after being set to data fragment for verification resend mode so as to acquire the next data fragment for verification, a request packet is assembled and transmitted to the backup server 1100 (step S128). Here, the setting of the data fragment for verification resend mode is performed using the regions of the content flags 5431 and 5436 in the packet configuration that will be described with reference to FIG. 49. In addition, after the packet is transmitted to the backup server 1100 in process step S128, a response packet is to be received in process step S106. Thus, it is made possible to repeat execution of verification with a data fragment for verification after the response packet is received.

Figure 48:
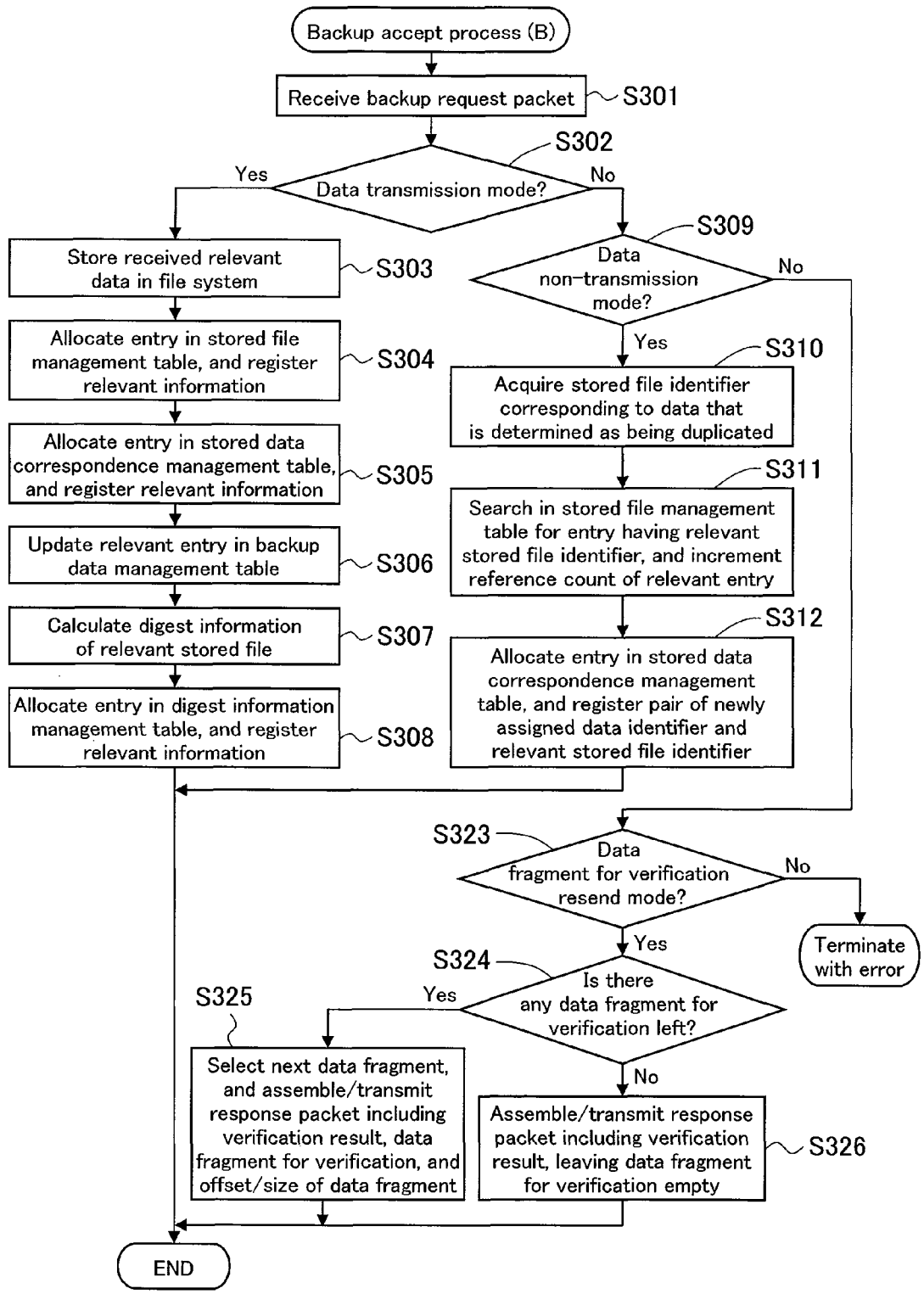
FIG. 48 is a flowchart illustrating the latter half portion of a backup accept process according to the seventh embodiment of the present invention.

FIG. 48 is a diagram including changes to the backup accept process shown in FIG. 11. The changes are as follows. After it has been determined in process step S309 in FIG. 11 that the backup request packet is not in the data non-transmission mode, it is further checked whether or not the backup request packet is in the data fragment for verification resend mode (step S323). If it is not in the data fragment for verification resend mode (No), the process is terminated with an error as being in an illegal state. If it is in the data fragment for verification resend mode (Yes), it is checked whether or not any data fragments for verification of the relevant verification data are left (step S324). If there are data fragments for verification left, the next data fragment is selected as the data fragment for verification, and after being set to duplication detection mode, a response packet including such information as the verification result, the data fragment for verification, and the offset/size of the data fragment for verification is assembled and transmitted (step S325). The setting of the duplication detection mode uses the regions of the content flags 5431 and 5436 in the packet configuration that will be described with reference to FIG. 49. In addition, at process step S324, if there are no data fragments left, it is deemed that all data fragments have been verified, and, after being set to duplication detection mode, a response packet including the verification result is assembled and transmitted (step S326). Here, as for the information relating to the offset/size of the data fragment for verification, information that makes it identifiable that the data fragment for verification is empty may be stored.

Figure 49:
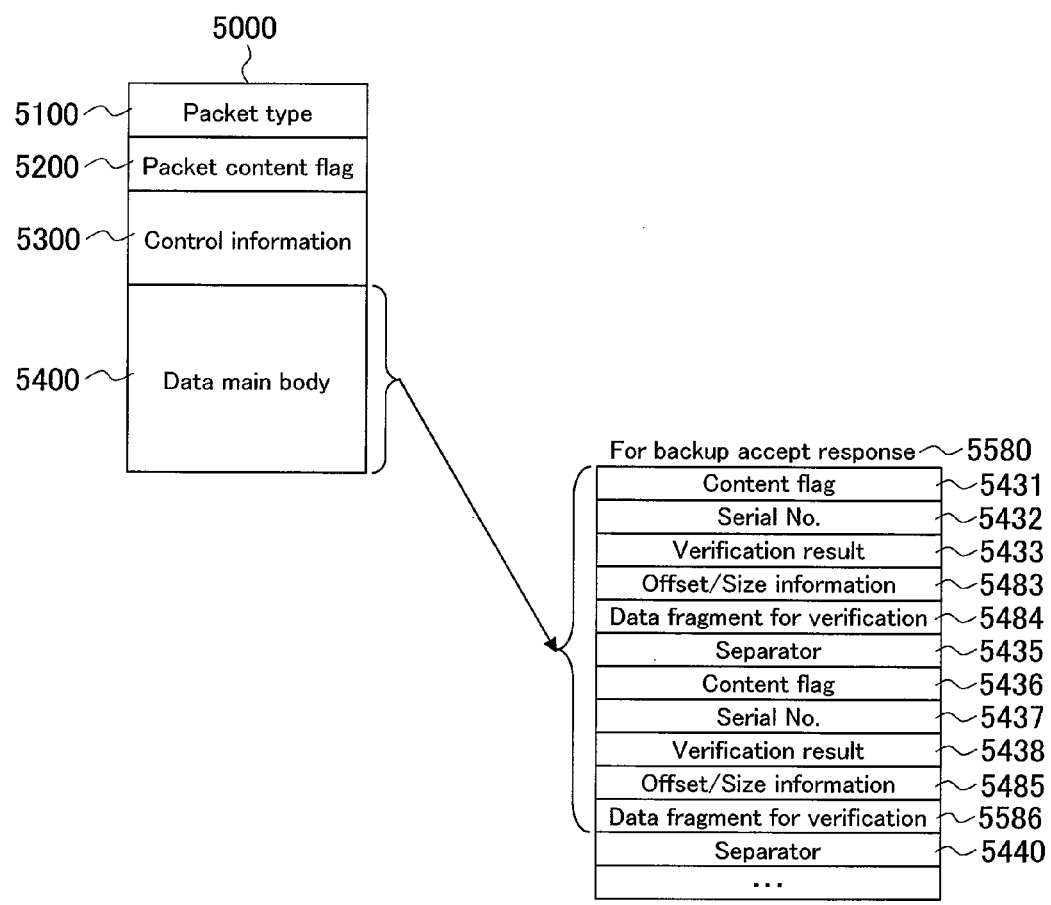
FIG. 49 is an illustrative diagram showing a packet configuration example according to the seventh embodiment of the present invention.

FIG. 49 is a diagram including changes to the packet configuration shown in FIG. 8. The changes are as follows. Instead of the backup accept response packet 5520 shown in FIG. 8, a backup accept response packet 5580 is used. In the backup accept response packet 5580, there are provided, in place of the entries of verification data 5434 and 5439 that were present in the backup accept response packet 5520, entries of offset/size information 5483 and 5485 and entries of data fragments for verification 5484 and 5486.

The offset/size information 5483 and 5485 are used to store information on the offset from the beginning corresponding to the data fragment for verification stored in the backup accept response packet 5580, as well as size information on the data fragment. The data fragments for verification 5484 and 5486 are used to store one data fragment for verification selected from verification data that has been divided into fragments on the side of the backup server 1100.

According to the present embodiment, there is an advantage in that mismatch can be detected early on on the backup client side.

Eighth Embodiment

The first embodiment described above deals with an embodiment in which the backup server 1100 sends to the backup client 2100, for the purpose of verification on the side of the backup client 2100 relating to data to be backed up, full data for which it has been determined that there is a match with this data to be backed up. However, as in the fourth embodiment, in cases where the size of the data to be backed up is large, or in cases where complete verification confirmation at the bit level is not necessarily required, digest information of the verification data may be sent instead of sending the verification data itself, and data verification may be performed at the backup client 2100 using this digest information.

Further, it may be made selectable, based on the communication status of the network, whether to employ a scheme of sending full data or to employ a scheme of sending digest information for data verification at the backup client 2100. In other words, there may be provided a verification data transmission scheme selecting function in which the use status of the communication channel between the backup server 1100 and the backup client 2100 is monitored, and based on that monitoring information, a scheme suited to the use status of the communication channel to be used is selected as the scheme for transmitting the verification data to the request source.

As such, a control technique is described below where, based on the communication status of the network, the format of the data that the backup server 1100 is to send to the backup client 2100 as verification data for the purpose of data verification is selected.

In order to select the format of the data to be sent as the verification data based on the communication status of the network in the manner described above, parts of the system configuration and the backup process need to be changed, and a network communication status managing function and the like also need to be newly added. These changes and additions will be described with reference to FIGS. 50, 51, 52, 53, 54, and 55.

Figure 50:
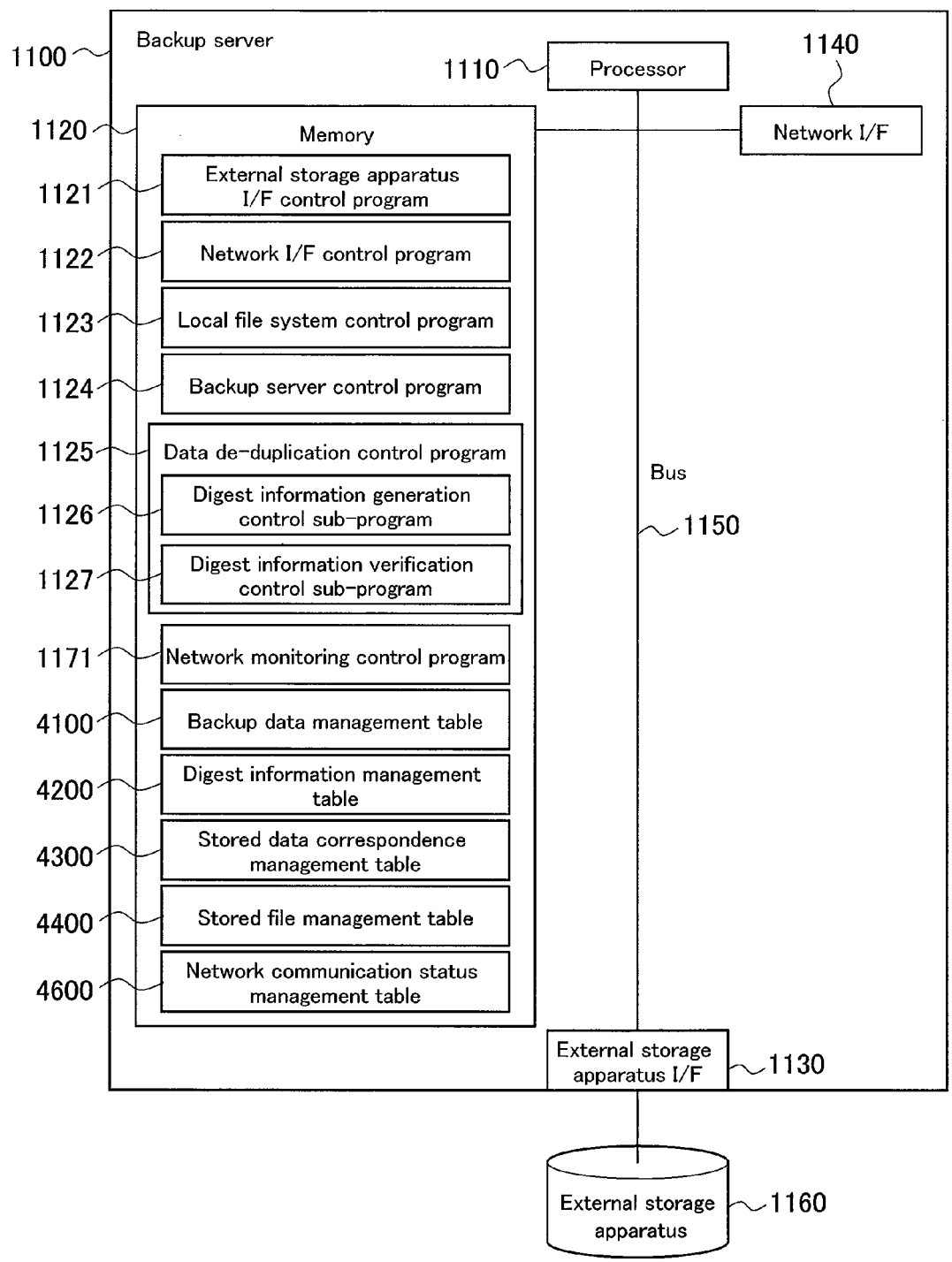
FIG. 50 is a hardware configuration diagram of a backup server according to the eighth embodiment of the present invention.

FIG. 50 is a diagram showing changes to the hardware configuration of the backup server 1100 shown in FIG. 2. The changes are that the following two features have been added. The first is a network monitoring control program 1171. This program provides a function of periodically acquiring and managing information regarding the communication status of the network to which the backup server 1100 is connected. In addition, a function of receiving and managing together information received from the backup client 2100 regarding the communication status of the network is also provided. The second is a network communication status management table 4600. The network communication status management table 4600 is used to store and manage information acquired by the network monitoring control program 1171 as well as information acquired from the respective backup clients 2100 and 2200. Information regarding the network communication status with all of the backup clients 2100 and 2200 that use the backup server 1100 is stored in the network communication status management table 4600. Descriptions of the configuration and the like of the network communication status management table 4600 will be described later with reference to FIG. 52.

Figure 51:
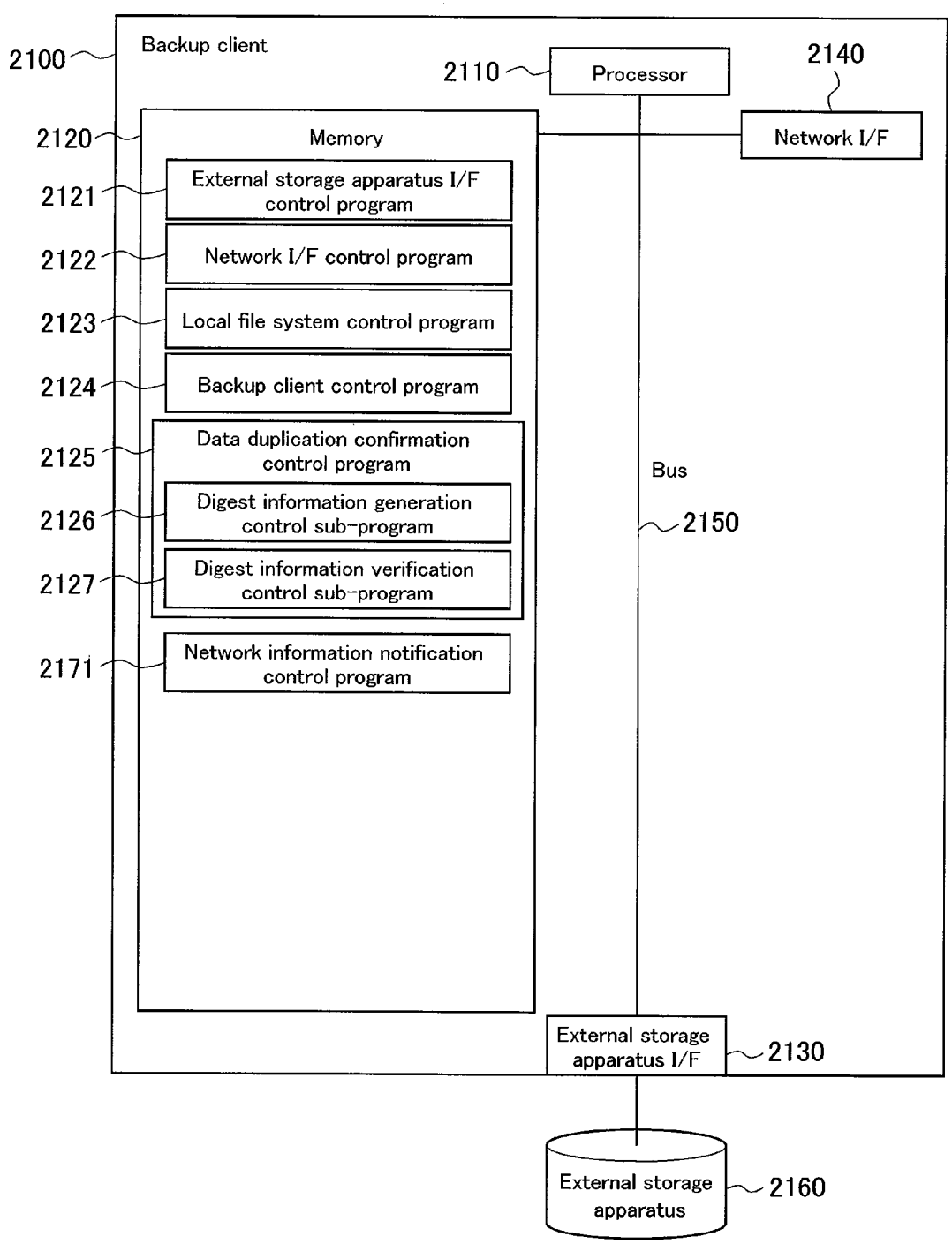
FIG. 51 is a hardware configuration diagram of a backup client according to the eighth embodiment of the present invention.

FIG. 51 is a diagram showing a change to the hardware configuration of the backup client 2100 shown in FIG. 3. The change is that a network information notification control program 2171 has been newly added. In this program, there are provided functions of collecting information regarding the communication status of the network used by the backup client 2100, and sending this information to the network monitoring control program 1171 on the backup server 1100. It is noted that the network communication status collected in this program is, in particular, information regarding the network between the backup client 2100 and the backup server 1100.

FIG. 52 is a diagram showing a configuration example of the network communication status management table 4600 that manages information regarding the communication status of the networks between the backup server 1100 and the backup clients 2100 and 2200. Specifically, the network communication status management table 4600 comprises such components as client IP address 4610, communication direction 4620, communication status 4630, and registration/update date and time 4640. Here, the client IP address 4610 is used to identify the relevant backup client. The communication direction 4620 is used to identify whether it is information regarding communication from the relevant backup client to the backup server 1100, or information regarding communication in the opposite direction. In FIG. 52, the former is expressed as server direction, while the latter is expressed as client direction. In addition, the former is stored based on information that is received from the network information notification control program 2171 of the relevant backup client. The latter is stored based on information that is acquired at the network monitoring control program 1171 of the backup server 1100. The communication status 4630 stores specific information regarding the communication status of the relevant network. For example, in FIG. 52, throughput 4631 and turnaround time 4632 are shown. Other information may also be stored. The registration/update date and time 4560 stores information on the date and time on/at which the respective entries were registered or updated.

Figure 53:
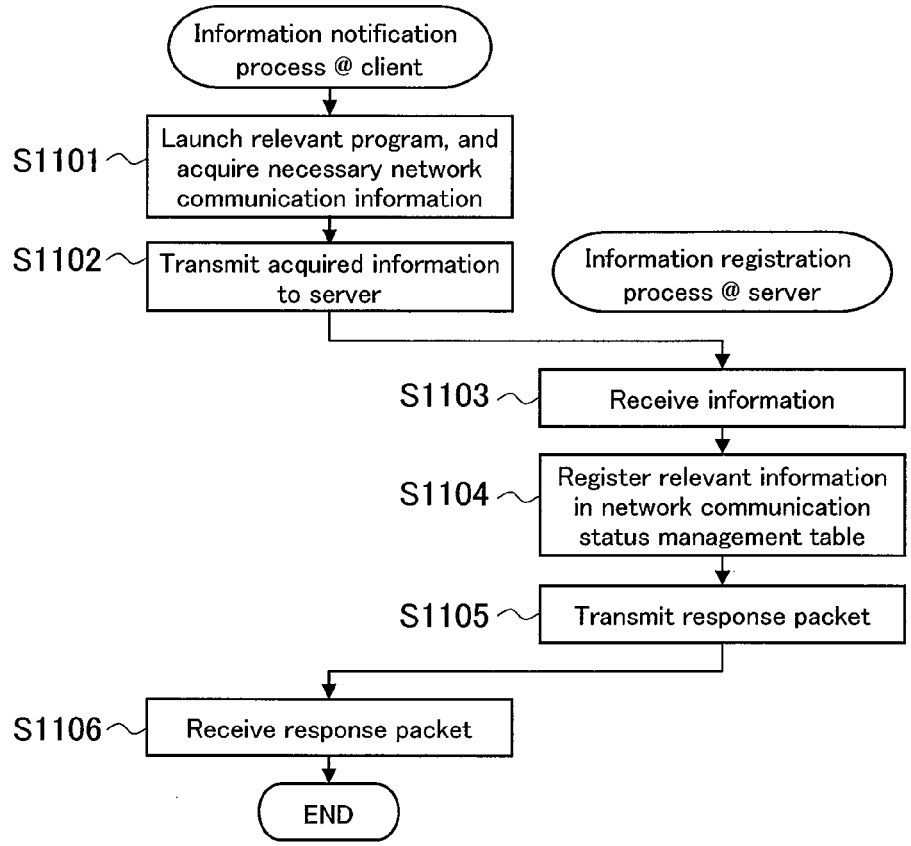
FIG. 53 is a flowchart illustrating a network information notification process at the backup client according to the eighth embodiment of the present invention.

FIG. 53 is a diagram showing the process flow from the acquisition of information regarding network communication status using the network information notification control program 2171 at the backup client 2100, up to the registration thereof on the backup server 1100. First, at the backup client 2100, the network information notification control program 2171 is launched, and information regarding the communication status of the network between the backup client 2100 and the backup server 1100 is acquired (step S1101). Here, in order to acquire information, the ping command, for example, is used. Then, the acquired information is transmitted to the backup server 1100 (step S1102). At the backup server 1100, the transmitted information is received (step S1103), and this information is registered in the network communication status management table 4600 on the backup server 1100 (step S1104). After registration, a response packet is transmitted (step S1105). At the backup client 2100, the response packet is received (step S1106), and the process is terminated. By periodically executing the process above, information regarding the communication status of the network is collected.

Figure 54:
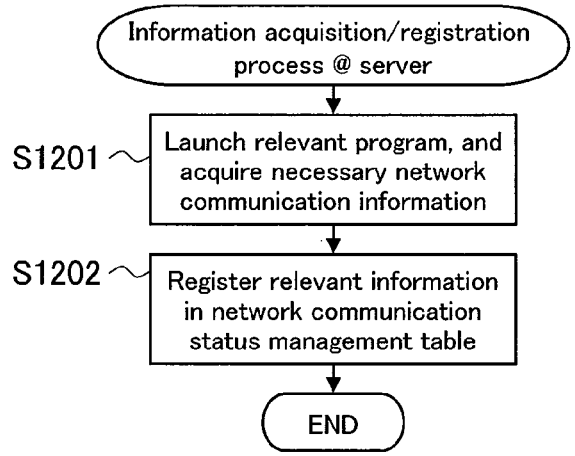
FIG. 54 is a flowchart illustrating a network information acquisition process at the backup server according to the eighth embodiment of the present invention.

FIG. 54 is a diagram showing the process flow from the acquisition of information regarding network communication status using the network monitoring control program 1171 at the backup server 1100, and up to the registration thereof. First, at the backup server 1100, the network monitoring control program 1171 is launched, and information regarding the communication status of the network between the backup server 1100 and each of the backup clients 2100 and 2200 is acquired (step S1201). Here, in order to acquire information, the ping command, for example, is used. Then, the acquired information is registered in the network communication status management table 4600 on the backup server 1100 (step S1202), and the process is terminated. By periodically executing the process above, information regarding the communication status of the network is collected.

Figure 55:
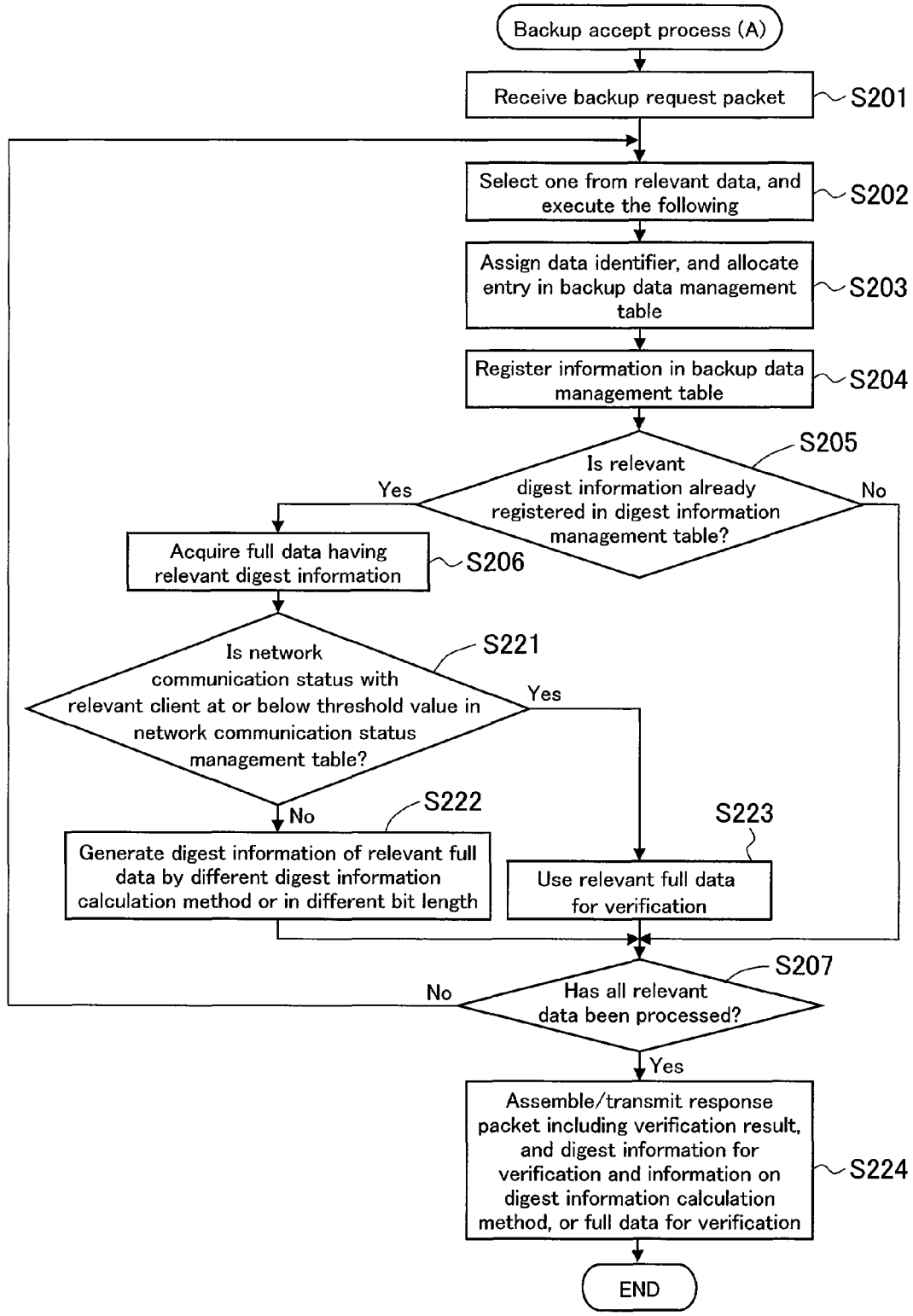
FIG. 55 is a flowchart illustrating the first half portion of a backup accept process according to the eighth embodiment of the present invention.

FIG. 55 is a diagram including changes to the backup accept process shown in FIG. 10. The changes are as follows. After process step S206 in FIG. 10, it is checked whether or not, in the network communication status management table 4600, the network communication status with the relevant client is at or below a given threshold value (step S221). Here, the IP address of the backup client is identified based on the information stored in the control information 5300 included in the received backup request packet. The entry in which this IP address is stored is searched for in the network communication status management table 4600. Once the entry is identified, the determination at process step S221 is performed based on the information of the communication status 4630 stored in this entry. The information used here to make the determination may be the throughput 4631, the turnaround time 4632, both, or some other information. If, in process step S221, it is determined that it is not at or below the threshold value, digest information of the full data acquired in process step S206 is generated (step S222). In this case, the digest information is sent to the backup client 2100 as verification data. In process step S222, in generating the digest information of the relevant data, a digest scheme that is different from that used in the calculation of the digest information that the backup client 2100 sent to the backup server 1100 for data duplication detection is used, or the digest information is generated in a different bit length. Thus, the calculation method and the bit length that the backup client 2100 initially used for digest information calculation are avoided.

If, in process step S221, it is determined that it is at or below the threshold value, a selection is made to use for verification the full data acquired in process step S206 (step S223), and the process proceeds to process step S207. In this case, the full data is sent to the backup client 2100 as the verification data. In addition, if, in process step S207, it is determined that all relevant data has been processed, here, instead of process step S208, a process of assembling and transmitting a response packet including the verification result and the verification data is performed (step S224). The verification data referred to here may store digest information for verification and information relating to digest scheme information on some occasions, and it may store full data for verification on others. Here, by changing the packet configuration, it is possible to identify which information is stored in the response packet.

Although the present invention has been described above with reference to preferred embodiments, it will be readily apparent that the present invention is by no means limited to these embodiments, and that certain changes and modifications may be made without departing from the spirit or scope thereof.

It is noted that the present invention may be constituted as, besides the control apparatuses described above, a control system or a control method. In addition, the present invention may be realized in various forms such as a computer program that realizes the control apparatuses described above, a recording medium on which such a program is recorded, data signals that contain such a program and that are realized within carrier waves, and the like.

If the present invention is to be constituted as a computer program, a recording medium on which that program is recorded, or the like, it may be constituted as an entire control apparatus or as an entire program that controls a control apparatus. Alternatively, it may constitute only a portion that serves the functions of the present invention. In addition, for the recording medium, various computer-readable volatile storage media and non-volatile storage media may be used, examples of which include flexible disks, CD-ROMs, DVD-ROMs, punch cards, printed material on which codes such as bar codes are printed, internal and external storage apparatuses of computers, and the like.

INDUSTRIAL APPLICABILITY

The present invention is applicable to internet backup apparatuses.

What is claimed is:

1. A transfer data management system for internet backup in which a backup server and a plurality of backup clients are connected via a network, and the backup server provides to the backup clients a function of backing up on the backup server data stored on the backup clients, as well as a function of restoring backed up data on the backup clients,
wherein each of the backup clients comprises:
a processor, memory device and a network interface;
a digest information sending portion that sends to the backup server digest information of data to be backed up prior to a data backup request from the backup client to the backup server;
a verification data receiving portion that receives, as verification data, stored data corresponding to the data to be backed up, which is sent from the backup server on the condition that the backup server has performed verification on the data to be backed up based on the digest information and the stored data on the backup server,
an examining portion for examining whether or not the verification data and the data to be backed up match,
wherein the backup server comprises:
a processor, memory device and a network interface;
a first encrypting portion that encrypts the verification data, and the backup server sends, to the backup client that sent the backup server digest information, the verification data and information regarding an encryption scheme thereof,
wherein the backup client further comprises a second encrypting portion that encrypts the data to be backed up according to the received encryption scheme,
wherein the examining portion determines whether or not the received verification data and the data to be backed up match,
if the received verification data and the data to be backed up match, a backup request packet is transmitted to the backup server and the data to be backed up is temporarily stored on the backup client but not sent from the backup client,
if the received verification data and the data to be stored do not match, the encrypted data to be backed up and the backup request packet are transmitted to the backup server from the backup client, and
wherein, at the verification portion of the backup server, verification is performed independent of the backup clients and with respect to, as a whole, data of the plurality of the backup clients as the stored data.

2. The transfer data management system according to claim 1, wherein digest information, which summarizes the stored data, is used as the verification data instead of the stored data in full.

3. The transfer data management system according claim 1, wherein, at the examining portion of the backup client making the request, it is examined whether or not digest information for verification and digest information, which is generated from the data to be backed up, match using a plurality of digest information generated by different schemes.

4. The transfer data management system according to claim 1, wherein the digest information sending portion transmits in units of data fragments for verification into which the verification data is divided.

5. The transfer data management system according to claim 1, wherein the backup client making the request comprises a selecting portion for selecting whether to perform verification using the stored data in full or to perform verification using digest information.

6. The transfer data management system according to claim 1, wherein the backup client making the request comprises a de-duplication applicability selecting portion for selecting whether or not to allow use of the stored data on the backup server as a duplication detection candidate in a data de-duplication function.

7. The transfer data management system according to claim 1, wherein the backup server comprises a verification data transmission scheme selecting portion for monitoring a use status of a communication channel between the backup server and the backup client making the request, and, based on monitoring information thereof, for selecting, as a transmission method used for the verification data for the backup client making the request, a scheme that is suited to the use status of the communication channel to be used.

8. The transfer data management system according to claim 1 comprising a plurality of the backup servers, wherein in a data backup request to a first backup server, information regarding a second backup server from which the data to be backed up was acquired as well as information that is required in order to acquire the data to be backed up are sent to the first backup server, and the first backup server acquires stored data from the second backup server based on such information.

9. A backup client in a transfer data management system for internet backup in which a backup server having a processor, memory device and a network interface, and a plurality of backup clients, each having a processor, memory device and a network interface, are connected via a network, and the backup server provides to the backup clients a function of backing up on the backup server data stored on the backup clients, as well as a function of restoring backed up data on the backup clients, where the backup server has a first encrypting portion that encrypts verification data, and the backup server sends to the backup client that made a request the encrypted verification data and information regarding an encryption scheme thereof, the backup client comprising:

a digest information sending portion that sends to the backup server digest information of data to be backed up prior to a data backup request from the backup client to the backup server;

a verification data receiving portion that receives, as verification data, stored data corresponding to the data to be backed up, which is sent from the backup server on the condition that the backup server has performed verification on the data to be backed up based on the digest information and the stored data on the backup server;

an examining portion for examining whether or not the verification data and the data to be from the backup server match, and a second encrypting portion that encrypts the data to be backed up according to the received encryption scheme, wherein the examining portion determines whether or not the received verification data and the data to be backed up match, if the received verification data and the data to be backed up match, a backup request packet is transmitted to the backup server and the data to be backed up is temporarily stored on the backup client but not sent from the backup client, and if the received data verification data and the data to be stored do not match, the encrypted data to be backed up and the backup request packet are transmitted to the backup server from the backup client, and wherein, at the verification portion of the backup server, verification is performed independent of the backup clients and with respect to, as a whole, data of the plurality of the backup clients as the stored data.

10. A backup server in a transfer data management system for internet backup in which the backup server, having a processor, memory device and a network interface, and a plurality of backup clients, each having a processor, memory device and a network interface, are connected via a network, and the backup server provides to the backup clients a function of backing up on the backup server data stored on the backup clients, as well as a function of restoring backed up data on the backup clients, the backup server comprising, a verification portion that, prior to a data backup request from the backup client, receives digest information of data to be backed up, and performs verification of the data to be backed up against stored data, on the backup server, corresponding to the data to be backed up based on the digest information, where the backup server sends, as verification data to the backup client, the stored data corresponding to the data to be backed up, and prompts the backup client for examination as to whether or not the verification data and the data to be backed up match;

wherein a first encrypting portion encrypts the verification data which is sent to the backup client, such that the backup server sends to the backup client the encrypted verification data and information regarding an encryption scheme thereof, wherein if the sent verification data and the data to be backed up match as determined by the backup client, a backup request packet is received from the backup client and the data to be backed up is temporarily stored by the backup client but not received from the backup client, and if the sent verification data and the data to be stored do not match as determined by the backup client, the encrypted data to be backed up and the backup request packet are received from the backup client, and wherein, at the verification portion of the backup server, verification is performed independent of the backup clients and with respect to, as a whole, data of the plurality of the backup clients as the stored data.

11. A transfer data management method using a transfer data management system for internet backup in which a backup server having a processor, memory device and a network interface, and a plurality of backup clients, each having a processor, memory device and a network interface, are connected via a network, and the backup server provides to the backup clients a function of backing up on the backup server data stored on the backup clients, as well as a function of restoring backed up data on the backup clients, the transfer data management method comprising:

sending digest information from the backup client to the backup server of data to be backed up prior to a data backup request from the backup client to the backup server;

receiving by the backup client, as verification data, stored data corresponding to the data to be backed up, which is sent from the backup server on the condition that the backup server has performed verification on the data to be backed up based on the digest information and the stored data on the backup server, where the verification data is encrypted and the backup client is informed of the encryption scheme thereof;

examining by the backup server whether or not the verification data and the data to be backed up match, if the received verification data and the data to be backed up match, a backup request packet is transmitted to the backup server and the backup client temporarily stores the data to be backed up but omits sending the data to be backed up, and if the received verification data and the data to be stored do not match, the backup client encrypts the data to be backed up according to the encryption scheme and sends the encrypted data to be backed up and the backup request packet to the backup server, and wherein the verification is performed independent of the backup clients and with respect to, as a whole, data of the plurality of the backup clients as the stored data.

12. A non-transitory computer readable medium which stores a program for causing a computer to execute a transfer data management method using a transfer data management system for internet backup in which a backup server having a processor, memory device and a network interface, and a plurality of backup clients, each having a processor, memory device and a network interface, are connected via a network, and the backup server provides to the backup clients a function of backing up on the backup server data stored on the backup clients, as well as a function of restoring backed up data on the backup clients, the transfer data management method comprising:

sending digest information from the backup client to the backup server of data to be backed up prior to a data backup request from the backup client to the backup server;

receiving by the backup client, as verification data, stored data corresponding to the data to be backed up, which is sent from the backup server on the condition that the backup server has performed verification on the data to be backed up based on the digest information and the stored data on the backup server, where the verification data is encrypted and the backup client is informed of the encryption scheme thereof;

examining by the backup server whether or not the verification data and the data to be backed up match, if the received verification data and the data to be backed up match, a backup request packet is transmitted to the backup server and the backup client temporarily stores the data to be backed up but omits sending the data to be backed up, and if the received verification data and the data to be stored do not match, the backup client encrypts the data to be backed up according to the encryption scheme and sends the data to be backed up and the backup request packet, which are encrypted according to the encryption scheme, to the backup server, and wherein the verification is performed independent of the backup clients and with respect to, as a whole, data of the plurality of the backup clients as the stored data.

* * * * *